(12) United States Patent
Cao et al.

(10) Patent No.: US 11,600,859 B2
(45) Date of Patent: *Mar. 7, 2023

(54) ELECTROLYTE FOR STABLE CYCLING OF RECHARGEABLE ALKALI METAL AND ALKALI ION BATTERIES

(71) Applicant: Battelle Memorial Institute, Richland, WA (US)

(72) Inventors: Xia Cao, Richland, WA (US); Ji-Guang Zhang, Richland, WA (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 403 days.

This patent is subject to a terminal disclaimer.

(21) Appl. No.: 16/688,929

(22) Filed: Nov. 19, 2019

(65) Prior Publication Data

US 2020/0161706 A1   May 21, 2020

Related U.S. Application Data

(60) Provisional application No. 62/770,696, filed on Nov. 21, 2018.

(51) Int. Cl.
*H01M 10/0567* (2010.01)
*H01M 10/0569* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| | | |
|---|---|---|
| 4,086,403 A | 4/1978 | Whittingham et al. |
| 8,815,453 B1 | 8/2014 | Tsukamoto |
| 10,367,232 B2 | 7/2019 | Zhang et al. |
| 10,472,571 B2 | 11/2019 | Zhang et al. |
| 10,950,895 B2 | 3/2021 | Oh et al. |
| 2007/0243470 A1 | 10/2007 | Yamamoto et al. |

(Continued)

FOREIGN PATENT DOCUMENTS

| | | |
|---|---|---|
| CN | 107978794 A | 5/2018 |
| JP | 2000 294281 A1 | 10/2000 |

(Continued)

OTHER PUBLICATIONS

International Search Report and Written Opinion issued for International Application No. PCT/US2020/013363 dated May 7, 2020.

(Continued)

*Primary Examiner* — Haixia Zhang
(74) *Attorney, Agent, or Firm* — Klarquist Sparkman, LLP

(57) ABSTRACT

Localized superconcentrated electrolytes (LSEs) and electrochemical devices including the LSEs are disclosed. The LSE includes an active salt, a solvent in which the active salt is soluble, and a diluent in which the active salt is insoluble or poorly soluble, wherein the diluent includes a fluorinated orthoformate.

19 Claims, 34 Drawing Sheets

(56) References Cited

U.S. PATENT DOCUMENTS

| | | | |
|---|---|---|---|
| 2010/0209782 A1 | 8/2010 | Choi et al. | |
| 2011/0111308 A1 | 5/2011 | Halalay et al. | |
| 2011/0159329 A1* | 6/2011 | Tsujikawa | H01M 10/0525 429/94 |
| 2011/0200855 A1 | 8/2011 | Yamada et al. | |
| 2011/0200885 A1* | 8/2011 | Yamada | H01M 50/40 429/306 |
| 2012/0141883 A1 | 6/2012 | Smart et al. | |
| 2012/0214073 A1 | 8/2012 | Iwaya et al. | |
| 2014/0038062 A1 | 2/2014 | Kawakami et al. | |
| 2014/0125292 A1 | 5/2014 | Best et al. | |
| 2014/0342249 A1 | 11/2014 | He et al. | |
| 2015/0364801 A1 | 12/2015 | Wijaya et al. | |
| 2016/0020489 A1 | 1/2016 | Rhodes et al. | |
| 2016/0240896 A1 | 8/2016 | Zhang et al. | |
| 2016/0254567 A1 | 9/2016 | Cai et al. | |
| 2016/0294005 A1 | 10/2016 | Lee et al. | |
| 2016/0329567 A1 | 11/2016 | Lee et al. | |
| 2016/0344063 A1 | 11/2016 | Chang et al. | |
| 2016/0380314 A1 | 12/2016 | Yang et al. | |
| 2017/0062829 A1 | 3/2017 | Ryu et al. | |
| 2017/0098858 A1 | 4/2017 | Kim et al. | |
| 2017/0016291 A1 | 6/2017 | Katou et al. | |
| 2017/0331152 A1 | 11/2017 | Kim et al. | |
| 2018/0251681 A1 | 9/2018 | Zhang et al. | |
| 2018/0254524 A1 | 9/2018 | Zhang et al. | |
| 2018/0331393 A1 | 11/2018 | Cho et al. | |
| 2019/0123390 A1 | 4/2019 | Xu et al. | |
| 2019/0140322 A1 | 5/2019 | Ren et al. | |
| 2019/0148775 A1 | 5/2019 | Zhang et al. | |

FOREIGN PATENT DOCUMENTS

| | | |
|---|---|---|
| JP | 2002-27022 A | 9/2002 |
| JP | 2012-169138 A | 9/2012 |
| JP | 2017-168347 | 9/2017 |
| KR | 10-2012-0099013 | 9/2012 |
| KR | 10-2019-0050709 | 5/2019 |
| WO | WO 2015-158755 A1 | 10/2015 |
| WO | WO 2016/010090 A1 | 1/2016 |

OTHER PUBLICATIONS

Kasnatscheew et al., "Determining oxidative stability of battery electrolytes: validity of common electrochemical stability window (ESW) data and alternative strategies," *Physical Chemistry Chemical Physics* 2017, 19:16078-16086.

Li et al. "Atomic structure of sensitive battery materials and interfaces revealed by cryo-electron microscopy," *Science* 2017, 358:506-510.

Li et al., "Li+-Desolvation Dictating Lithium-Ion Battery Low-Temperature Performances," *ACS Appl. Mater. Interfaces* 2017, 9:18826, accepted manuscript, 21 pp.

Ren et al., "Enabling High-Voltage Lithium-Metal Batteries under Practical Conditions," *Joule* 2019, 3(7):1662-1676.

Zhang et al. "Advanced Electrolytes for Fast-Charging High-Voltage Lithium-Ion Batteries in Wide-Temperature Range," *Advanced Energy Mater.* 2020, 10:2000368.

Zhu et al., "Perfluoroalkyl-substituted ethylene carbonates: Novel electrolyte additives for high-voltage lithium-ion batteries," *J. of Power Sources* 2014, 246:184-191.

Chalasani et al., "Methylene ethylene carbonate: Novel additive to improve the high temperature performance of lithium ion batteries," *Journal of Power Sources* (Jun. 15, 2012) 208 (2012): 67-73.

Chen et al., "High-Voltage Lithium-Metal Batteries Enabled by Localized High-Concentration Electrolytes," *Advanced Materials* 2018, 30:1706102, 7 pp.

Ding et al., "Effects of Carbonate Solvents and Lithium Salts on Morphology and Coulombic Efficiency of Lithium Electrode," *Journal of the Electrochemical Society* (Sep. 4, 2013). 160(10):A1894-A1901.

Doi, et al., "Dilution of Highly Concentrated $LiBF_4$-Propylene Carbonate Electrolyte Solution with Fluoroalkyl Ethers for 5-V $LiNi_{0.5}Mn_{1.5}O_4$ Positive Electrodes," *Journal of the Electrochemical Society*, (Jan. 24, 2017). 164(1): A6412-A6416.

Dokko et al., "Solvate Ionic Liquid Electrolyte for Li—S Batteries," *Journal of the Electrochemical Society*, (Jun. 6, 2013). 160: A1304-A1310.

Hyung et al., "Flame-retardant additives for lithium-ion batteries," *Journal of Power Sources* (2003) 119-121 383-387.

International Search Report and Written Opinion, dated Nov. 27, 2017, issued in International Application No. PCT/US2017/033391.

International Search Report and Written Opinion, dated Jan. 2, 2019, issued in International Application No. PCT/US2018/049141.

Lee et al., "A novel flame-retardant additive for lithium batteries," *Electrochemical and Solid-State Letters*, (Dec. 16, 1999) 3(2): 63-65.

Matsumoto et al., "A highly safe battery with a non-flammable triethyl-phosphate-based electrolyte," *Journal of Power Sources* (Oct. 2, 2014) 273: 954-958.

Office action dated Jan. 18, 2019, for U.S. Appl. No. 15/599,298, 11 pp.

Office action dated Apr. 26, 2019, for U.S. Appl. No. 15/788,188, 17 pp.

Qian et al., "High rate and stable cycling of lithium metal anode," *Nature Communications* (Feb. 20, 2015), pp. 1-9.

Shiga et al., "Self-extinguishing electrolytes using fluorinated alkyl phosphates for lithium batteries," *Journal of Materials Chemistry A* (Feb. 8, 2017) 5: 5156-5162.

Shigematsu et al., "Thermal behavior of charged graphite and $LixCoO_2$ in electrolytes containing alkyl phosphate for lithium-ion cells," *Journal of the Electrochemical Society* (Jan. 9, 2009) 156(3): A176-A180.

Shim et al., "Electrochemical performance of lithium-ion batteries with triphenylphosphate as a flame-retardant additive," *Journal of Power Sources* (May 10, 2007) 172:919-924.

Smart et al., "The Evaluation of Triphenyl Phosphate as a Flame Retardant Additive to Improve the Safety of Lithium-Ion Battery Electrolytes," *ECS Transactions* (2011) 35(13): 1-11.

Smith et al., "Lithium-Ion Electrolytes Containing Flame-Retardant Additives for Increased Safety Characteristics," *ECS Transactions* (2009) 16(35): 33-41.

Suo et al., "'Water-in-salt' electrolyte enables high-voltage aqueous lithium-ion chemistries," *Science*, (Nov. 20, 2015). 350(6263): 938-944.

Wang et al., "Fire-extinguishing organic electrolytes for safe batteries," *Nature Energy* (Jan. 2018) 3(1), 22-29.

Wang et al., "Nonflammable trimethyl phosphate solvent-containing electrolytes for lithium-ion batteries: I. Fundamental Properties," *Journal of the Electrochemical Society*, (Aug. 24, 2001) 148(10): A1058-A1065.

Wang et al., "Nonflammable trimethyl phosphate solvent-containing electrolytes for lithium-ion Batteries: II. The Use of an Amorphous Carbon Anode," *Journal of the Electrochemical Society*, (Aug. 24, 2001) 148(10): A1066-A1071.

Wang et al., "Superconcentrated electrolytes for a high-voltage lithium-ion battery," *Nature Communications*, (Jun. 29, 2016). 12032: 1-9.

Xiang et al., "Dimethyl methylphosphonate (DMMP) as an efficient flame retardant additive for the lithium-ion battery electrolytes," *Journal of Power Sources* (May 6, 2007) 173: 562-564.

Xu et al., "An Attempt to Formulate Nonflammable Lithium Ion Electrolytes with Alkyl Phosphates and Phosphazenes," *Journal of the Electrochemical Society* (Apr. 2, 2002) 149(5): A622-A626.

Xu et al., Lithium metal anodes for rechargeable batteries, *Energy & Environmental Science*, (2014). 7:513-537.

Xu et al., "Nonflammable Electrolytes for Li-Ion Batteries Based on a Fluorinated Phosphate," *Journal of the Electrochemical Society* (Jul. 2, 2002) 149(8): A1079-1082.

Yamada et al., "Review—Superconcentrated Electrolytes for Lithium Batteries," *Journal of the Electrochemical Society*, (Oct. 9, 2015). 162(14): A2406-A2423.

(56) References Cited

OTHER PUBLICATIONS

Yao et al., "Comparative study of trimethyl phosphite and trimethyl phosphate as electrolyte additives in lithium ion batteries," *Journal of Power Sources* (2005) 144: 170-175.
Zhang, "Li Metal Anodes and Li Metal Batteries," presented at The 3rd International Forum on Cathode & Anode Materials for Advanced Batteries, Apr. 14-15, 2017, 21 pp.
Zhang et al., "Tris (2,2,2-trifluoroethyl) phosphite as a co-solvent for nonflammable electrolytes in Li-ion batteries," *Journal of Power Sources* (2003) 113: 166-172.
Zheng et al., "Electrolyte additive enabled fast charging and stable cycling lithium metal batteries," *Nature Energy*, (Feb. 27, 2017). 2: 1-8.
International Search Report and Written Opinion issued for International Application No. PCT/US2019/062276 dated Mar. 13, 2020.
Office Action dated Feb. 5, 2020, for U.S. Appl. No. 16/119,641, 20 pp.
Extended European Search Report, dated Nov. 23, 2020, issued in European Patent Application No. EP 17 89 8487.
International Search Report and Written Opinion, dated Apr. 27, 2021, issued in International Application No. PCT/US2021/012685, 9 pages.

\* cited by examiner

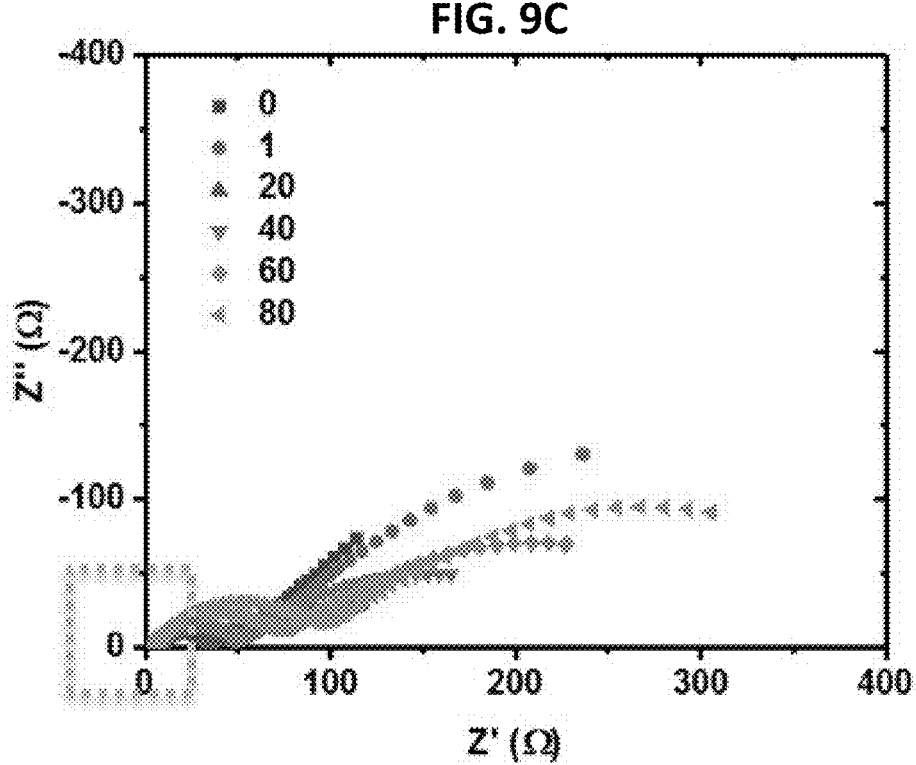
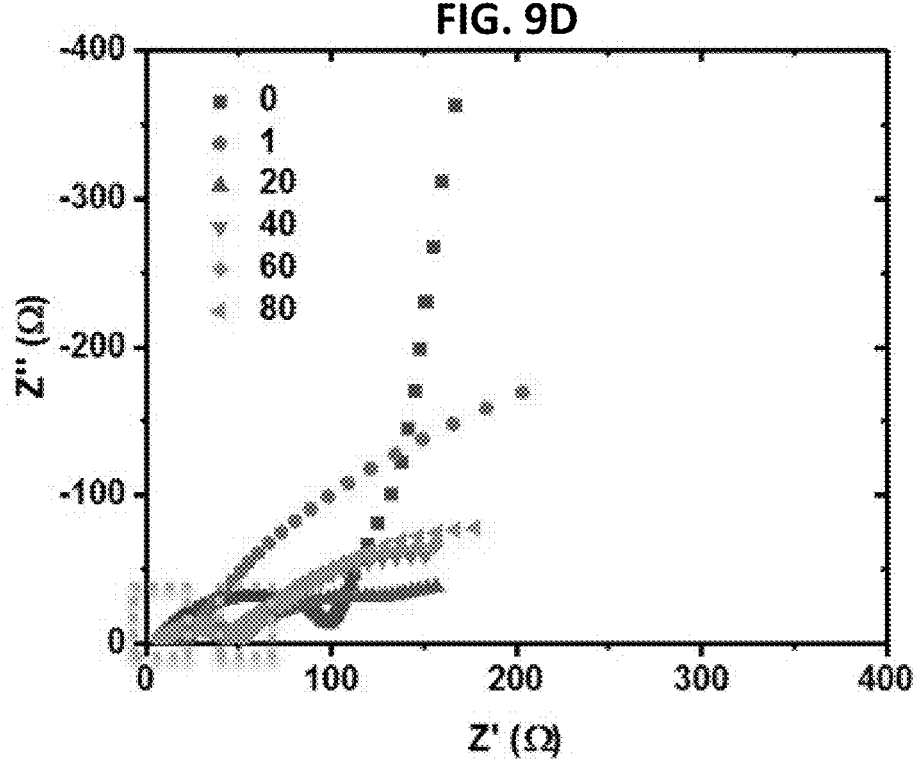

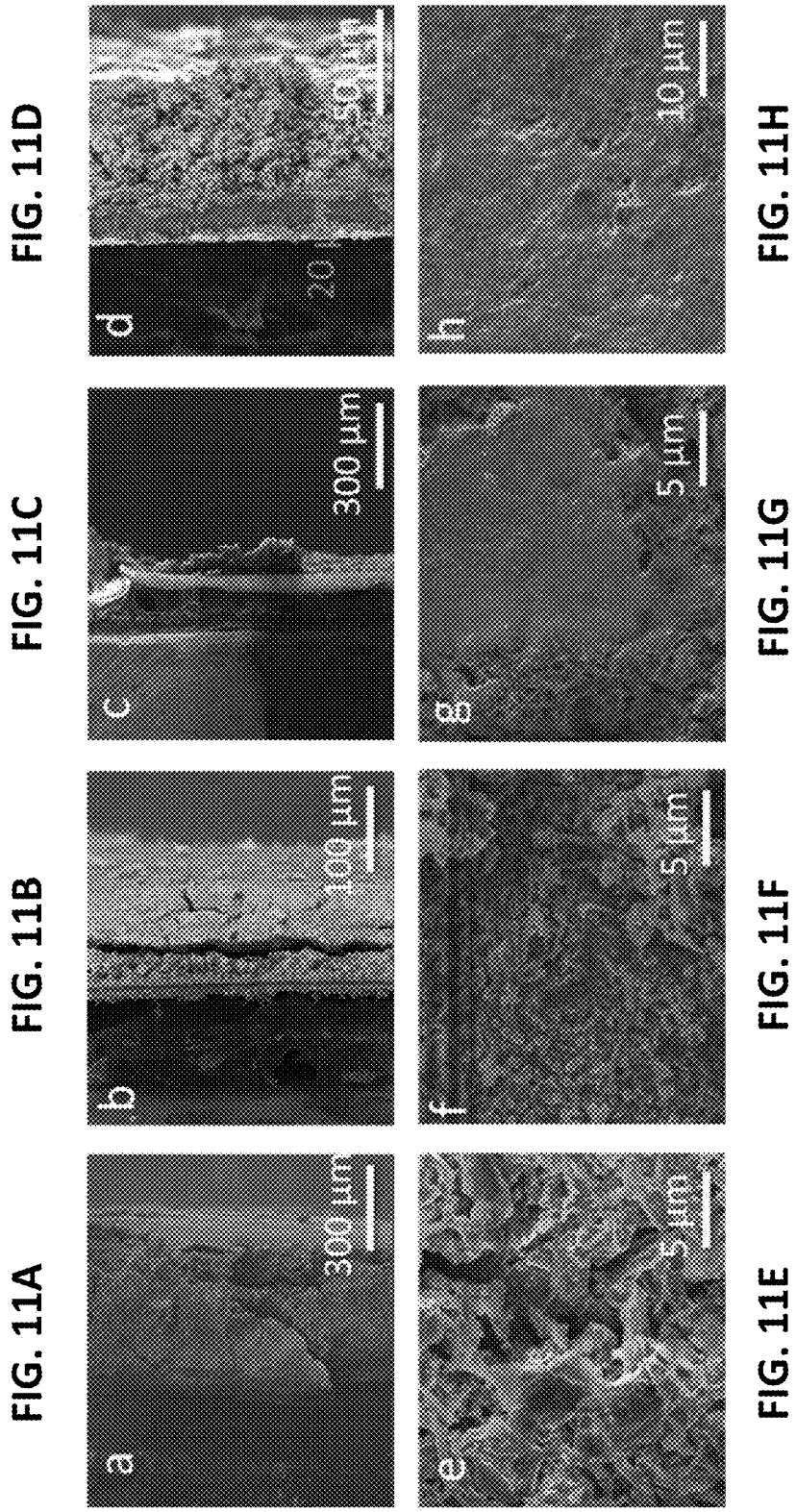

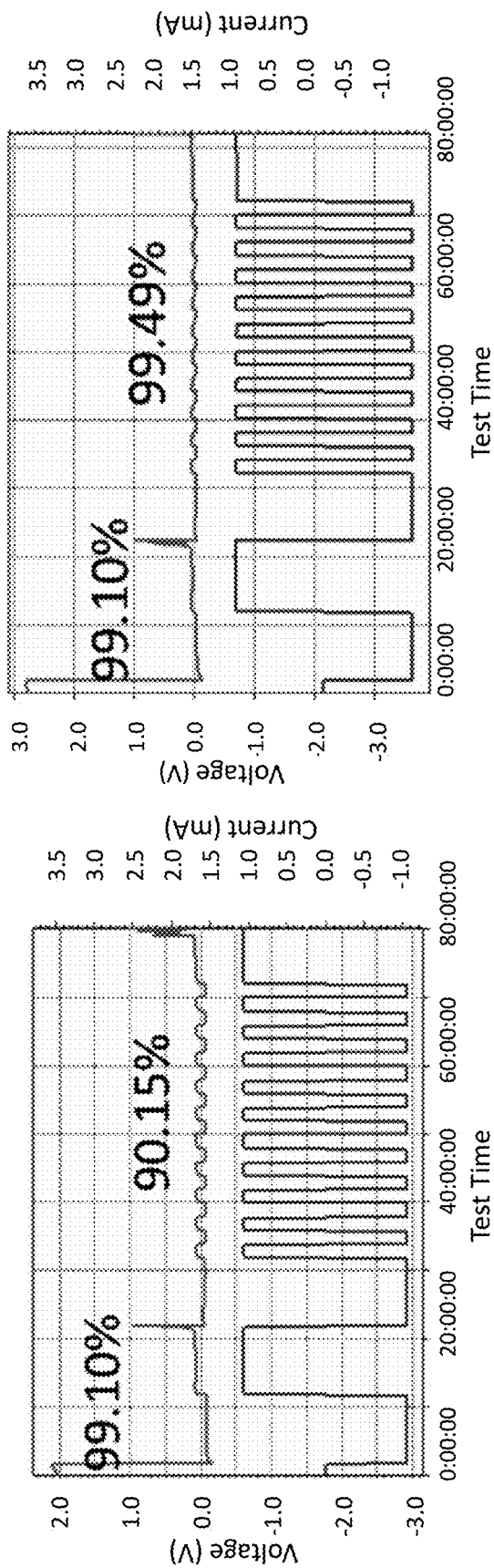
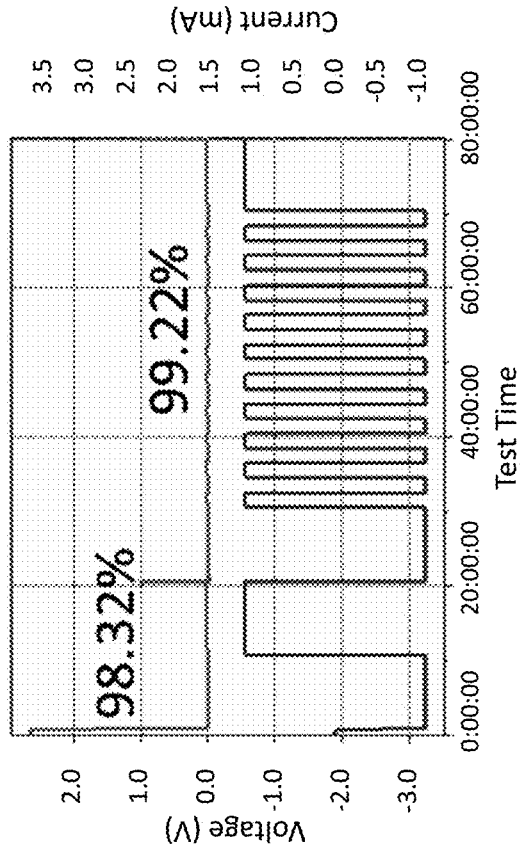
FIG. 20A
FIG. 20B
FIG. 20C

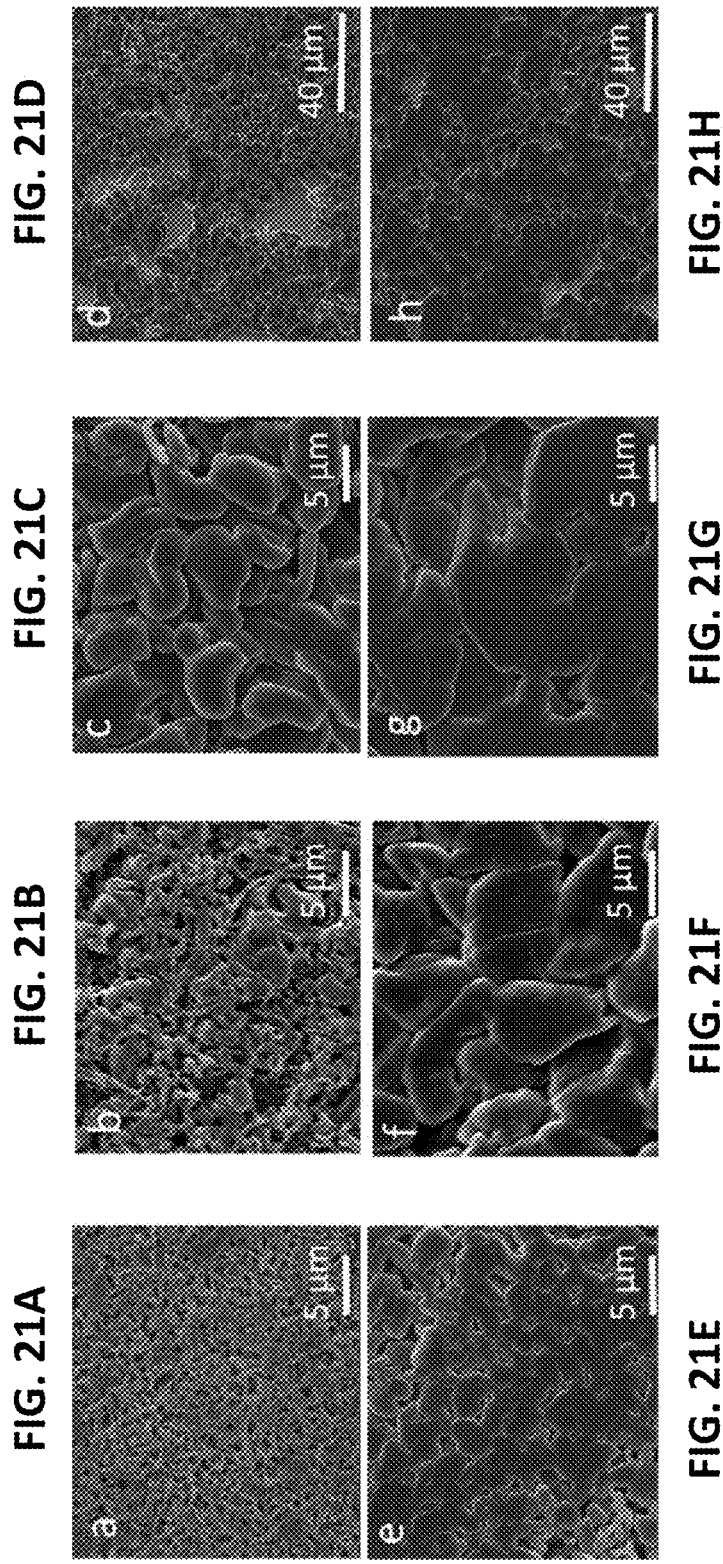

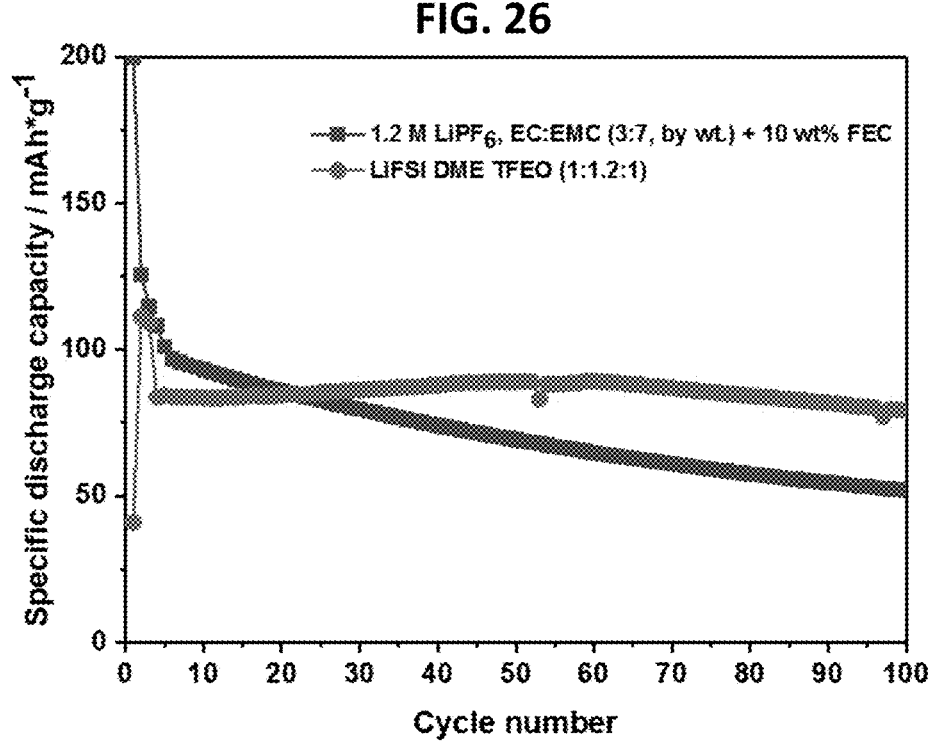

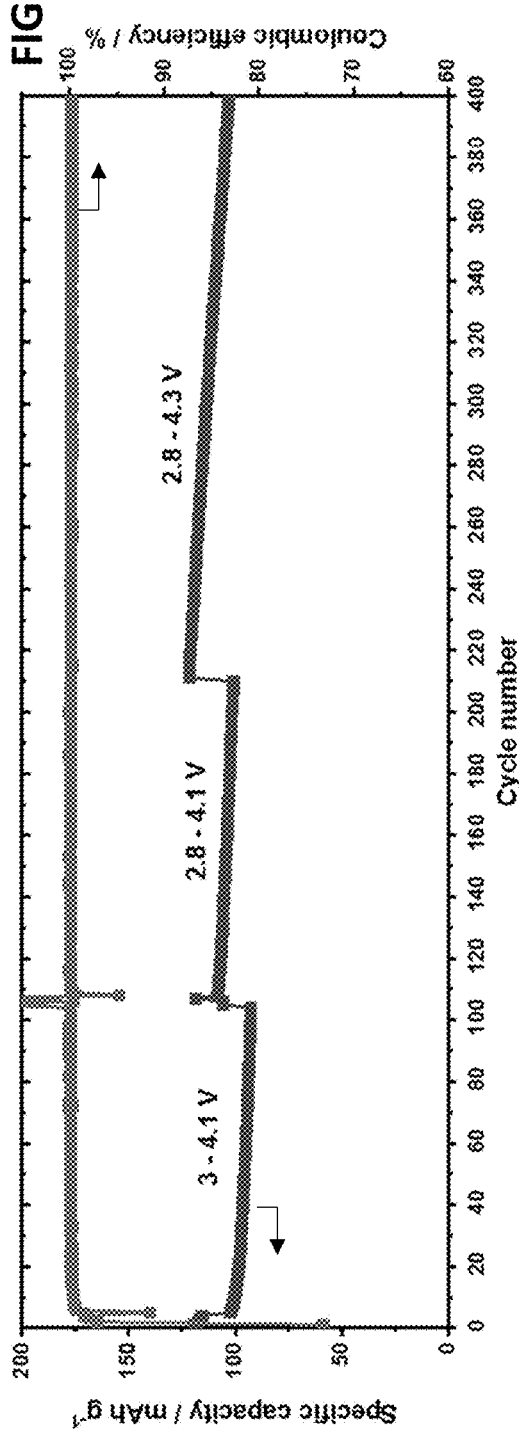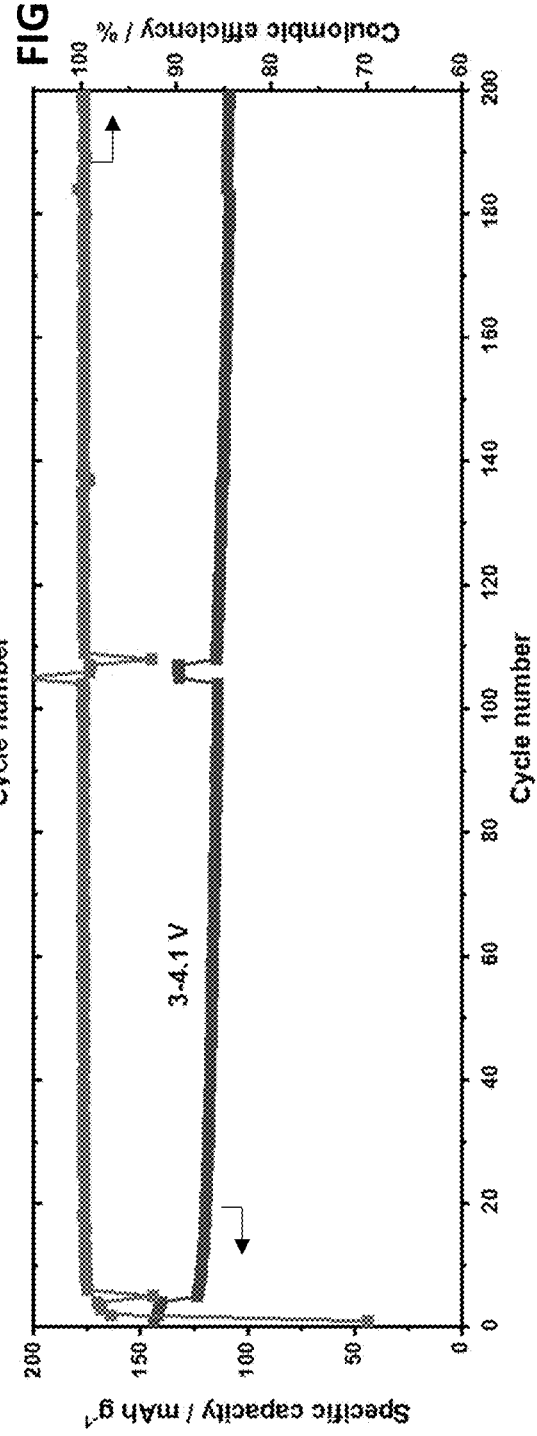

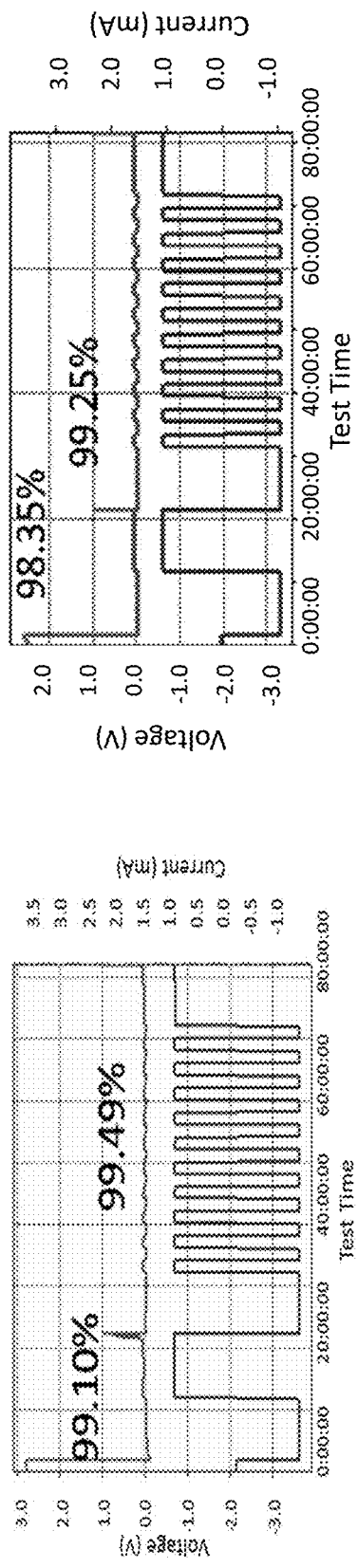
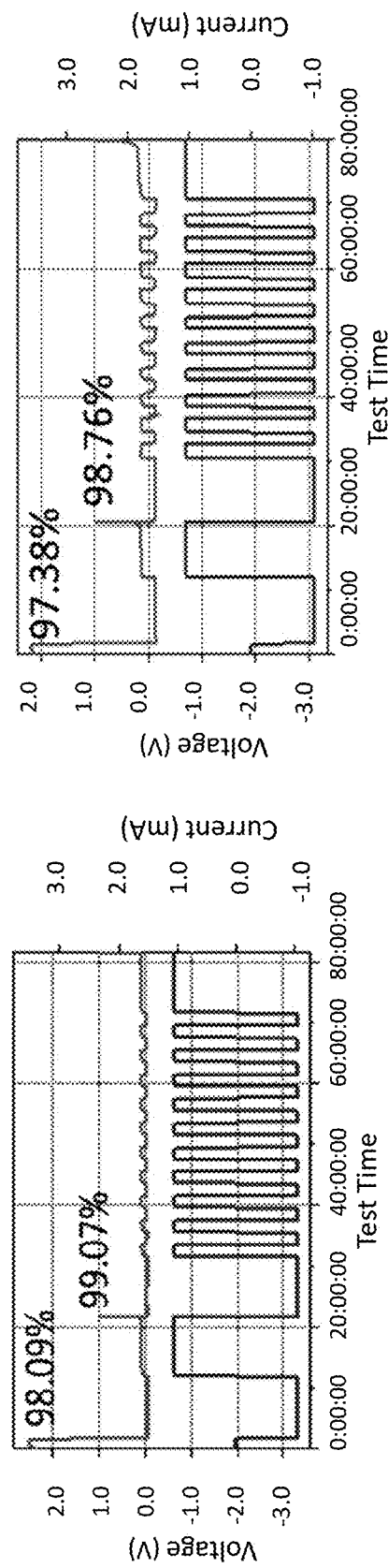

FIG. 30A
FIG. 30B
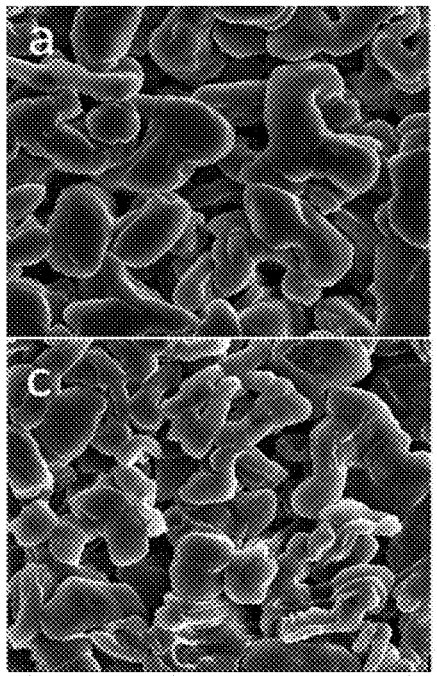
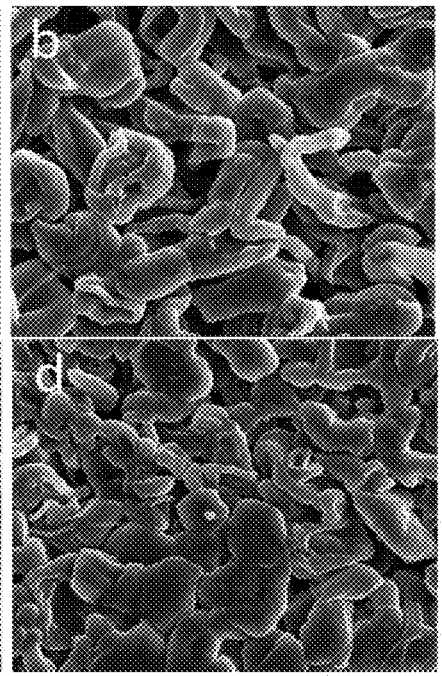
FIG. 30C
FIG. 30D
FIG. 31
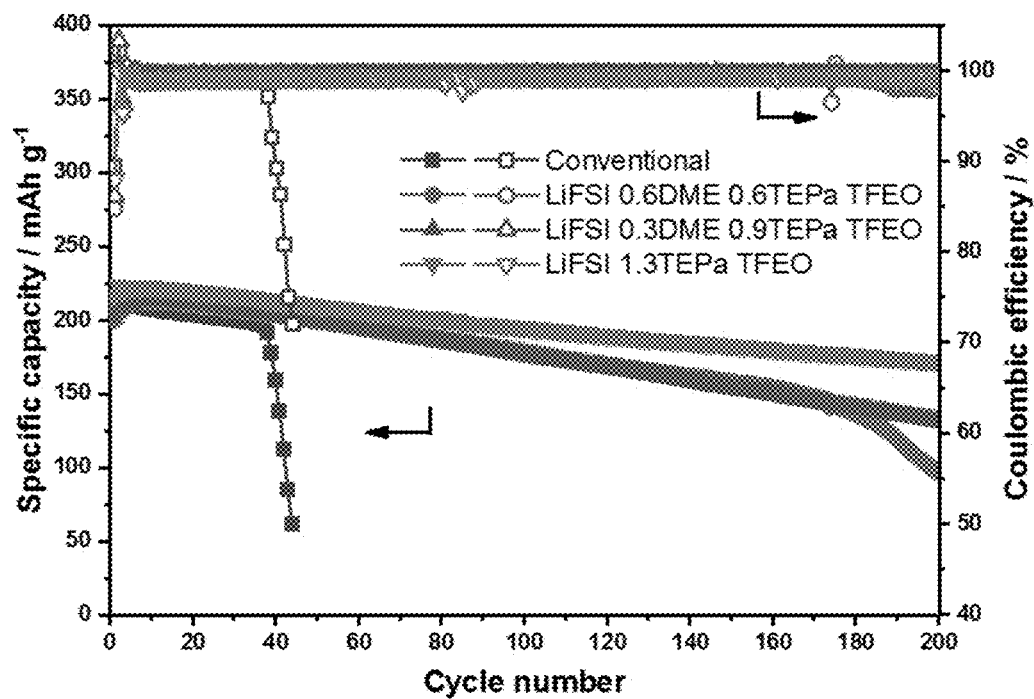

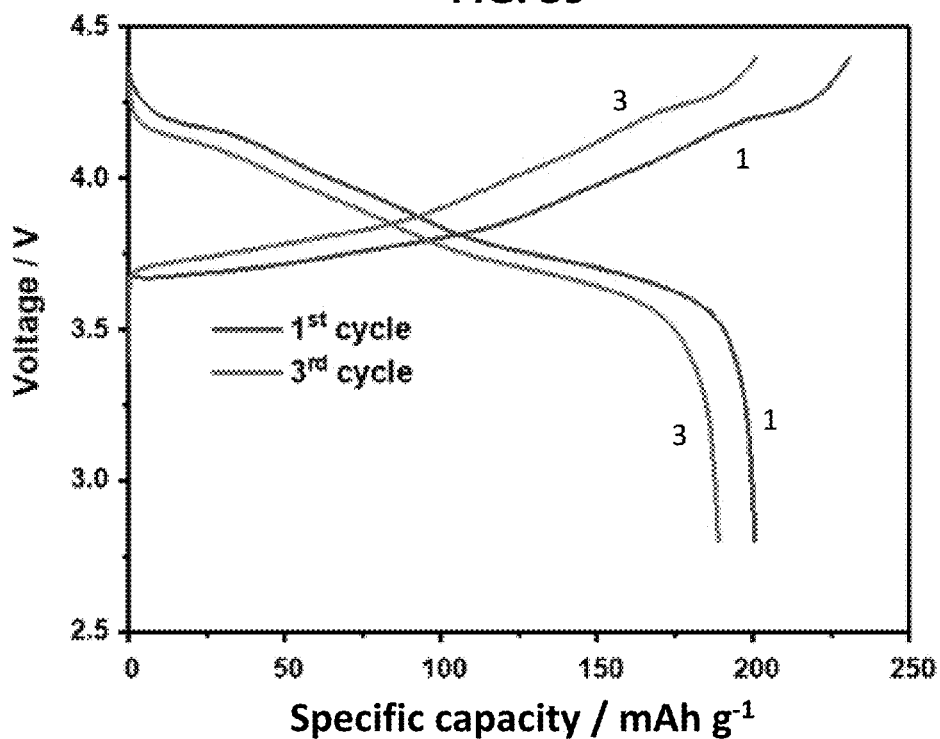
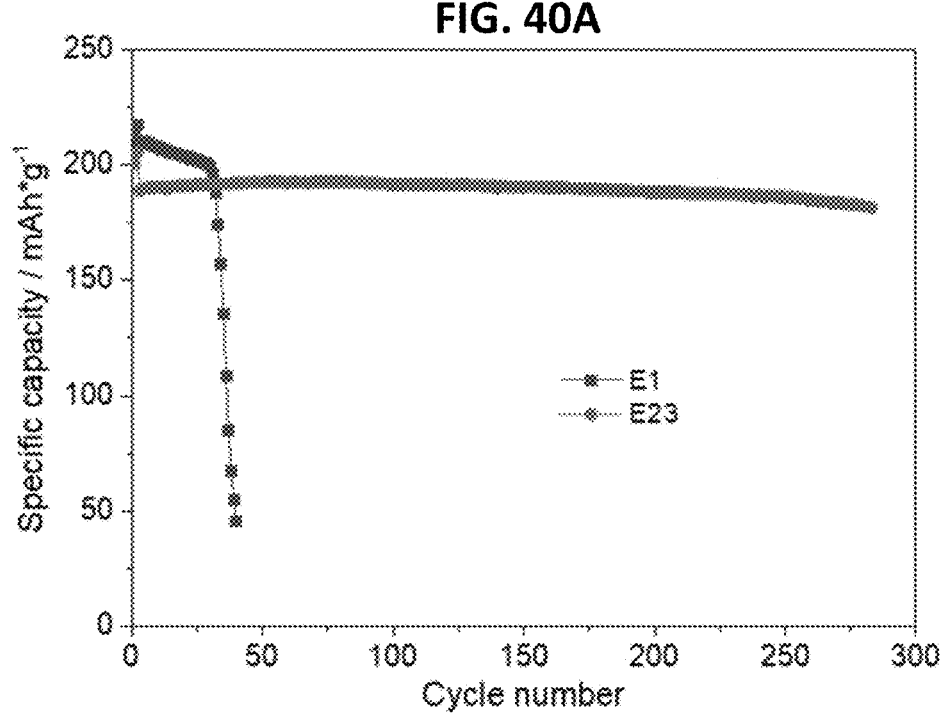

ELECTROLYTE FOR STABLE CYCLING OF RECHARGEABLE ALKALI METAL AND ALKALI ION BATTERIES

CROSS-REFERENCE TO RELATED APPLICATIONS

This application claims the benefit of the earlier filing date of U.S. Provisional Application No. 62/770,696, filed Nov. 21, 2018, which is incorporated by reference in its entirety herein.

ACKNOWLEDGMENT OF GOVERNMENT SUPPORT

This invention was made with Government support under Contract No. DE-AC05-76RL01830 awarded by the U.S. Department of Energy. The Government has certain rights in the invention.

FIELD

This invention is directed to electrolytes for stable operation of electrochemical devices, certain embodiments of the electrolytes including an active salt, a solvent in which the active salt is soluble, and a diluent in which the active salt is insoluble or poorly soluble, wherein the diluent is a fluorinated orthoformate.

SUMMARY

Embodiments of localized superconcentrated electrolytes (LSEs) (also referred to localized high concentration electrolytes (LHCEs)) and devices including the LSEs are disclosed. Embodiments of an LSE include an active salt, a solvent in which the active salt is soluble, and a diluent in which the active salt is insoluble or poorly soluble.

In some embodiments, an LSE comprises (i) an active salt; (ii) a solvent comprising an ether, a carbonate, a sulfone, an ester, a lactone, a sulfoxide, water, a flame retardant compound, a nitrile, or any combination thereof, wherein the active salt is soluble in the solvent; and (iii) a diluent comprising a fluorinated orthoformate, wherein the active salt has a solubility in the diluent at least 10 times less than a solubility of the active salt in the solvent. The diluent may be tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl)methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

In any or all embodiments, the solvent may comprise 1,2-dimethoxyethane (DME), diethylene glycol dimethyl ether (DEGDME, or diglyme), triethylene glycol dimethyl ether (triglyme), tetraethylene glycol dimethyl ether (tetraglyme), 1,3-dioxolane (DOL), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (VEC), 4-methylene-1,3-dioxolan-2-one (also called methylene ethylene carbonate (MEC)), 4,5-dimethylene-1,3-dioxolan-2-one, dimethyl sulfone (DMS), ethyl methyl sulfone (EMS), ethyl vinyl sulfone (EVS), tetramethylene sulfone (TMS, also called sulfolane), methyl butyrate, ethyl propionate, trimethyl phosphate, triethyl phosphate, gamma-butyrolactone, triallyl amine, triallyl cyanurate, triallyl isocyanurate, dimethyl sulfoxide (DMSO), water, acetonitrile, or any combination thereof. In some embodiments, the solvent comprises, or further comprises, a flame retardant compound. The flame retardant may be trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

In any or all embodiments, the active salt may comprise a lithium salt or lithium salts mixture, a sodium salt or sodium salts mixture, a potassium salt or potassium salts mixture, or a magnesium salt or magnesium salts mixture. In some embodiments, the active salt comprises lithium bis(fluorosulfonyl)imide (LiFSI), lithium bis(trifluoromethanesulfonyl)imide (LiTFSI), lithium (fluorosulfonyl trifluoromethanesulfonyl)imide (LiFTFSI), lithium bis(pentafluoroethanesulfonyl)imide (LiBETI), lithium bis(oxalato)borate (LiBOB), $LiPF_6$, $LiAsF_6$, $LiBF_4$, $LiCF_3SO_3$, $LiClO_4$, lithium difluoro oxalato borate anion (LiDFOB), LiI, LiBr, LiCl, LiSCN, $LiNO_3$, $LiNO_2$, $Li_2SO_4$, sodium bis(fluorosulfonyl)imide (NaFSI), sodium bis(trifluoromethylsulfonyl)imide (NaTFSI), sodium bis(pentafluoroethanesulfonyl)imide (NaBETI), $NaPF_6$, $NaAsF_6$, $NaBF_4$, $NaCF_3SO_3$, $NaClO_4$, sodium bis(oxalato)borate (NaBOB), sodium difluoro oxalato borate anion (NaDFOB), or any combination thereof.

In some embodiments, the solvent and the diluent are immiscible, and the electrolyte further includes a bridge solvent having a different composition than the solvent and a different composition than the diluent, wherein the bridge solvent is miscible with the solvent and with the diluent. In some embodiments, the bridge solvent comprises acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), or any combination thereof.

Embodiments of a battery include an electrolyte as disclosed herein, an anode, and a cathode. The battery may have a coulombic efficiency 95%. In some embodiments, the anode comprises an alkali metal, carbon, silicon, a carbon/silicon composite, tin, or antimony, or an anode current collector in the absence of an active anode.

The foregoing and other objects, features, and advantages of the invention will become more apparent from the following detailed description, which proceeds with reference to the accompanying figures.

BRIEF DESCRIPTION OF THE DRAWINGS

FIGS. 9A-9F show the impedance evolution in Li∥NMC811 cells over time of a control electrolyte (1M LiPF$_6$ in EC/EMC (3/7 by wt)+2 wt % VC) (FIG. 9A), two LiFSI-DME electrolytes (1M LiFSI in DME (FIG. 9B); LiFSI in DME (1:1.2 molar ratio) (FIG. 9C)), and three LiFSI-DME-TFEO electrolytes at different molar ratios—1:1.2:1 (FIG. 9D), 1:1.2:2 (FIG. 9E), 1:1.2:3 (FIG. 9F). The Li∥NMC811 cells were prepared with 1.5 mAh cm$^{-2}$ NMC811 and 50 μm Li, and were charged/discharged at C/3 after two formation cycles at C/10.

FIGS. 11A-11H are SEM images showing cross-section views (11A-11D) and top views (11E-11H) of Li metal anodes after cell failure with 1M LiPF$_6$ in EC/EMC (3/7 by wt)+2 wt % VC (FIGS. 11A, 11E), 1M LiFSI in DME (FIGS. 11B, 11F), and LiFSI in DME (1:1.2 molar ratio) (FIGS. 11C, 11G), and after 170 cycles with LiFSI-DME-TFEO (1:1.2:1 molar ratio) (FIGS. 11D, 11H). The Li∥NMC811 cells were prepared with 4.2 mAh cm$^{-2}$ NMC811 and 50 μm Li, and were charged/discharged at C/3 after two formation cycles at C/10.

FIGS. 20A-20C show the polarization and coulombic efficiency of LiFSI-DME-TFEO (1:1.2:1 molar ratio) in Li∥Cu cells at 5° C., 30° C., and 55° C., respectively, over a timeframe of 80 hours.

FIGS. 21A-21H are SEM images, top views, of Li deposition in 1M LiPF$_6$ in EC/EMC (3/7 by wt)+2 wt % VC at 5° C. (FIG. 21A), 30° C. (FIG. 21B), and 55° C. (FIGS. 21C, 21D), and of Li deposition in LiFSI-DME-TFEO (1:1.2:1 molar ratio) at 5° C. (FIG. 21E), 30° C. (FIG. 21F), and 55° C. (FIGS. 21G, 21H). The SEM images of Li deposits were obtained by plating 1 mAh cm$^{-2}$ Li on a Cu substrate at a current density of 0.5 mA cm$^{-2}$.

FIG. 23A shows results with varying charge rates and a constant discharge rate of C/3; FIG. 23B shows results with a constant charge rate of C/3 and varying discharge rates. The Li∥NMC811 cells were prepared with 1.5 mAh cm$^{-2}$ NMC811 and a 50 μm Li anode, and were charged and discharged after two formation cycles at C/10.

FIG. 24A shows results with varying charge rates and a constant discharge rate of C/3; FIG. 24B shows results with a constant charge rate of C/3 and varying discharge rates. The Li∥NMC811 cells were prepared with 1.5 mAh cm$^{-2}$ NMC811 and a 50 μm Li anode, and were charged and discharged after two formation cycles at C/10.

FIG. 25A shows results with varying charge rates and a constant discharge rate of C/3; FIG. 25B shows results with a constant charge rate of C/3 and varying discharge rates. The Li∥NMC811 cells were prepared with 1.5 mAh cm$^{-2}$ NMC811 and a 50 μm Li anode, and were charged and discharged after two formation cycles at C/10.

FIG. 26 is a graph showing Si/Gr∥NMC532 cell cycling performance with a control electrolyte, 1.2 M LiPF$_6$ EC/EMC (3/7 by wt)+10 wt % FEC, and with LiFSI-DME-TFEO (1:1.2:1 molar ratio). The cells were prepared with 1.4 mAh cm$^{-2}$ NMC532 cathode and a Si/Gr anode and were charged at C/3 and discharged at C/2 after two formation cycles at C/10.

FIG. 27 is a graph showing Si/Gr∥NMC333 cell cycling performance with LiFSI-DME-TFEO (1:1.2:3 molar ratio) over various voltage ranges. The cell was prepared with 1.4 mAh cm$^{-2}$ NMC333 cathode and a Si/Gr anode and was charged at C/3 and discharged at C/2 after two formation cycles at C/10.

FIG. 28 is a graph showing Si/Gr∥NMC811 cell cycling performance with LiFSI-DME-TFEO (1:1.2:3 molar ratio) over various voltage ranges. The cell was prepared with 1.7 mAh cm$^{-2}$ NMC811 cathode and a Si/Gr anode and was charged at C/3 and discharged at C/2 after two formation cycles at C/10.

FIGS. 29A-29D show the coulombic efficiencies and polarization of LiFSI DME TFEO (1:1.2:1 molar ratio) (FIG. 29A), LiFSI DME TEPa TFEO (1:0.6:0.6:1 molar ratio) (FIG. 29B), LiFSI DME TEPa TFEO (1:0.3:0.9:1 molar ratio) (FIG. 29C), and LiFSI TEPa TFEO (1:1.3:1 molar ratio) (FIG. 29D) when cycled in Li∥Cu cells at 30° C. over a time period of 80 hours.

FIGS. 30A-30D are top-view SEM images of Li deposited with the electrolytes, respectively, of FIGS. 29A-29D. The images were obtained by plating 1 mAh cm$^{-2}$ Li on a Cu substrate at a current density of 0.5 mA cm$^{-2}$.

FIG. 31 is a graph showing Li∥NMC811 cell cycling performance in several LiFSI-DME-TEPa-TFEO electrolytes. The Li∥NMC811 cells were prepared with 1.5 mAh cm$^{-2}$ NMC811 and a 50 μm Li anode, and were charged/discharged at C/3 after two formation cycles at C/10.

FIG. 39 shows charge-discharge curves of a Cu∥LiNi$_{0.8}$Mn$_{0.1}$Co$_{0.1}$O$_2$ (NMC811) cell with a LiFSI-DME-TDFEO (1:1.2:3 molar ratio) electrolyte. The cell was prepared with 1.5 mAh cm$^{-2}$ NMC811, and was charged/discharged at C/3 after two formation cycles at C/10.

FIGS. 40A and 40B show cycling performance of the Li∥NMC811 cells of FIG. 39 with the LiFSI-DME-TDFEO electrolyte and with the baseline E1 electrolyte (1M LiPF$_6$ in EC/EMC (3/7 by wt) +2 wt % VC). FIG. 40A shows specific capacity and FIG. 40B shows coulombic efficiency.

DETAILED DESCRIPTION

Figure 1:
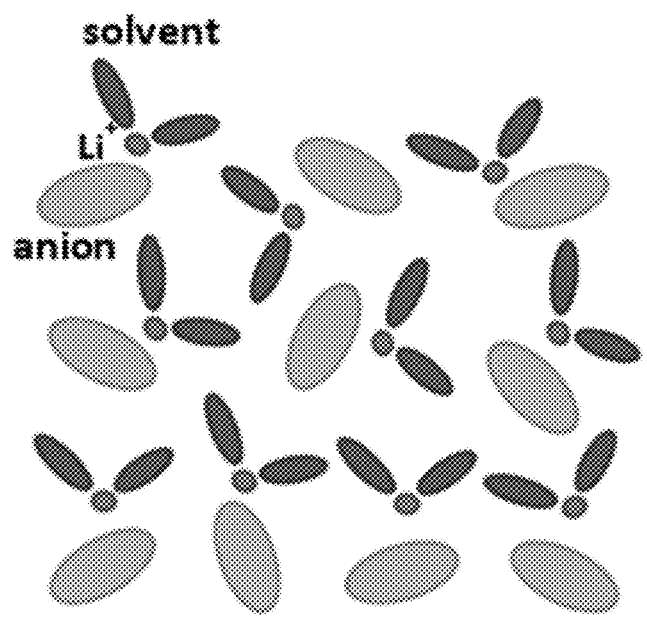
FIG. 1 is a schematic illustration of a superconcentrated electrolyte (SE) comprising a lithium salt and a solvent.

Embodiments of localized superconcentrated electrolytes (LSEs) and devices including the LSEs are disclosed. The LSE includes an active salt, a solvent, and a diluent comprising a fluorinated orthoformate, wherein the active salt has a solubility in the diluent at least 10 times less than a solubility of the active salt in the solvent. The solvent may include a flame retardant compound.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

To facilitate review of the various embodiments of the disclosure, the following explanations of specific terms are provided:

Active salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox active materials participating in redox reactions during battery cycling after initial charging.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced. For the purposes of this disclosure, "anode-free" refers to an initial, or uncharged, cell configuration in which only an anode current collector is present with no electrochemically active material.

Associated: As used here, the term "associated" means coordinated to or solvated by. For example, a cation that is associated with a solvent molecule is coordinated to or solvated by the solvent molecule. Solvation is the attraction of solvent molecules with molecules or ions of a solute. The association may be due to electronic interactions (e.g., ion-dipole interactions and/or van der Waals forces) between the cation and the solvent molecule. Coordination refers to formation of one or more coordination bonds between a cation and electron lone-pairs of solvent atoms. Coordination bonds also may form between the cation and anion of the solute.

Bridge solvent: A solvent having amphiphilic molecules with a polar end or moiety and a nonpolar end or moiety.

BTFE: bis(2,2,2-trifluoroethyl) ether

BTFEMO: bis(2,2,2-trifluoroethyl) methyl orthoformate

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. Areal capacity or specific areal capacity is the capacity per unit area of the electrode (or active material) surface, and is typically expressed in united of mAh cm$^{-2}$.

Carbon/silicon composite: As used herein, the term carbon/silicon composite refers to a material including both carbon (such as graphite and/or hard carbon) and silicon. A composite material is made from two or more constituent materials that, when combined, produce a material with characteristics different than those of the individual components. Carbon/silicon composites may be prepared, for example, by pyrolysis of pitch embedded with graphite and silicon powders (see, e.g., Wen et al., *Electrochem Comm* 2003, 5(2):165-168).

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

CEI: cathode electrolyte interphase

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Conversion compound: A compound comprising one or more cations, which are displaced by another metal when a battery is discharged. For example, when iron (II) selenide (FeSe) is used as a cathode material, Fe is replaced by Na during discharge of a Na battery:

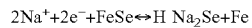

Cosolvent: A solvent that, in conjunction with another solvent, dissolves a solute.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li‖Cu or Na‖Cu cells may be defined as the amount of charge flowing out of the battery during stripping process divided by the amount of charge entering the battery during plating process.

DEC: diethyl carbonate
DFEC: difluoroethylene carbonate
DMC: dimethyl carbonate
DME: 1,2-dimethoxyethane
DMS: dimethyl sulfone
DMSO: dimethyl sulfoxide
DOL: 1,3-dioxolane
EC: ethylene carbonate Electrolyte: A substance containing free ions that behaves as an electrically conductive medium. Electrolytes generally comprise ions in a solution, but molten electrolytes and solid electrolytes also are known.

EMC: ethyl methyl carbonate
EMS: ethyl methyl sulfone
EOFB: ethoxynonafluorobutane
EVS: ethyl vinyl sulfone
FEC: fluoroethylene carbonate Flame retardant: As used herein, the term "flame retardant" refers to an agent incorporated into an electrolyte to reduce or eliminate its tendency to ignite during operation of an electrochemical device including the electrolyte.

Flammable: The term "flammable" refers to a material that will ignite easily and burn rapidly. As used herein, the term "non-flammable" means that an electrolyte, will not ignite or burn during operation of an electrochemical device including the electrolyte. As used herein, the terms "flame retarded" and "low flammability" are interchangeable and mean that a portion of the electrolyte may ignite under some conditions, but that any resulting ignition will not propagate throughout the electrolyte. Flammability can be measured by determining the self-extinguishing time (SET) of the electrolyte. The SET is determined by a modified Underwriters Laboratories test standard 94 HB. An electrolyte is immobilized on an inert ball wick, such as a ball wick having a diameter of ~0.3-0.5 cm, which is capable of absorbing 0.05-0.10 g electrolyte. The wick is then ignited, and the time for the flame to extinguish is recorded. The time is normalized against the sample weight. If the electrolyte does not catch flame, the SET is zero and the electrolyte is non-flammable. Electrolytes having an SET of <6 s/g (e.g., the flame extinguishes within ~0.5 s) are also considered non-flammable. If the SET is >20 s/g, the electrolyte is considered to be flammable. When the SET is between 6-20 s/g, the electrolyte is considered to be flame retarded or have low flammability.

FMES: trifluoromethyl ethyl sulfone
FMIS: trifluoromethyl isopropyl sulfone
FPMS: trifluoropropyl methyl sulfone Hard carbon: A non-graphitizable carbon material. At elevated temperatures (e.g., >1500° C.) a hard carbon remains substantially amorphous, whereas a "soft" carbon will undergo crystallization and become graphitic.

Immiscible: This term describes two substances of the same state of matter that cannot be uniformly mixed or blended. Oil and water are a common example of two immiscible liquids.

Intercalation: A term referring to the insertion of a material (e.g., an ion or molecule) into the microstructure of another material. For example, lithium ions can insert, or intercalate, into graphite (C) to form lithiated graphite ($LiC_6$).

KFSI: potassium bis(fluorosulfonyl)imide
KTFSI: potassium bis(trifluoromethanesulfonyl)imide
LiBETI: lithium bis(pentafluoroethanesulfonyl)imide
LiFSI: lithium bis(fluorosulfonyl)imide
LiFTFSI: lithium (fluorosulfonyl trifluoromethanesulfonyl)imide
LiTFSI: lithium bis(trifluoromethanesulfonyl)imide
LiBOB: lithium bis(oxalato)borate
LiDFOB: lithium difluoro oxalato borate anion
LSE: localized superconcentrated electrolyte
MEC: methylene ethylene carbonate (4-methylene-1,3-dioxolan-2-one)
MFEC: methyl 2,2,2-trifluoroethyl carbonate
MOFB: methoxynonafluorobutane
NaFSI: sodium bis(fluorosulfonyl)imide
NaTFSI: sodium bis(trifluoromethylsulfonyl)imide
NaBETI: sodium bis(pentafluoroethanesulfonyl)imide
NaBOB: sodium bis(oxalato)borate Nitrile: A compound that includes a —C≡N functional group.

Organophosphorus compound: An organic compound that contains phosphorus.

Orthoformate: An orthoformate compound is an orthoformic acid ester having a general formula

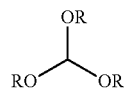

where each R independently is substituted or unsubstituted aliphatic. The aliphatic chain may be linear or branched. When the orthoformate is a fluorinated orthoformate, at least one R is a fluorinated aliphatic.

PC: propylene carbonate

Phosphate: As used herein, phosphate refers to an organophosphate having a general formula $P(=O)(OR)_3$ where each R independently is alkyl (e.g., $C_1$-$C_{10}$ alkyl) or aryl. Each alkyl or aryl group may be substituted or unsubstituted.

Phosphite: As used herein, phosphite refers to an organophosphite having a general formula $P(OR)_3$ or $HP(O)(OR)_2$ where each R independently is alkyl (e.g., $C_1$-$C_{10}$ alkyl) or aryl. Each alkyl or aryl group may be substituted or unsubstituted.

Phosphonate: A compound having a general formula $P(=O)(OR)_2(R')$ wherein each R and R' independently is alkyl (e.g., $C_1$-$C_{10}$ alkyl), or aryl. Each alkyl or aryl group may be substituted or unsubstituted.

Phosphoramide: A compound having a general formula $P(=O)(NR_2)_3$ or $P(=O)(NR_2)(OR')_2$ wherein each R independently is hydrogen, alkyl (e.g., $C_1$-$C_{10}$ alkyl), or alkoxy (e.g., $C_1$-$C_{10}$ alkoxy). At least one R is not hydrogen. Each alkyl or aryl group may be substituted or unsubstituted.

Phosphazene: A compound in which a phosphorus atom is covalently linked to a nitrogen atom or nitrogen-containing group by a double bond and to three other atoms or radicals by single bonds.

SEI: solid electrolyte interphase

Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that an active salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

Superconcentrated: As used herein, the term "superconcentrated electrolyte" refers to an electrolyte having a salt concentration of at least 3 M.

TDFEO: tris(2,2-difluoroethyl)orthoformate
TEPa: triethyl phosphate
TEPi: triethyl phosphite
TFEC: trifluoroethylene carbonate
TFEO: tris(2,2,2-trifluoroethyl)orthoformate
TFTE: 1,1,2,2,-tetrafluoroethyl-2,2,2-trifluoroethyl ether
THFiPO: tris(hexafluoroisopropyl)orthoformate
TMPa: trimethyl phosphate
TMPi: trimethyl phosphite
TMS: tetramethylene sulfone or sulfolane
TPFPO: tris(2,2,3,3,3-pentafluoropropyl)orthoformate
TTE: 1,1,2,2-tetrafluoroethyl-2,2,2,3-tetrafluoropropyl ether
TTPO: tris(2,2,3,3,3-tetrafluoropropyl)orthoformate
VC: vinylene carbonate
VEC: 4-vinyl-1,3-dioxolan-2-one or vinyl ethylene carbonate

II. Localized Superconcentrated Electrolytes

A conventional superconcentrated electrolyte comprises a solvent and a salt with a salt concentration of at least 3 M. Some superconcentrated electrolytes have a salt concentration of at least 4 M or at least 5 M. In certain instances, the salt molality may be up to 20 m or more, e.g., aqueous LiTFSI. FIG. 1 is a schematic illustration of a conventional superconcentrated electrolyte comprising a solvent and a lithium salt. Desirably, all or a large majority of the solvent molecules are associated with a lithium cation in the superconcentrated electrolyte. A reduced presence of free, unassociated solvent molecules increases coulombic efficiency (CE) of a lithium metal anode, facilitates formation of a stabilized SEI layer, and/or increases cycling stability of a battery including the electrolyte. However, most organic based superconcentrated electrolytes have disadvantages, such as flammability, high material cost, high viscosity, and/or poor wetting of battery separators and/or cathodes. While dilution with additional solvent can resolve one or more of the disadvantages, dilution results in free solvent molecules and often decreases CE, hinders formation of the stabilized SEI layer, and/or decreases cycling stability of a battery.

Figure 2:
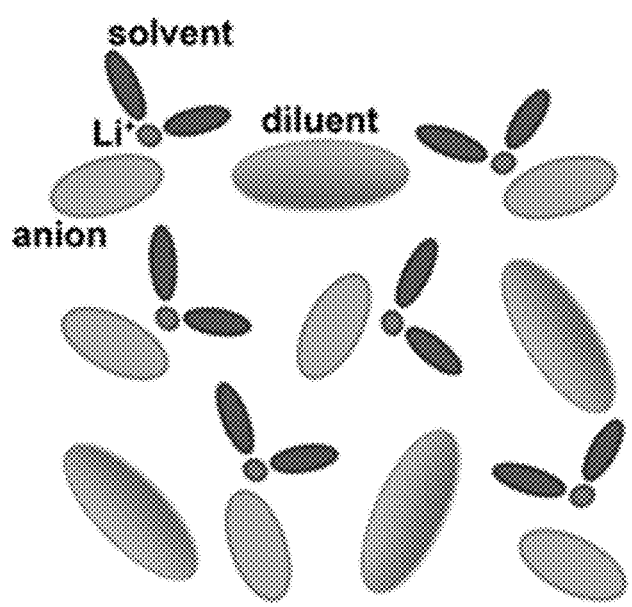
FIG. 2 is a schematic illustration of an exemplary localized superconcentrated electrolyte (LSE) comprising a lithium salt, a solvent in which the lithium salt is soluble, and a diluent, i.e., a component in which the lithium salt is insoluble or poorly soluble compared to the solvent.

Some embodiments of the disclosed "localized superconcentrated electrolytes" (LSEs) comprise a salt, a solvent in which the salt is soluble, and a diluent in which the salt is insoluble or poorly soluble. The LSEs can resolve some or all of the problems discussed above. FIG. 2 is a schematic illustration of an exemplary LSE including a lithium salt, a solvent in which the lithium salt is soluble, and a diluent in which the lithium salt is insoluble or poorly soluble. As shown in FIG. 2, the lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution.

Thus, although the electrolyte solution as a whole is less concentrated than the solution of FIG. 1, there are localized regions of high concentration where the lithium cations are associated with the solvent molecules. There are few to no free solvent molecules in the diluted electrolyte, thereby providing the benefits of a superconcentrated electrolyte without the associated disadvantages.

Some embodiments of the disclosed localized superconcentrated electrolytes (LSEs) comprise, consist essentially of, or consist of an active salt, a solvent A, wherein the active salt is soluble in the solvent A, and a diluent, wherein the active salt is insoluble or poorly soluble in the diluent. The diluent has a different chemical composition than the solvent. As used herein, "poorly soluble" means that the active salt has a solubility in the diluent at least 10× less than a solubility of the active salt in the solvent A. As used herein, "consist essentially of" means that the electrolyte does not include any component that materially affects the properties of the electrolyte. For example, other than the active salt, the LSE does not include any electrochemically active component (i.e., a component (an element, an ion, or a compound) that is capable of forming redox pairs having different oxidation and reduction states, e.g., ionic species with differing oxidation states or a metal cation and its corresponding neutral metal atom) in an amount sufficient to affect performance of the electrolyte and does not include a diluent in which the active salt is soluble.

The solubility of the active salt in the solvent A (in the absence of diluent) may be greater than 3 M, such as at least 4 M or at least 5 M. In some embodiments, the solubility and/or concentration of the active salt in the solvent A is within a range of from 3 M to 10 M, such as from 3 M to 8 M, from 4 M to 8 M, or from 5 M to 8 M. In certain embodiments, the concentration may be expressed in terms of molality and the concentration of the active salt in the solvent A (in the absence of diluent) may be within a range of from 3 m to 25 m, such as from 5 m to 21 m, or 10 m to 21 m. In contrast, the molar or molal concentration of the active salt in the electrolyte as a whole (salt, solvent A, and diluent) may be at least 20% less than the molar or molal concentration of the active salt in the solvent A, such as at least 30% less, at least 40% less, at least 50% less, at least 60% less, or even at least 70% less than the molar or molal concentration of the active salt in the solvent A. For example, the molar or molal concentration of the active salt in the electrolyte may be 20-80% less, 20-70% less, 30-70% less, or 30-50% less than the molar or molal concentration of the active salt in the solvent A. In some embodiments, the molar concentration of the active salt in the electrolyte is within a range of 0.1 M to 30 M, 0.1 M to 20 M, 0.1 M to 10 M, 0.1 M to 5 M, 0.1 M to 3 M, 0.5 M to 3 M, 0.5 M to 2 M, 0.75 M to 2 M, or 0.75 M to 1.5 M.

The active salt is a salt, or combination of salts, that participates in the charge and discharge processes of a cell including the electrolyte. The active salt comprises a cation that is capable of forming redox pairs having different oxidation and reduction states, such as ionic species with differing oxidation states or a metal cation and its corresponding neutral metal atom. In some embodiments, the active salt is an alkali metal salt, an alkaline earth metal salt, or any combination thereof. The active salt may be, for example, a lithium salt, a sodium salt, a potassium salt, a magnesium salt, a mixture of lithium salts, a mixture of sodium salts, a mixture of potassium salts, or a mixture of magnesium salts. Advantageously, the active salt is stable towards an alkali metal, alkaline earth metal, carbon-based, silicon-based, carbon/silicon-based, tin-based, or antimony-based anode. Exemplary salts include, but are not limited to, LiFSI, LiTFSI, LiFTFSI, LiBETI, NaFSI, NaTFSI, NaBETI, LiBOB, sodium bis(oxalato)borate (NaBOB), $LiPF_6$, $LiAsF_6$, $LiBF_4$, $LiCF_3SO_3$, $LiClO_4$, LiDFOB, LiI, LiBr, LiCl, LiSCN, $LiNO_3$, $LiNO_2$, $Li_2SO_4$, and combinations thereof. In some embodiments, the salt is LiFSI, LiTFSI, LiBETI, NaFSI, NaTFSI, or any combination thereof.

Suitable solvents for use as solvent A include, but are not limited to, certain carbonate solvents, ether solvents, sulfone solvents, phosphate solvents, ester solvents (e.g., aliphatic ester solvents), lactones, sulfoxides, water, nitriles, flame retardant compounds, and mixtures thereof. Exemplary solvents for use as solvent A include dimethoxyethane (DME), diethylene glycol dimethyl ether (DEGDME, or diglyme), triethylene glycol dimethyl ether (triglyme), tetraethylene glycol dimethyl ether (tetraglyme), 1,3-dioxolane (DOL), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (VEC), 4-methylene-1,3-dioxolan-2-one (also called methylene ethylene carbonate (MEC)), 4,5-dimethylene-1,3-dioxolan-2-one, dimethyl sulfone (DMS), ethyl methyl sulfone (EMS), ethyl vinyl sulfone (EVS), tetramethylene sulfone (TMS, also called sulfolane), methyl butyrate, ethyl propionate, trimethyl phosphate, triethyl phosphate, gamma-butyrolactone, dimethyl sulfoxide (DMSO), triallyl amine, triallyl cyanurate, triallyl isocyanurate, water, acetonitrile, and combinations thereof. In some embodiments, solvent A is DMC, DME, DOL, EMC, or a combination thereof.

In certain embodiments, the solvent A comprises, or further comprises, a flame retardant compound. The amount of flame retardant compound in solvent A is sufficient to render the electrolyte flame-retarded (low flammability) or non-flammable. Such amounts can be determined by those of ordinary skill in the art having had the benefit of reading this disclosure, and depends on the solvent chosen as well as the amount. In any or all embodiments, a low flammability or non-flammable LSE may include at least 5 wt % of the flame retardant compound. In some embodiments, a low flammability or non-flammable LSE comprises at least 5 wt % or at least 10 wt % of the flame retardant compound. In certain embodiments, the low flammability or non-flammable LSE comprises 5-75 wt % of the flame retardant compound, such as 5-60 wt %, 5-50 wt %, 5-40 wt % or 5-30 wt %, 10-60 wt %, 10-50 wt %, 10-40 wt %, or 10-30 wt % of the flame retardant compound. In some embodiments, the flame retardant compound is a liquid at ambient temperature (e.g., 20-25° C.). Suitable flame retardant compounds include, but are not limited to, phosphorus containing compounds. In some embodiments, the flame retardant compound comprises one or more organophosphorus compounds (e.g., organic phosphates, phosphites, phosphonates, phosphoramides), phosphazenes, or any combination thereof. Organic phosphates, phosphites, phosphonates, phosphoramides include substituted and unsubstituted aliphatic and aryl phosphates, phosphites, phosphonates, and phosphoramides. The phosphazenes may be organic or inorganic. Exemplary flame retardant compounds include, e.g., trimethyl phosphate (TMPa), triethyl phosphate (TEPa), tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), and combinations thereof. In one embodiment, the flame retardant compound comprises TMPa, TEPa, or a combination thereof.

In contrast to conventional low flammability or non-flammable electrolytes comprising a flame retardant, some embodiments of the disclosed LSEs do not suffer from significant decomposition of the flame retardant compound during operation of an electrochemical device including the low flammability or non-flammable LSE. As used herein significant decomposition of the flame retardant compound means that the flame retardant decomposes at the anode or cathode during operation of an electrochemical device including the LSE, thereby measurably reducing performance of the electrolyte over repeated cycling and/or resulting in failure of an electrochemical device including the electrolyte. For example, it has been found that in some conventional electrolytes, e.g., 1M $LiPF_6$ in EC/EMC, inclusion of even small amounts (5 wt %) of TMPa results in reductive decomposition of the TMPa at a graphitic anode surface and intercalation of the TMPa into the graphitic anode resulting in capacity fade and/or failure of the electrochemical device. TEPa has also been found to be inherently unstable with reductive decomposition on the graphitic anode surface. Thus, there is a tradeoff of reduced performance and stability with reduced flammability. Indeed, others have concluded that the goal of a non-flammable electrolyte is impractical with TMPa, TEPa, and other phosphorus (V) compounds (Xu et al., *J of the Electrochem Soc* 2002, 149(5):A622-A626). The inventors discovered, however, that certain embodiments of the disclosed low flammability or non-flammable LSEs stabilize an anode, resulting in greater cycling stability than conventional low flammability or non-flammable electrolytes. Without wishing to be bound by a particular theory of operation, the LSE suppresses reductive decomposition of the flame retardant on the electrode and mitigates intercalation of the flame retardant into the electrode with resulting electrochemical exfoliation of the electrode. Some embodiments of the disclosed LSEs produce a salt-derived solid electrolyte interphase (SEI) layer rather than the thick solvent-derived SEI layer formed by conventional electrolytes that include flame retardants.

In some embodiments, the solvent A comprises, consists essentially of, or consists of a carbonate solvent, an ether solvent, a sulfone solvent, a phosphate solvent, an aliphatic ester solvent, a lactone, a sulfoxide, water, a nitrile, or any combination thereof. In some embodiments, the solvent A comprises, consists essentially of, or consists of a flame retardant compound. In another embodiment, the solvent A comprises, consists essentially of, or consists of a flammable solvent and a flame retardant compound. As used herein, "consists essentially of" means that solvent A does not include any electrochemically active component in an amount sufficient to affect performance of an electrolyte including the solvent A.

The solvent A associates with (e.g., solvates or coordinates) cations of the active salt or salt mixture. When prepared as a superconcentrated electrolyte comprising the active salt and the solvent A, solvent-cation-anion aggregates form. In contrast to conventional electrolytes, some embodiments of the disclosed LSEs are stable toward anodes (e.g., an alkali metal, alkaline earth metal, carbon-based, silicon-based, carbon/silicon-based, tin-based, or antimony-based anode), cathodes (including ion intercalation and conversion compounds), separators (e.g., polyolefin) and current collectors (e.g., Cu, Al) that may be unstable when lower concentration electrolytes are used and/or when other solvents are used. As used herein, "stable" means that the electrolyte component has negligible chemical and electrochemical reactions with the anode, cathode, separator and current collector. In some embodiments, the stability enables high coulombic efficiency, e.g., >98%, >98.5%, or even >99% of battery operation.

As discussed previously, in a superconcentrated electrolyte it is advantageous to have few, substantially no, or no free solvent molecules, i.e., solvent molecules that are not associated with cations of the active salt or salt mixture. The concentration of the active salt may be selected to minimize the number of free solvent A molecules in the electrolyte. Because more than one molecule of solvent A may be associated with each cation of the active salt and/or because more than cation of the active salt may be associated with each molecule of solvent A, the molar ratio of active salt to solvent A may not be 1:1. In some embodiments, a molar ratio of the active salt to the solvent A (moles salt/moles solvent A) is within a range of from 0.33 to 1.5, such as within a range of from 0.5 to 1.5, 0.67 to 1.5, 0.8 to 1.2, or 0.9 to 1.1.

The diluent is a component in which the active salt is insoluble or has poor solubility, i.e., a solubility at least 10× less than the active salt's solubility in the solvent A. For instance, if the salt has a solubility of 5 M in the solvent A, the diluent is selected such that the salt has a solubility of less than 0.5 M in the diluent. In some embodiments, the active salt has a solubility in the solvent A that is at least 10 times, at least 15 times, at least 20 times, at least 25 times, at least 30 times, at least 40 times, or at least 50 times greater than the active salt's solubility in the diluent. The diluent is selected to be stable with the anode, cathode, and current collectors at low active salt concentrations (e.g., 3 M) or even without the active salt. In some embodiments, the diluent is selected to have a low dielectric constant (e.g., a relative dielectric constant 7) and/or low donor number (e.g., a donor number 10). Advantageously, the diluent does not disrupt the solvation structure of solvent A-cation-anion aggregates and is considered inert because it is not interacting with the active salt. In other words, there is no significant coordination or association between the diluent molecules and the active salt cations. The active salt cations remain associated with solvent A molecules. Thus, although the electrolyte is diluted, there are few or no free solvent A molecules in the electrolyte.

In some embodiments, the diluent comprises an aprotic organic solvent. In certain embodiments, the diluent is a fluorinated orthoformate. Exemplary fluorinated orthoformates include, but are not limited to:

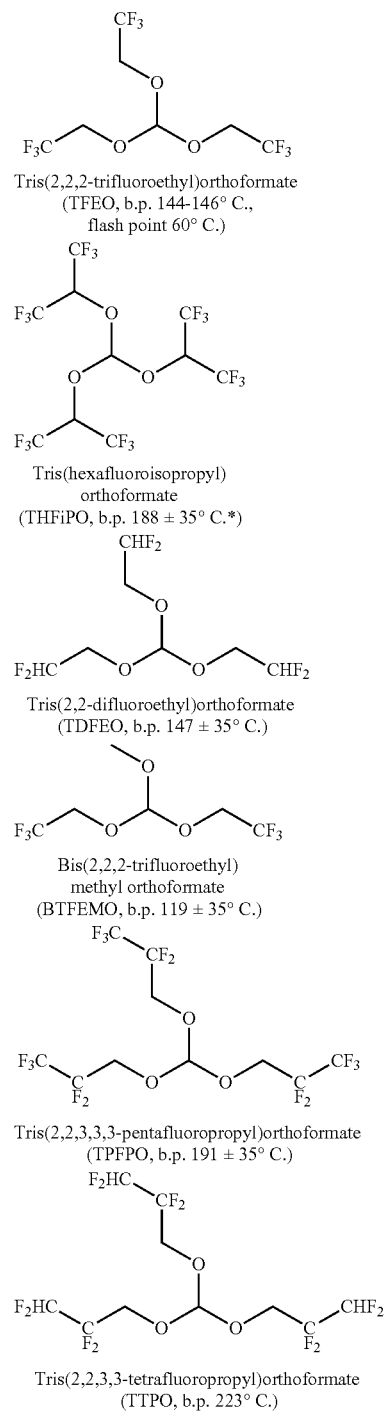

Tris(2,2,2-trifluoroethyl)orthoformate
(TFEO, b.p. 144-146° C.,
flash point 60° C.)

Tris(hexafluoroisopropyl)
orthoformate
(THFiPO, b.p. 188 ± 35° C.*)

Tris(2,2-difluoroethyl)orthoformate
(TDFEO, b.p. 147 ± 35° C.)

Bis(2,2,2-trifluoroethyl)
methyl orthoformate
(BTFEMO, b.p. 119 ± 35° C.)

Tris(2,2,3,3,3-pentafluoropropyl)orthoformate
(TPFPO, b.p. 191 ± 35° C.)

Tris(2,2,3,3-tetrafluoropropyl)orthoformate
(TTPO, b.p. 223° C.)

*Boiling points indicated with ±35° C. are predicted by ChemDraw® software (PerkinElmer)

Some embodiments of the fluorinated orthoformates have a higher boiling point, higher flash point, and lower vapor pressure than other fluoroalkyl ethers that are linear molecules. Linear fluoroalkyl ethers may have a boiling point between ~50-90° C., a low flashpoint, and/or a high vapor pressure. For example, bis(2,2,2-trifluoroethyl) ether (BTFE) has a boiling point of 62-63° C. and a flash point of 1° C., and 1,1,2,2-tetrafluoroethyl-2,2,3,3-tetrafluoropropyl ether (TTE) has a boiling point of 92° C. and a flash point of 27.5° C. These properties limit their applications at elevated temperatures and raise some safety concerns related to thermal issues. In contrast, the higher boiling points, higher flash points, and lower vapor pressures of the fluorinated orthoformates reduces evaporation of the diluent, which makes it easier to control the electrolyte composition. Additionally, the higher boiling point may provide the electrolyte with increased stability when the battery is operating at elevated temperatures, e.g., at temperatures up to 55° C. TFEO does not contain any unstable functional groups (such as cyano, carbonyl, and sulfonic groups), which are highly reactive with metallic Li, but only contains Li-friendly ether groups that ensure its stability against Li. TFEO also possesses a powerful electron-withdrawing group ($CF_3$), which extends its oxidative stability. It exhibits a very low highest-occupied molecular orbital (HOMO) energy value compared with other typical solvents. This property largely enhances its high voltage stability. At the same time, its low viscosity makes it an excellent electrolyte cosolvent. In some examples, the electrolyte is 1M LiFSI in DME-TFEO (1:9 by wt. and 1.2:3 molar ratio) is used in this work. One of the distinguished advantages of TFEO-based electrolytes is that it can form a monolithic SEI, whose highly homogeneous and inorganic rich properties largely minimize the pulverization of the lithium metal anode even after long-term cycling, which is critical for safe operation of lithium metal batteries.

Embodiments of the disclosed fluorinated orthoformates also have low melting points and a wide electrochemical stability window. Advantageously, embodiments of the disclosed fluorinated orthoformates are stable with alkali metal anodes, such as lithium metal anodes. In contrast, non-fluorinated orthoformates, such as triethyl orthoformate, are not suitable for use as diluents because they are not stable with lithium metal anodes, resulting in a low coulombic efficiency with poor cycling and failure of the battery. Additionally, embodiments of the disclosed electrolyte salts usually are soluble in non-fluorinated orthoformates.

In some embodiments of the disclosed LSEs, the diluent comprises a combination of a fluorinated orthoformate and a linear fluoroalkyl ether. Exemplary linear fluoroalkyl ethers include, but are not limited to, 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), and combinations thereof.

Flammable:

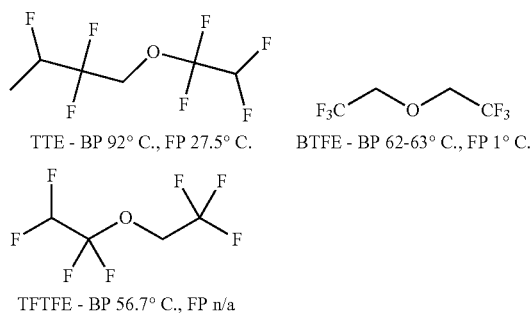

TTE - BP 92° C., FP 27.5° C.     BTFE - BP 62-63° C., FP 1° C.

TFTFE - BP 56.7° C., FP n/a

Nonflammable:

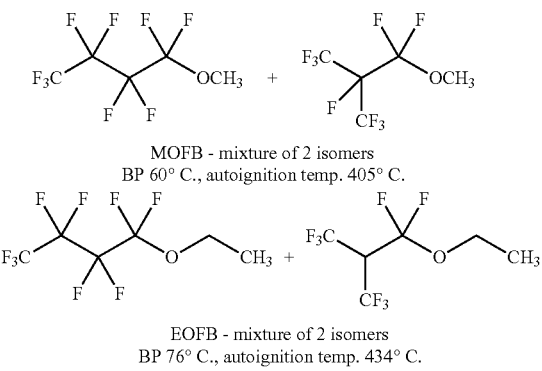

MOFB - mixture of 2 isomers
BP 60° C., autoignition temp. 405° C.

EOFB - mixture of 2 isomers
BP 76° C., autoignition temp. 434° C.

In some embodiments of the disclosed LSEs, at least 90%, at least 95%, at least 96%, at least 97%, at least 98%, or at least 99% of the molecules of solvent A (solvent and, optionally, a flame retardant compound) are associated (e.g., solvated or coordinated) with cations of the active salt. In certain embodiments, fewer than 10%, such as fewer than 5%, fewer than 4%, fewer than 3%, or fewer than 2% of the diluent molecules are associated with cations of the active salt. The degree of association can be quantified by any suitable means, such as by calculating the peak intensity ratio of solvent molecules associated with cations and free solvent in Raman spectra or by using NMR spectra.

The relative amounts of the solvent A (solvent and, optionally, a flame retardant compound) and diluent are selected to, reduce the cost of materials for the electrolyte, reduce viscosity of the electrolyte, maintain stability of the electrolyte against oxidation at high-voltage cathodes, improve ionic conductivity of the electrolyte, improve wetting ability of the electrolyte, facilitate formation of a stable SEI layer, reduce the flammability of the electrolyte, or any combination thereof. In one embodiment, a molar ratio of the solvent A to the diluent (moles solvent A/moles diluent) in the LSE is within a range of from 0.2 to 5, such as within a range of from 0.2 to 4, 0.2 to 3, 0.2 to 2, or 0.4 to 2. In another embodiment, a volumetric ratio of the solvent A to the diluent (L solvent/L diluent) in the LSE is within a range of from 0.2 to 5, such as within a range of from 0.25 to 4 or 0.33 to 3.

Advantageously, certain embodiments of the disclosed LSEs allow significant dilution of the active salt without sacrificing performance of the electrolyte. In some examples, the electrolyte performance is enhanced compared to a comparable superconcentrated electrolyte that does not include the diluent. Due to the interactions between cations of the active salt and molecules of solvent A, the behavior of the electrolyte corresponds more closely to the concentration of the active salt in the solvent A. Because the diluent is present, however, the active salt may have a molar concentration in the electrolyte that is at least 20% less than the molar concentration of the active salt in the solvent A. In certain embodiments, the molar concentration of the active salt in the electrolyte is at least 25% less, at least 30% less, at least 40% less, at least 50% less, at least 60% less, at least 70% less, or even at least 80% less than the molar concentration of the active salt in the solvent A. Inclusion of the diluent reduces the electrolyte cost (less salt is used) and reduces the electrolyte viscosity, while preserving the unique functionalities and advantages of high-concentration electrolytes.

In some embodiments, the formation of cation-anion-solvent aggregates also reduces the lowest unoccupied molecular orbital (LUMO) energy of the anion (such as FSI⁻) of the active salt so they can form a stable SEI. For instance, when the LUMOs of the conduction bands are located at the solvent molecules (such as DMC), the solvent molecules are reductively decomposed first at the anode, leading to an SEI layer which is rich in organic or polymeric component and less mechanically stable, therefore leads to fast capacity degradation upon cycling. In contrast, when the lowest energy level of conduction bands of the anion (such as FSI⁻) of the active salt in certain embodiments of the disclosed LSEs is lower than those of the solvent (such as DMC), indicating that the anions of the active salt instead of the solvent molecules will be decomposed, forming a stable SEI which is rich in inorganic components (such as LiF, $Li_2CO_3$, $Li_2O$ etc.) which is mechanically robust and can protect anode from degradation during subsequent cycling process.

In some embodiments, the diluent is miscible with solvent A. In other embodiments, the diluent is immiscible with solvent A (including the flame retardant compound, if present). When the solvent A and the diluent are immiscible, the electrolyte may not be effectively diluted with the diluent.

Figure 3:
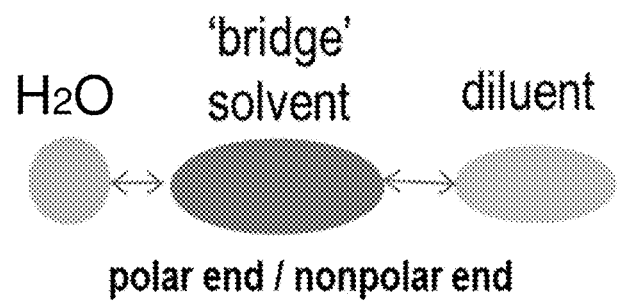
FIG. 3 is a schematic illustration of an exemplary "bridge" solvent molecule between a polar solvent (such as water) and a non-polar diluent molecule.

Accordingly, in some embodiments, when the diluent is immiscible with solvent A, the LSE further comprises a bridge solvent. The bridge solvent has a different chemical composition than either the solvent A or the diluent. The bridge solvent is selected to be miscible with solvent A (including the flame retardant compound, if present) and the diluent, thereby "bridging" the immiscibility of the solvent A with the diluent and enhancing the practical miscibility of solvent A, and the diluent. In some embodiments, molecules of the bridge solvent are amphiphilic, including both a polar end or moiety, and a non-polar end or moiety, such that molecules of the bridge solvent will associate both with molecules of solvent A and molecules of the diluent as shown in FIG. 3, thereby improving the miscibility between solvent A, and the diluent. Exemplary bridge solvents include, but are not limited to, acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), and combinations thereof.

Exemplary solvent and diluent combinations include DME-TFEO, TEPa-TFEO, DME-TEPa-TFEO, DMC-TFEO, DMC-TEPa-TFEO, EMC-TFEO, EMC-TEPa-TFEO, DME-TFEO-TTE, DME-TDFEO, TEPa-TDFEO, DME-TEPa-TDFEO, DMC-TDFEO, DMC-TEPa-TDFEO, EMC-TDFEO, EMC-TEPa-TDFEO and DME-TDFEO-TTE. In some embodiments, the salt is LiFSI, LiTFSI, or a combination thereof, or NaFSI, NaTFSI, or a combination thereof.

Advantages of the disclosed LSEs include, but are not limited to, stability towards alkali metal anodes and high voltage cathodes, wide electrochemical stability window, high CE over a wide temperature range, low viscosity, and/or high conductivity compared with conventional concentrated electrolytes, and/or low cost relative to conventional concentrated electrolytes. The LSEs can include fire retardant compounds, rendering them low flammable or non-flammable, thereby also improving the safety of alkali metal batteries, such as Li metal and Na metal batteries.

III. Batteries

Embodiments of the disclosed low flammability or non-flammable LSEs are useful in batteries (e.g., rechargeable batteries), sensors, and supercapacitors. Suitable batteries include, but are not limited to, lithium metal batteries, lithium ion batteries, lithium-sulfur batteries, lithium-oxygen batteries, lithium-air batteries, sodium metal batteries, sodium ion batteries, sodium-sulfur batteries, sodium-oxygen batteries, sodium-air batteries, potassium metal batteries, potassium ion batteries, and magnesium ion batteries. The LSEs are useful for other applications as well, such as in super capacitors and sensors.

Figure 4A:
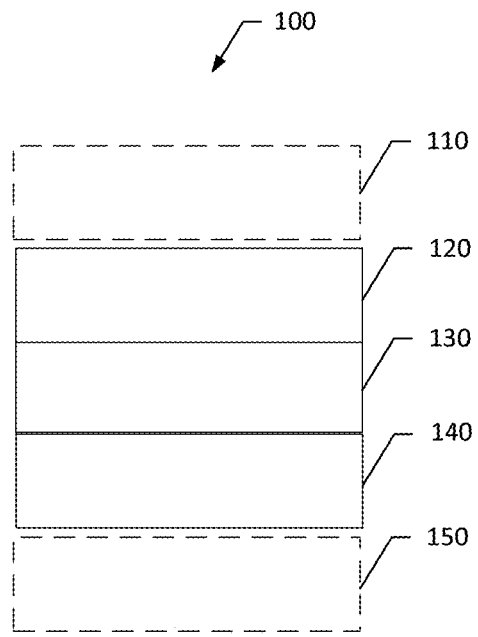
FIGS. 4A and 4B are schematic diagrams of a battery including an anode (4A) and an anode-free battery (4B).

In some embodiments, a rechargeable battery comprises an LSE as disclosed herein, a cathode, an anode, and optionally a separator. FIG. 4A is a schematic diagram of one exemplary embodiment of a rechargeable battery 100 including a cathode 120, a separator 130 which is infused with an electrolyte (i.e., an LSE), and an anode 140. In some embodiments, the LSE is a low flammability or non-flammable LSE. In some embodiments, the battery 100 also includes a cathode current collector 110 and/or an anode current collector 150.

Figure 4B:
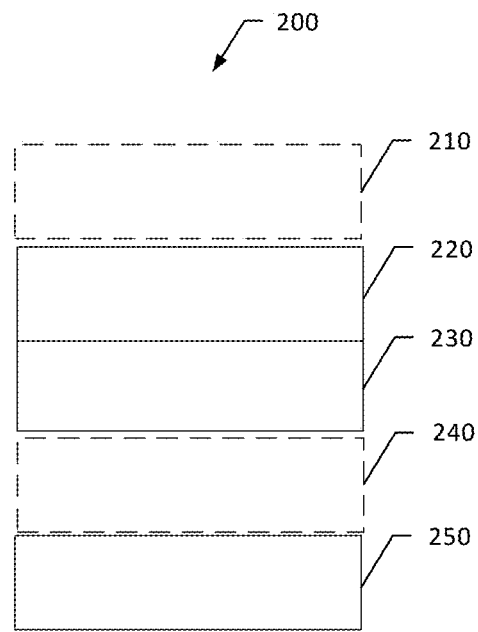

FIG. 4B is a schematic diagram of one embodiment of an anode-free rechargeable battery 200. The battery 200 includes a cathode 220, a separator 230 which, in some embodiments, is infused with an electrolyte, and an anode current collector 250. In some embodiments, the battery 200 also includes a cathode current collector 210. During a charging process of the battery 200, an anode 240 is formed in situ on the surface of the anode current collector 250 facing the separator 230. By "in situ" is meant that the anode forms during a charging process of the battery. The anode active material 240 is at least partially consumed during a discharging process of the battery 200. In some embodiments, the anode active material 240 is completely consumed during a discharging process of the battery 200. In some embodiments, the anode-active material is an alkali metal or alkaline earth metal. Exemplary anode-active materials include lithium, sodium, potassium, and magnesium. In certain embodiments, the anode-active material is lithium or sodium.

The current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. By "free-standing" is meant that the film itself has sufficient structural integrity that the film can be positioned in the battery without a support material.

In some embodiments, the anode is a metal (e.g., lithium, sodium), an intercalation material, or a conversion compound. The intercalation material or conversion compound may be deposited onto a substrate (e.g., a current collector) or provided as a free-standing film, typically, including one or more binders and/or conductive additives. Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). Exemplary anodes for lithium batteries include, but are not limited to, $Mo_6S_8$, $TiO_2$, $V_2O_5$, $Li_4Mn_5O_{12}$, $Li_4Ti_5O_{12}$, C/S composites, and polyacrylonitrile (PAN)-sulfur composites. Exemplary anodes for sodium batteries include, but are not limited to hard carbon, $NaTi_2(PO_4)_3$; $TiS_2$, CuS, $FeS_2$, $NiCo_2O_4$, $Cu_2Se$, and $Li_{0.5}Na_{0.5}Ti_2(PO_4)_3$.

In certain embodiments, the rechargeable battery is an alkali metal ion battery, such as a lithium ion or sodium ion battery, and the anode is a carbon-based, silicon-based, carbon/silicon composite-based, tin-based, or antimony-based anode. The anode may further include one or more binders and/or conductive additives, e.g., as described above. In one embodiment, the battery is a lithium ion battery and the anode is a graphite- and/or silicon-based anode, or a tin-based anode. In another embodiment, the battery is a sodium ion battery, and the anode is a hard carbon-based anode or antimony-based anode.

Exemplary cathodes for lithium metal or lithium ion batteries include, but are not limited to, Li-rich $Li_{1+w}Ni_xM-n_yCo_zO_2$ (x+y+z+w=1, 0≤w≤0.25), $LiNi_xMn_yCo_zO_2$ (NMC, x+y+z=1), $LiCoO_2$ (LCO), $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}{}_xM^{C2}{}_{1-x}PO_4$ ($M^{C1}$ or $M^{C2}$=Fe, Mn, Ni, Co, Cr, or Ti; 0≤x≤1), $Li_3V_{2-x}M^1{}_x(PO_4)_3$ ($M^1$=Cr, Co, Fe, Mg, Y, Ti, Nb, or Ce; 0≤x≤1), $LiVPO_4F$, $LiM^{C1}{}_xM^{C2}{}_{1-x}O_2$ (($M^{C1}$ and $M^{C2}$ independently are Fe, Mn, Ni, Co, Cr, Ti, Mg, or Al; 0≤x≤1), $LiM^{C1}{}_xM^{C2}{}_yM^{C3}{}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}{}_yM^{C2}{}_zM^{C3}{}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li(Fe_{1-y}Mn_y)P_2O_7$ (0≤y≤1), $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In another embodiment, the cathode may be a lithium conversion compound, such as $Li_2O_2$, $Li_2S$, or LiF.

Exemplary cathodes for sodium metal or sodium ion batteries include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}V_0PO_4F_{0.5}$, $NaCo_2O_4$, $Na_2Ti_3O_7$, and $Na_xMO_2$ where 0.4≤x≤1, and M is a transition metal or a mixture of transition metals (e.g., $NaCrO_2$, $NaCoO_2$, $Na_xCoO_2$ (0.4≤x≤0.9), $Na_{2/3}Ni_{1/3}Mn_{2/3}O_2$, $Na_{2/3}Fe_{1/2}Mn_{1/2}O_2$, $Na_{2/3}Ni_{1/6}Co_{1/6}Mn_{2/3}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$, Prussian white analogue cathodes (e.g., $Na_2MnFe(CN)_6$ and $Na_2Fe_2(CN)_6$), Prussian blue analogue (PBA) cathodes ($Na_{2-x}M_a[M_b(CN)_6]_{1-y} \cdot nH_2O$, wherein $M_a$ and $M_b$ independently are Fe, Co, Ni, or Cu, x=0 to 0.2, y=0 to 0.2, n=1 to 10). Other sodium intercalation materials include $Na_4Ti_5O_{12}$, $Fe_3O_4$, $TiO_2$, $Sb_2O_4$, Sb/C composite, SnSb/C composite, BiSb/C composite, and amorphous P/C composite.

In another embodiment, the cathode is a sodium conversion compound in which sodium displaces another cation, such as FeSe, $CuWO_4$, CuS, CuO, CuCl, or $CuCl_2$.

Exemplary cathodes for magnesium batteries include, but are not limited to, zirconium disulfide, cobalt (II,III) oxide, tungsten selenide, $V_2O_5$, molybdenum-vanadium oxide, stainless steel, $Mo_6S_8$, $Mg_2Mo_6S_8$, $MoS_2$, $Mo_6S_{8-y}Se_y$, where y=0, 1, or 2, $Mg_xS_3O_4$ where 0<x<1, $MgCoSiO_4$, $MgFeSiO_4$, $MgMnSiO_4$, $V_2O_5$, $WSe_2$, sulfur, poly(2,2,6,6-tetramethylpiperidinyloxy-4-yl methacrylate)/graphene, $MnO_2$/acetylene black, and carbyne polysulfide.

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with an electrolyte, as disclosed herein.

In some embodiments, a battery includes a lithium metal anode, a cathode suitable for a lithium battery as disclosed above, a separator, and an LSE comprising (i) an active salt selected from LiFSI, LiTFSI, LiFTFSI, LiBETI, $LiPF_6$, $LiAsF_6$, $LiBF_4$, $LiCF_3SO_3$, $LiClO_4$, LiBOB, LiDFOB, LiI, LiBr, LiCl, LiSCN, $LiNO_3$, $LiNO_2$, $Li_2SO_4$, or any combination thereof, (ii) a solvent comprising an ether, a carbonate, a sulfone, an aliphatic ester, a lactone, a sulfoxide, water, a nitrile, a flame retardant compound, or any combination thereof, and (iii) a diluent selected from TFEO, THFiPO, TDFEO, BTFEMO, TPFPO, TTPO, or any combination thereof. In certain embodiments, a battery includes a lithium metal anode, a cathode suitable for a lithium battery as disclosed above, a separator, and a low flammability or non-flammable LSE comprising (i) an active salt selected from LiFSI, LiTFSI, or a combination thereof, (ii) a flame retardant compound selected from trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof, (iii) a cosolvent selected from DMC, DME, DOL, DEC, EMC, DMSO, EMS, TMS, or any combination thereof, and (iv) a diluent selected from TFEO, THFiPO, TDFEO, BTFEMO, TPFPO, TTPO, or any combination thereof. In some embodiments, the diluent is TFEO. In certain embodiments, the flame retardant compound, if present, is triethyl phosphate, trimethyl phosphate, or combination thereof. In any of the foregoing embodiments, the diluent may further comprise a linear fluoroalkyl ether. In some examples, the active salt is LiFSI, the solvent is DME, TEPa, or a combination thereof, and the diluent is TFEO. When the solvent and diluent are immiscible, the LSE may further comprise a bridge solvent having a different composition than the solvent, if present, and a different composition than the diluent, wherein the bridge solvent is miscible with the solvent and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. In certain embodiments, the cathode comprises $LiNi_xMn_yCo_zO_2$ (NMC), sulfur/carbon, or an air electrode. In one embodiment, the battery comprises a lithium anode, a NMC (e.g., NMC333, NMC532, NMC811) cathode, and an electrolyte comprising LiFSI/DME-TFEO, LiFSI/DME- TEPa-TFEO, LiFSI/DME-TFEO-TTE, LiFSI/DME-TD-FEO, or LiFSI/DME-TDFEO-TTE.

In some embodiments, a lithium ion battery includes a carbon- and/or silicon-based anode or a tin-based anode, a cathode suitable for a lithium battery as disclosed above, a separator, and an LSE comprising (i) an active salt selected from LiFSI, LiTFSI, LiFTFSI, LiBETI, LiPF$_6$, LiAsF$_6$, LiBF$_4$, LiCF$_3$SO$_3$, LiClO$_4$, LiBOB, LiDFOB, LiI, LiBr, LiCl, LiSCN, LiNO$_3$, LiNO$_2$, Li$_2$SO$_4$, or any combination thereof, (ii) a solvent comprising an ether, a carbonate, a sulfone, an aliphatic ester, a lactone, a sulfoxide, water, a nitrile, a flame retardant compound, or any combination thereof, and (iii) a diluent selected from TFEO, THFiPO, TDFEO, BTFEMO, TPFPO, TTPO, or any combination thereof. The LSE may comprise a solvent selected from DMC, EC, EMC, DEC, PC, MFEC, VC, FEC, DFEC, TFEC, VEC, MEC, ethylene sulfite, ethylene sulfate, EVS, water, or any combination thereof. In certain embodiments, (i) the active salt comprises LiFSI, LiTFSI, LiDFOB, or a combination thereof, (ii) the diluent comprises TFEO, and (iii) the solvent comprises DMC, EC, VC, FEC, TEPa, TMPa, or any combination thereof. In any of the foregoing embodiments, the diluent may further comprise a linear fluoroalkyl ether. When the solvent and diluent are immiscible, the LSE may further comprise a bridge solvent having a different composition than the solvent and a different composition than the diluent, wherein the bridge solvent is miscible with the solvent and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. In some examples, the cathode is LiNi$_{0.85}$Co$_{0.15}$Al$_{0.05}$O$_2$(NCA), LiNi$_{0.8}$Co$_{0.1}$Mn$_{0.1}$O$_2$ (NMC811), LiNia$_6$Mn$_{0.2}$Co$_{0.2}$O$_2$(NMC), LiNa$_5$Mn$_{0.3}$Co$_{0.2}$O$_2$(NMC532), LiNi$_{1/3}$Mn$_{1/3}$Co$_{1/3}$O$_2$ (NMC333), or LiCoO$_2$ (LCO).

In some embodiments, a battery includes a sodium metal anode, a cathode suitable for a sodium battery as disclosed above, a separator, and an LSE comprising (i) an active salt selected from NaFSI, NaTFSI, NaBETI, NaPF$_6$, NaAsF$_6$, NaBF$_4$, NaCF$_3$SO$_3$, NaClO$_4$, NaBOB, NaDFOB, or any combination thereof, (ii) a solvent comprising an ether, a carbonate, a sulfone, an aliphatic ester, a lactone, a sulfoxide, water, a nitrile, a flame retardant compound, or any combination thereof, and (iii) a diluent selected from TFEO, THFiPO, TDFEO, BTFEMO, TPFPO, TTPO, or any combination thereof. In certain embodiments, a battery includes a sodium metal anode, a cathode suitable for a sodium battery as disclosed above, a separator, and a low flammability or non-flammable LSE comprising (i) an active salt selected from NaFSI, NaTFSI, or a combination thereof, (ii) a flame retardant compound selected from trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof, (iii) a cosolvent selected from DMC, DME, DOL, DEC, EMC, DMSO, EMS, TMS, or any combination thereof, and (iv) a diluent selected from TFEO, THFiPO, TDFEO, BTFEMO, TPFPO, TTPO, or any combination thereof. In some embodiments, the diluent is TFEO. In certain embodiments, the flame retardant compound, if present, is triethyl phosphate, trimethyl phosphate, or combination thereof. In some examples, the active salt is NaFSI, the solvent is DME, TEPa, or a combination thereof, and the diluent is TFEO. In any of the foregoing embodiments, the diluent may further comprise a linear fluoroalkyl ether. When the solvent and diluent are immiscible, the LSE may further comprise a bridge solvent having a different composition than the flame retardant compound and cosolvent, if present, and a different composition than the diluent, wherein the bridge solvent is miscible with the flame retardant compound, cosolvent (if present), and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. In one embodiment, the cathode is Na$_3$V$_2$(PO$_4$)$_3$.

In some embodiments, a sodium ion battery includes a carbon- and/or silicon-based anode, a tin-based anode, or an antimony-based anode, a cathode suitable for a sodium battery as disclosed above, a separator, and a low flammability or non-flammable LSE comprising (i) an active salt selected from NaFSI, NaTFSI, NaBETI, NaPF$_6$, NaAsF$_6$, NaBF$_4$, NaCF$_3$SO$_3$, NaClO$_4$, NaBOB, NaDFOB, or any combination thereof, (ii) a solvent comprising an ether, a carbonate, a sulfone, an aliphatic ester, a lactone, a sulfoxide, water, a nitrile, a flame retardant compound, or any combination thereof, and (iii) a diluent selected from TFEO, THFiPO, TDFEO, BTFEMO, TPFPO, TTPO, or any combination thereof. In some embodiments, the solvent comprises DME, VC, FEC, DFEC, TFEC, VEC, MEC, EC, ethylene sulfite, ethylene sulfate, EVS, water, or any combination thereof. In some examples, the anode is carbon- and/or silicon-based. In certain embodiments, (i) the active salt comprises NaFSI, NaTFSI, or a combination thereof, (ii) the diluent comprises TFEO, and (iv) the solvent comprises DME, VC, EC, FEC, TEPa, TMPa, or any combination thereof. In any of the foregoing embodiments, the diluent may further comprise a linear fluoroalkyl ether. When the solvent and diluent are immiscible, the LSE may further comprise a bridge solvent having a different composition than the solvent and a different composition than the diluent, wherein the bridge solvent is miscible with the solvent and the diluent. The bridge solvent may be selected from acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof.

In some embodiments, a battery including an LSE as disclosed herein has a performance equal to, or even better than, a comparable battery including a superconcentrated electrolyte. For instance, the battery including the LSE may have a CE greater than or equal to a comparable battery including a conventional concentrated electrolyte. In some embodiments, the battery has a CE 95%, such as 96%, 97%, 98%, 99%, or even 99.5%. The battery also may have a greater discharge capacity and/or cycling stability compared to a battery including a superconcentrated electrolyte. In some embodiments, the LSE provides dendrite-free plating on the anode at high current densities (e.g., 0.5-10 mA cm$^{-2}$) with CE greater than 99%. Embodiments of batteries including LSEs as disclosed herein demonstrate stable cycling performance (e.g., as evidenced by a stable CE and/or specific capacity) over a period of at least 10 cycles, at least 25 cycles, at least 50 cycles, at least 75 cycles, at least 100 cycles, at least 200 cycles, or at least 300 cycles. For example, the battery may demonstrate stable cycling performance for 10-500 cycles, such as 25-500 cycles, 50-500 cycles, 100-500 cycles, 200-500 cycles, or 300-500 cycles. In addition, synergistic effects arising from lower viscosity and higher conductivity of the disclosed LSEs also contribute to the superior electrochemical performances of electrochemical devices including certain embodiments of the disclosed low flammability and non-flammable LSEs. In any or all embodiments, the battery may be operable over a temperature range of from 5-55° C.

In one example, Li∥NMC811 cells including an electrolyte comprising LiFSI/DME-TFEO were demonstrated to provide stable cycling for at least 300 cycles with up to 80% specific capacity retention and coulombic efficiency near 100%. Advantageously, the cells were operable at temperatures ranging from 5–55° C. with CEs ranging from 90.15% at 5° C. to greater than 99% at 30° C. (99.49%) and 55° C. (99.22%). The cells were operable at charge and discharge rates from C/5 to 4C. The electrolytes provided dendrite-free lithium plating.

In another example, Si/Gr∥NMC cells (NMC33 and NMC811) including an electrolyte comprising LiFSI/DME-TFEO were demonstrated to provide stable cycling for at least 200 cycles with CE values near 100% and capacity retention of 90-95% per 100 cycles. In still another example, Li∥Cu cells including electrolytes comprising LiFSI/DME-TEPa-TFEO were cycled for 80 hours at 30° C. with CEs ranging from 99.0-99.4%. A comparable cell with an electrolyte comprising LiFSI/TEPa-TFEO had a CE of 98.8%. In Li∥NMC811 cells, the LiFSI/DME-TEPa-TFEO and LiFSI/TEPa-TFEO electrolytes also provided CEs near 100%. The electrolytes provided dendrite-free lithium plating.

In another example, an anode-free cell, Cu∥NMC622, including an electrolyte comprising LiFSI/DME-TFEO-TTE demonstrated that the electrolyte provided cycling of anode-free batteries for at least 100 cycles. The average CE during cycling was 99.3%.

In another example, anode free cells, Cu∥LiCoO₂, including an electrolyte comprising LiFSI/DME-TFEO or LiFSI/DME-TFEO-TTE demonstrated that the electrolyte provided cycling of anode-free batteries for at least 100 cycles. The average CE during cycling was 99.4% for both electrolytes.

In another example, a Li∥NMC811 cell including an electrolyte comprising LiFSI/DME-TDFEO exhibited stable cycling for at least 280 cycles with a capacity retention of 96.0%. The average CE was 99.7%.

In another example, an anode free cell, Cu∥NMC622, including an electrolyte comprising LiFSI/DME-TDFEO demonstrated that the electrolyte provided cycling of anode-free batteries for at least 100 cycles. The average CE during cycling was 99.3.%

In summary, certain embodiments of the disclosed LSEs are cost-effective, enable dendrite-free plating, provide high CE, and/or greatly enhance fast charging and/or stable cycling of batteries. Certain embodiments of the LSEs including a flame retardant are also safer than conventional, flammable electrolytes. Without wishing to be bound by a particular theory of operation, the advantages of certain embodiments of the disclosed LSEs are due to the 'inert' nature of the diluent that does not break the localized salt/solvent high concentration solvation structures, but plays an important role in improving the interfacial stablity of the metal anode. Embodiments of the disclosed LSEs are useful with many battery types, such as lithium ion batteries, lithium metal batteries, lithium-lithium intercalation compounds or lithium intercalation compounds, lithium-sulfur batteries, lithium-oxygen batteries, lithium-air batteries, sodium metal batteries, sodium ion batteries, sodium-air batteries, sodium-sulfur batteries, sodium-oxygen batteries, and magnesium ion batteries.

IV. Representative Embodiments

Certain representative embodiments are exemplified in the following numbered clauses.

1. An electrolyte, comprising: an active salt; a solvent comprising an ether, a carbonate, a sulfone, an aliphatic ester, a lactone, dimethyl sulfoxide, water, a flame retardant compound, or any combination thereof, wherein the active salt is soluble in the solvent; and a diluent comprising a fluorinated orthoformate, wherein the active salt has a solubility in the diluent at least 10 times less than a solubility of the active salt in the solvent.

2. The electrolyte of clause 1, wherein the fluorinated orthoformate is tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

3. The electrolyte of clause 1 or clause 2, wherein the solvent comprises dimethoxyethane (DME), 1,3-dioxolane (DOL), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (VEC), 4-methylene-1,3-dioxolan-2-one (i.e. methylene ethylene carbonate (MEC)), 4,5-dimethylene-1,3-dioxolan-2-one, dimethyl sulfone (DMS), ethyl methyl sulfone (EMS), ethyl vinyl sulfone (EVS), tetramethylene sulfone (TMS), methyl butyrate, ethyl propionate, trimethyl phosphate, triethyl phosphate, gamma-butyrolactone, dimethyl sulfoxide (DMSO), triallyl amine, triallyl cyanurate, triallyl isocyanurate, water, or any combination thereof.

4. The electrolyte of any one of clauses 1-3, wherein the solvent comprises a flame retardant compound, and the electrolyte comprises at least 5 wt % of the flame retardant compound.

5. The electrolyte of any one of clauses 1-4, wherein the flame retardant compound comprises an organic phosphate, an organic phosphite, an organic phosphonate, an organic phosphoramide, a phosphazene, or any combination thereof.

6. The electrolyte of clause 5, wherein the flame retardant compound comprises trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2, 2,2-trifluoroethyl) phosphite; dimethyl methylphosphonate, diethyl ethylphosphonate, diethyl phenylphosphonate, bis(2, 2,2-trifluoroethyl) methylphosphonate; hexamethylphosphoramide; hexamethoxyphosphazene, hexafluorophosphazene, or any combination thereof.

7. The electrolyte of any one of clauses 1-6, wherein the active salt comprises a lithium salt or lithium salts mixture, a sodium salt or sodium salts mixture, a potassium salt or potassium salts mixture, or a magnesium salt or magnesium salts mixture.

8. The electrolyte of any one of clauses 1-7, wherein the active salt comprises lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), LiPF$_6$, LiAsF$_6$, LiBF$_4$, LiCF$_3$SO$_3$, LiClO$_4$, lithium difluoro oxalato borate anion (LiDFOB), LiI, LiBr, LiCl, LiSCN, LiNO$_3$, LiNO$_2$, Li$_2$SO$_4$, sodium bis(fluorosulfonyl)imide (NaFSI), sodium bis(trifluoromethylsulfonyl)imide (NaTFSI), sodium bis(pentafluoroethanesulfonyl)imide (NaBETI), NaPF$_6$, NaAsF$_6$, NaBF$_4$, NaCF$_3$SO$_3$, NaClO$_4$, sodium bis(oxalato) borate (NaBOB), sodium difluoro oxalato borate anion (NaDFOB), or any combination thereof.

9. The electrolyte of any one of clauses 1-8, wherein: (i) the active salt has a molar concentration in the electrolyte within a range of from 0.1 M to 3 M; or (ii) the active salt has a molar concentration in the electrolyte of greater than 3 moles of active salt per liter of the solvent; or (iii) the molar concentration of the active salt in the electrolyte is at least 20% less than a molar concentration of the active salt in the solvent in the absence of the diluent; or (iv) a molar ratio of the active salt to the solvent is within a range of from 0.1 to 5; or (v) a molar ratio of the solvent to the diluent is within a range of from 0.1 to 5; or (vi) any combination of (i), (ii), (iii), (iv), and (v).

10. The electrolyte of any one of clauses 1-9, wherein: (i) at least 90% of molecules of the solvent are associated with cations of the active salt; or (ii) fewer than 10% of molecules of the diluent are associated with cations of the active salt; or (iii) both (i) and (ii).

11. The electrolyte of any one of clauses 1-10, wherein the solvent and the diluent are immiscible, the electrolyte further comprising a bridge solvent having a different composition than the solvent and a different composition than the diluent, wherein the bridge solvent is miscible with the solvent and with the diluent.

12. The electrolyte of clause 11, wherein the bridge solvent comprises acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), or any combination thereof.

13. The electrolyte of any one of clauses 1-12, wherein: the active salt is (i) LiFSI, LiTFSI, or a combination thereof, or (ii) NaFSI, NaTFSI, or a combination thereof; the solvent comprises an ether, a flame retardant compound comprising an organic phosphate, or a combination thereof; and the diluent comprises TFEO.

14. The electrolyte of any one of clauses 1-13, wherein the diluent comprises TFEO, TDFEO, or TFEO and TDFEO.

15. The electrolyte of any one of clauses 1-14, wherein the diluent further comprises a linear fluoroalkyl ether.

16. The electrolyte of claim 15, wherein the linear fluoroalkyl ether comprises 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), or any combination thereof.

17. The electrolyte of any one of clauses 1-16, wherein: the active salt comprises a lithium salt or lithium salts mixture; the solvent comprises an ether; and the diluent comprises TFEO, TDFEO, or TFEO and TDFEO.

18. The electrolyte of clause 17, wherein the active salt comprises LiFSI.

19. The electrolyte of clause 17 or 18, wherein the solvent comprises DME.

20. The electrolyte of any one of clauses 1-10 or 13-19, consisting essentially of: (i) LiFSI, DME, and TFEO; or (ii) LiFSI, DME, and TDFEO; or (iii) LiFSI, DME, TFEO, and TDFEO; or (iv) LiFSI, DME, TFEO, and 1,1,2,2-tetrafluoroethyl-2,2,3,3-tetrafluoropropyl ether (TTE); or (v) LiFSI, triethyl phosphate (TEPa), and TFEO; or (vi) LiFSI, DME, TEPa, and TFEO.

21. The electrolyte of any one of clauses 1-10 or 13-19, consisting of: (i) LiFSI, DME, and TFEO; or (ii) LiFSI, DME, and TDFEO; or (iii) LiFSI, DME, TFEO, and TDFEO; or (iv) LiFSI, DME, TFEO, and TTE; or (v) LiFSI, TEPa and TFEO; or (vi) LiFSI, DME, TEPa, and TFEO.

22. A battery, comprising: (i) an electrolyte comprising an active salt, a solvent comprising an ether, a carbonate, a sulfone, an aliphatic ester, a lactone, dimethyl sulfoxide, water, a flame retardant compound, or any combination thereof, wherein the active salt is soluble in the solvent, a diluent comprising a fluorinated orthoformate, wherein the active salt has a solubility in the diluent at least 10 times less than a solubility of the active salt in the solvent, and the active salt has a concentration in the electrolyte within a range of 0.1 to 3 M; (ii) an anode comprising an alkali metal, carbon, silicon, a carbon/silicon composite, tin, or antimony; and (iii) a cathode, wherein the battery has a coulombic efficiency ≥95%.

23. The battery of clause 22, wherein the fluorinated orthoformate is tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

24. The battery of clause 22 or 23, wherein the electrolyte comprises at least 5 wt % of a flame retardant compound wt %.

25. The battery of any one of clauses 22-24, wherein: the active salt comprises LiFSI, LiTFSI, LiBETI, LiPF$_6$, LiAsF$_6$, LiBF$_4$, LiCF$_3$SO$_3$, LiClO$_4$, LiBOB, LiDFOB, LiI, LiBr, LiCl, LiSCN, LiNO$_3$, LiNO$_2$, Li$_2$SO$_4$, or any combination thereof; the solvent comprises DMC, EC, EMC, DEC, PC, MFEC, VC, FEC, DFEC, TFEC, VEC, MEC, ethylene sulfite, ethylene sulfate, EVS, water, or any combination thereof; the diluent comprises TFEO, THFiPO, TDFEO, BTFEMO, TPFPO, TTPO, or any combination thereof; and the cathode comprises Li$_{1+w}$Ni$_x$Mn$_y$Co$_z$O$_2$ (x+y+z+w=1, 0≤w≤0.25), LiNi$_x$Mn$_y$Co$_z$O$_2$ (x+y+z=1), LiNi$_{0.8}$Co$_{0.15}$Al$_{0.05}$O$_2$, LiCoO$_2$, LiNi$_{0.5}$Mn$_{1.5}$O$_4$ spinel, LiMn$_2$O$_4$, LiFePO$_4$, Li$_{4-x}$M$_x$Ti$_5$O$_{12}$ (M=Mg, Al, Ba, Sr, or Ta; 0≤x≤1), MnO$_2$, V$_2$O$_5$, V$_6$O$_{13}$, LiV$_3$O$_8$, LiM$^{C1}_x$M$^{C2}_{1-x-y}$O$_2$ ((M$^{C1}$ or M$^{C2}$=Fe, Mn, Ni, Co, Cr, or Ti; 0≤x≤1), Li$_3$V$_{2-x}$M$^1_x$(PO$_4$)$_3$ (M$^1$=Cr, Co, Fe, Mg, Y, Ti, Nb, or Ce; 0≤x≤1), LiVPO$_4$F, LiM$^{C1}_x$M$^{C2}_{1-x}$O$_2$ ((M$^{C1}$ and M$^{C2}$ independently are Fe, Mn, Ni, Co, Cr, Ti, Mg, or Al; 0≤x≤1), LiM$^{C1}_x$M$^{C2}_y$M$^{C3}_{1-x-y}$O$_2$ ((M$^{C1}$, M$^{C2}$, and M$^{C3}$ independently are Fe, Mn, Ni, Co, Cr, Ti, Mg, or Al; 0≤x≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y<0.5), xLi$_2$MnO$_3$·(1−x)LiM$^{C1}_y$M$^{C2}_z$M$^{C3}_{1-y-z}$O$_2$ (M$^{C1}$, M$^{C2}$, and M$^{C3}$ independently are Mn, Ni, Co, Cr, Fe, or mixture thereof; x=0.3-0.5; y≤0.5; z≤0.5), Li$_2$M$^2$SiO$_4$ (M$^2$=Mn, Fe, or Co), Li$_2$M$^2$SO$_4$ (M$^2$=Mn, Fe, or Co), LiM$^2$SO$_4$F (M$^2$=Fe, Mn, or Co), Li(Fe$_{1-y}$Mn$_y$)P$_2$O$_7$ (0≤y≤1), Cr$_3$O$_8$, Cr$_2$O$_5$, a carbon/sulfur composite, or an air electrode.

26. The battery of any one of clauses 22-24, wherein: the active salt comprises NaFSI, NaTFSI, NaBETI, NaPF$_6$, NaAsF$_6$, NaBF$_4$, NaCF$_3$SO$_3$, NaClO$_4$, NaBOB, NaDFOB, or any combination thereof; the solvent comprises DME, VC, FEC, DFEC, TFEC, VEC, MEC, EC, PC, DMC, EMC, DEC, MFEC, ethylene sulfite, ethylene sulfate, EVS, water, or any combination thereof; the diluent comprises TFEO, THFiPO, TDFEO, BTFEMO, TPFPO, TTPO, or any combination thereof; and the cathode comprises $Na_xMO_2$ where $0.4 \le x \le 1$, and M is a transition metal or a mixture of transition metals, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}V_0PO_4F_{0.5}$, $NaCo_2O_4$, $NaFeO_2$, a Prussian white analogue cathode, or a Prussian blue analogue cathode.

27. The battery of clause 25 or clause 26, wherein the solvent further comprises a flame retardant compound comprising triethyl phosphate, trimethyl phosphate, or a combination thereof;

28. The battery of any one of clauses 22-27, wherein the solvent and the diluent are immiscible, the electrolyte further comprising a bridge solvent having a different composition than the solvent and a different composition than the diluent, wherein the bridge solvent is miscible with the solvent and with the diluent.

29. A battery, comprising: (i) an electrolyte according to any one of clauses 1-21; (ii) an anode current collector in the absence of an anode in an uncharged state; and (iii) a cathode, wherein the battery has a coulombic efficiency 95%.

30. The battery according to any one of clauses 22-29, wherein: the active salt comprises a lithium salt or lithium salts mixture; the solvent comprises an ether; and the diluent comprises TFEO, TDFEO, or TFEO and TDFEO.

31. The electrolyte of clause 30, wherein the active salt comprises LiFSI.

32. The electrolyte of clause 30 or clause 31, wherein the solvent comprises DME.

33. The battery according to any one of clauses 22-29, wherein the electrolyte comprises, consists essentially of, or consists of: (i) LiFSI, DME, and TFEO; or (ii) LiFSI, DME, and TDFEO; or (iii) LiFSI, DME, TFEO, and TDFEO; or (iv) LiFSI, DME, TFEO, and 1,1,2,2-tetrafluoroethyl-2,2,3,3-tetrafluoropropyl ether (TTE); or (v) LiFSI, TEPa and TFEO; or (vi) LiFSI, DME, TEPa, and TFEO.

34. The battery according to clause 33, wherein the cathode comprises $LiNi_{0.3}Mn_{0.3}Co_{0.3}O_2$(NMC333), $LiNi_{0.5}Mn_{0.3}Co_{0.2}O_2$(NMC532), $LiNi_{0.6}Mn_{0.2}Co_{0.2}O_2$ (NMC622), $LiNi_{0.8}Mn_{0.1}Co_{0.1}O_2$(NMC811), or $LiCoO_2$.

35. The battery according to clause 34, comprising (i) an anode comprising lithium or a carbon/silicon composite, or (ii) an anode current collector in the absence of an anode in an uncharged state.

V. Examples

Example 1

Localized Superconcentrated Electrolytes Including TFEO in Li∥Li and Li∥Cu Cells Conventional electrolytes and a high-concentration electrolyte (HCE) were compared to LSEs including fluorinated orthoformates as the diluent. The electrolyte formulations are shown in Table 1; unless otherwise indicated, the component ratios are molar ratios. E1 and E2 are conventional electrolytes, E3 is a HCE, and E4-E6 are LSEs. The electrolytes were evaluated in Li∥Cu cells. Unless otherwise indicated, evaluations were performed at 30° C.

TABLE 1

Electrolyte number and formulations used in Example 1 study

| Electrolyte number | Formulation | Coulombic efficiency in Li∥Cu |
|---|---|---|
| E1 | 1M LiPF$_6$ in EC/EMC (3/7 by wt) +2 wt % VC | 93.86% |
| E2 | 1M LiFSI in DME | 97.14% |
| E3 | LiFSI in DME (1:1.2 molar ratio) | 98.57% |
| E4 | LiFSI in DME-TFEO (1:1.2:1 molar ratio) | 99.10% |
| E5 | LiFSI in DME-TFEO (1:1.2:2 molar ratio) | 98.87% |
| E6 | LiFSI in DME-TFEO (1:1.2:3 molar ratio) | 98.60% |

Figure 5:
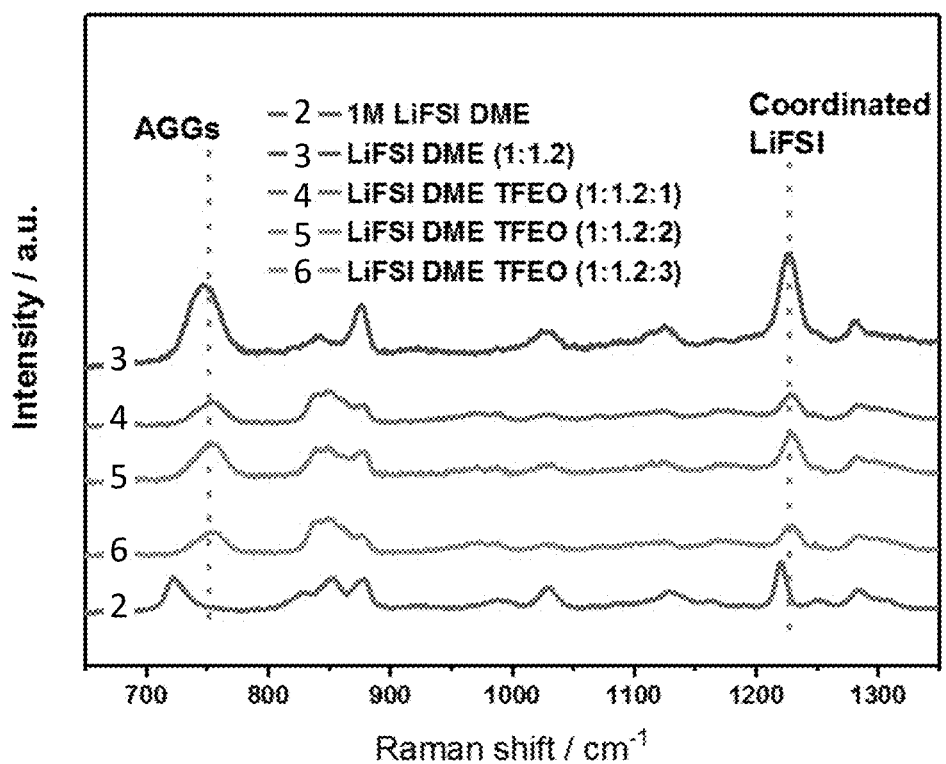
FIG. 5 shows Raman spectra of two LiFSI-DME electrolytes (1M LiFSI in DME; LiFSI in DME (1:1.2 molar ratio)), and three LiFSI-DME-TFEO electrolytes at different molar ratios—1:1.2:1, 1:1.2:2, 1:1.2:3.

The active salt, LiFSI, is insoluble in the fluorinated orthoformate (TFEO). Thus, TFEO does not participate in the solvation of LiFSI. The solvation cation-anion aggregates (AGGs) are well maintained in the LSEs, which is confirmed with Raman spectroscopy as shown in FIG. 5, and is beneficial for achieving a high CE for reversible Li deposition stripping (Table 1).

Figure 6:
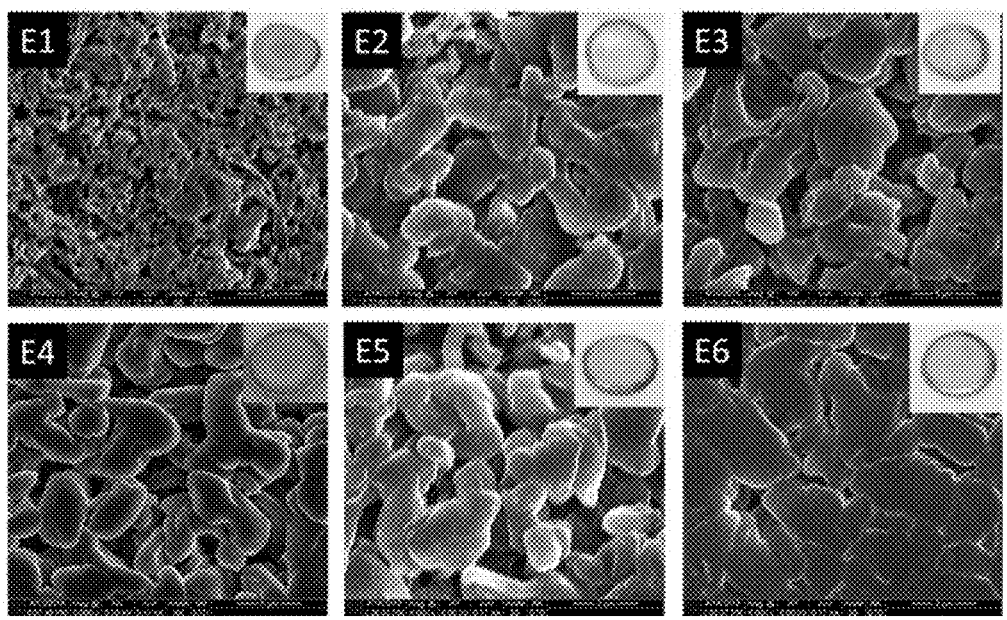
FIG. 6 is a series of SEM images of lithium deposited onto a copper substrate from a control electrolyte (1M LiPF$_6$ in EC/EMC (3/7 by wt)+2 wt % VC) and the electrolytes of FIG. 5.

FIG. 6 is a series of SEM images showing Li metal deposition in the electrolytes. The SEM images were obtained by plating 1 mAh cm$^{-2}$ Li on Cu substrate at a current density of 0.5 mA cm$^{-2}$. The Li deposited as large particles in the LiFSI-DME electrolytes (E2, E3) and the LSEs containing TFEO (E4-E6), while the control electrolyte (E1) showed dendritic Li deposition.

Figure 7:
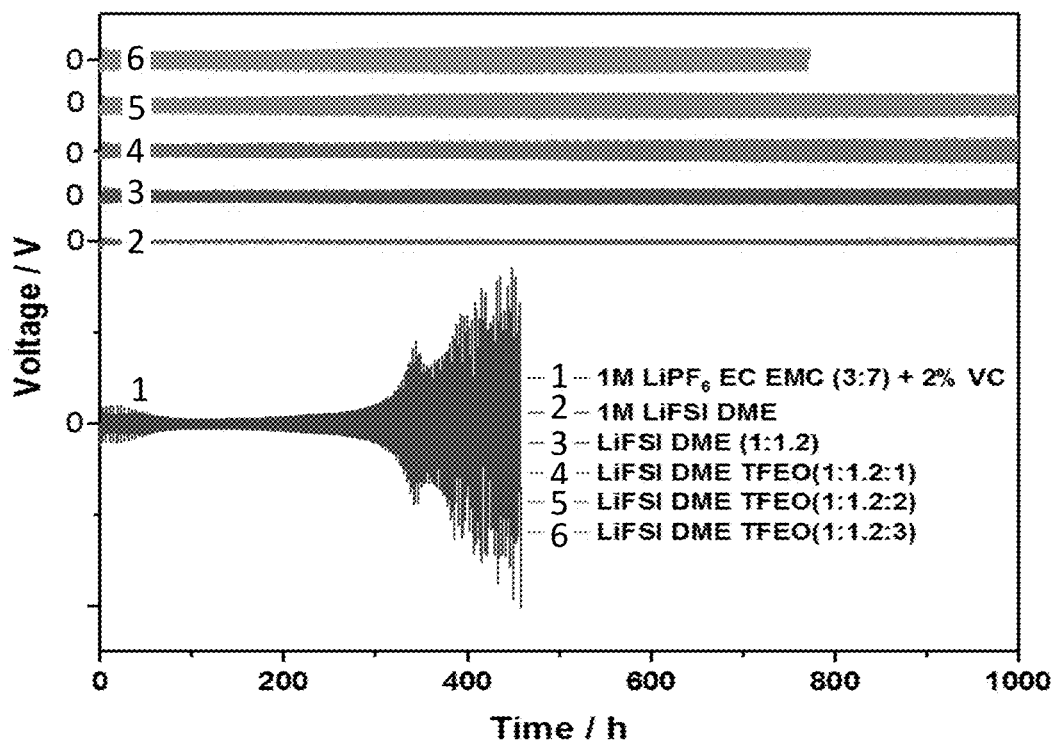
FIG. 7 shows the cycling stability of a control electrolyte (1M LiPF$_6$ in EC/EMC (3/7 by wt)+2 wt % VC) and the electrolytes of FIG. 5 in Li∥Li cells at a current density of 0.5 mA cm$^{-2}$ over a time period of 1,000 hours.

Cycling stability was evaluated in Li∥Li cells at a current density of 0.5 mA cm$^{-2}$ over a time period of 1,000 hours. Unlike E1, the LiFSI-DME electrolytes (E2, E3) and LSEs (E4-E6) all showed stable cycling (FIG. 7). Addition of TFEO (E4-E6) slightly increased polarization compared to 1M LiFSI-DME, but the electrolytes were far more stable and had a lower polarization than the control electrolyte E1.

Figure 8:
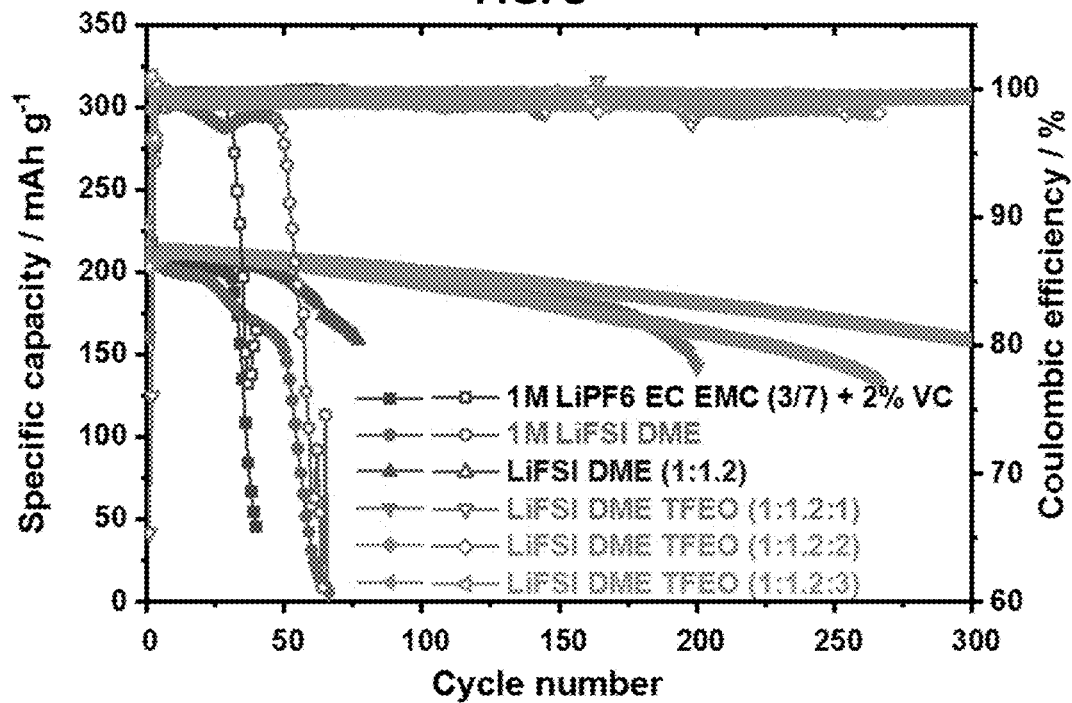
FIG. 8 shows the cycling stability of a control electrolyte (1M LiPF$_6$ in EC/EMC (3/7 by wt)+2 wt % VC) and the electrolytes of FIG. 5 in Li∥NMC811 cells over 300 cycles (closed symbols=specific capacity; open symbols=coulombic efficiency). The Li∥NMC811 cells were prepared with 1.5 mAh cm$^{-2}$ NMC811 and 50 μm Li, and were charged/discharged at C/3 after two formation cycles at C/10.
Figure 9A:
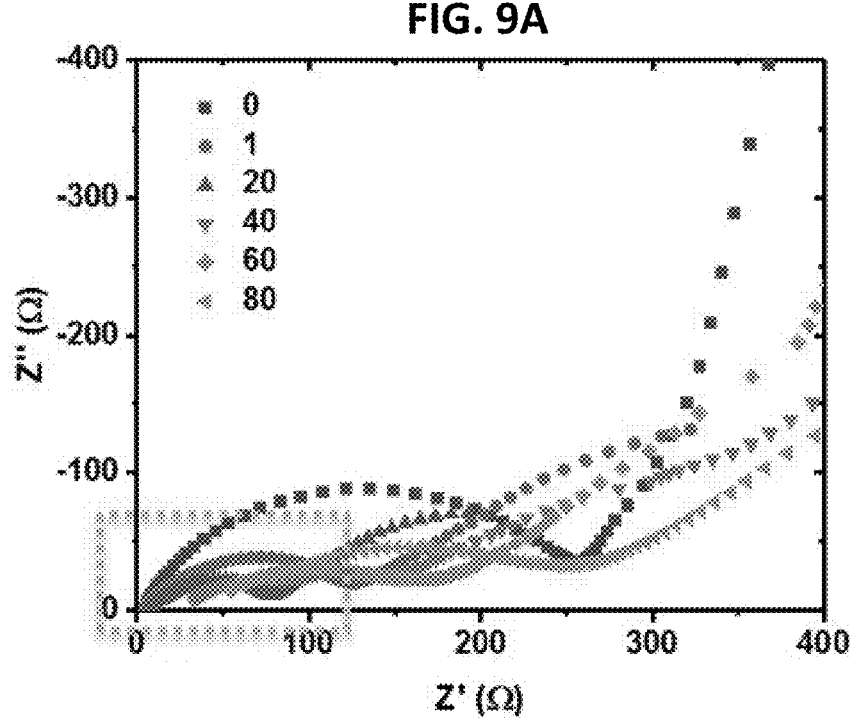
Figure 9B:
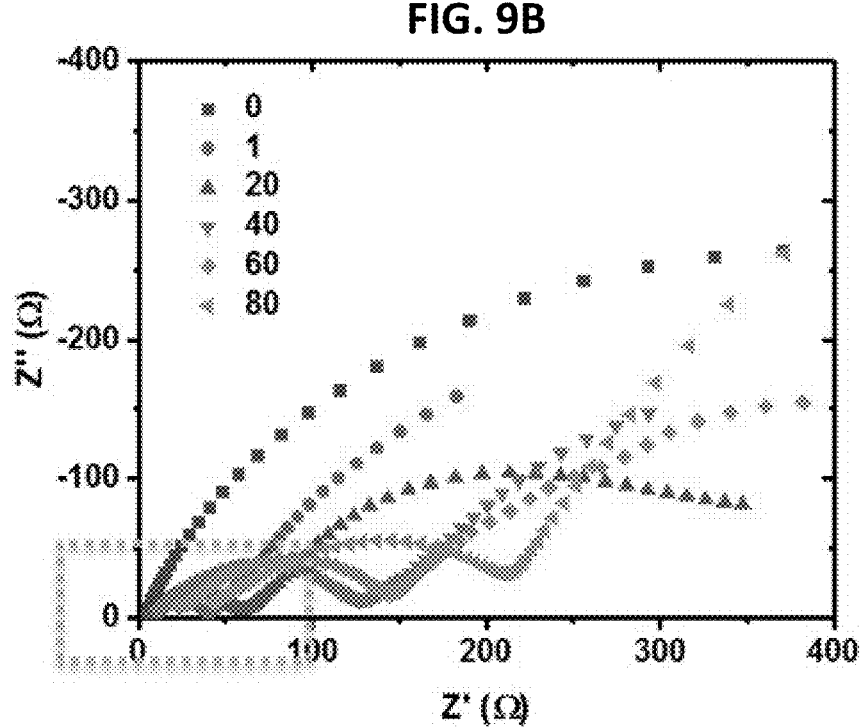
Figure 9E:
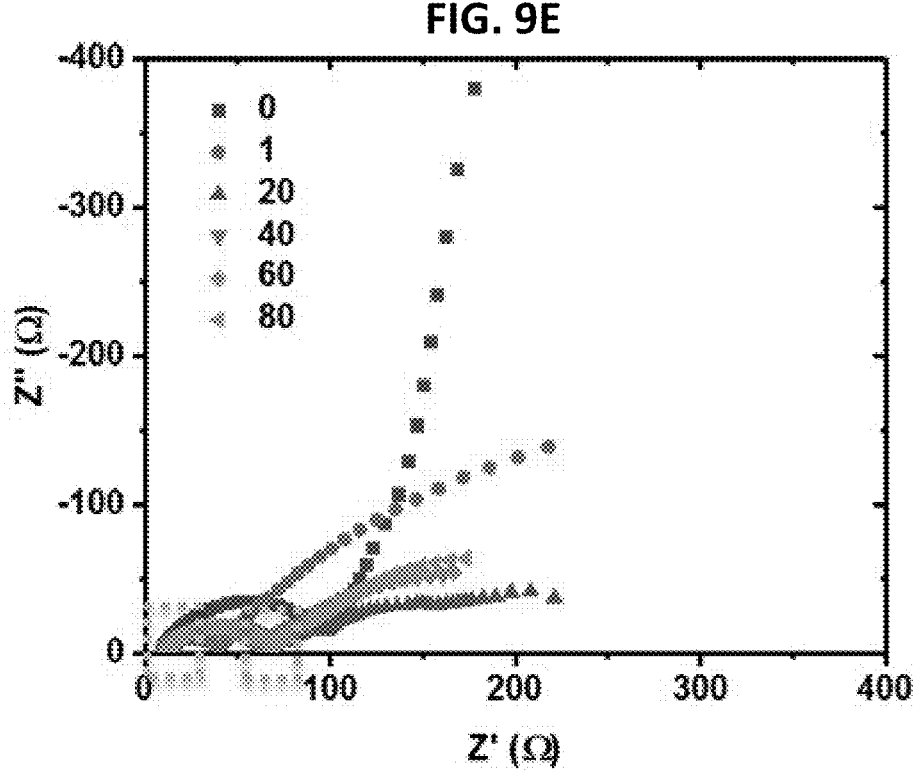
Figure 9F:
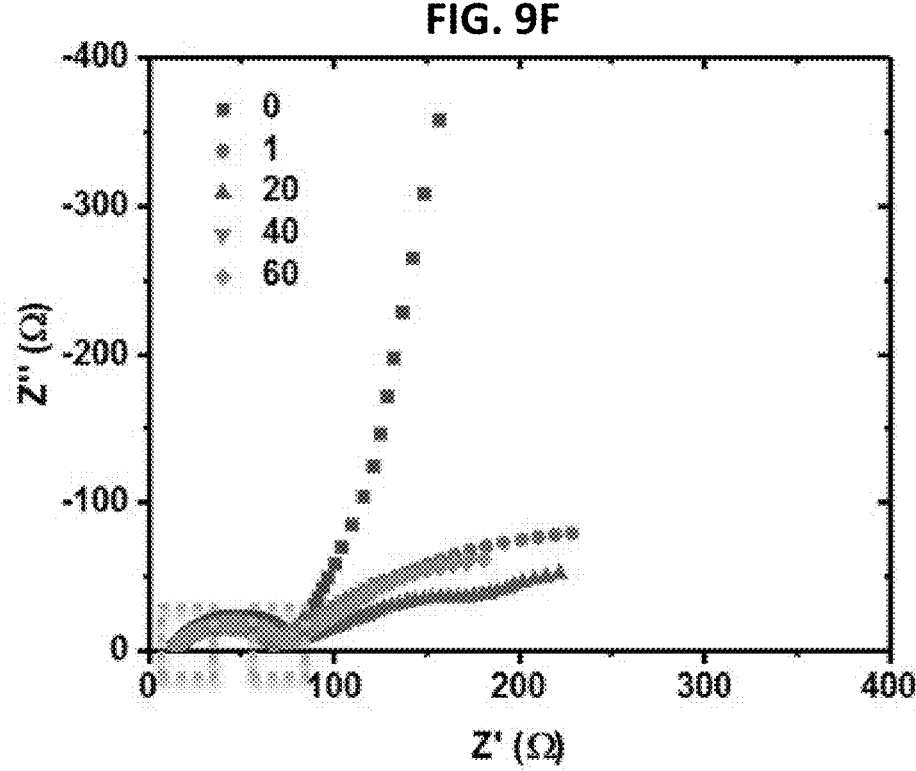

The TFEO-containing electrolytes showed much better cycling performance in Li∥NMC811 cells. As shown in FIG. 8, cells with electrolyte E6 (LiFSI-DME-TFEO (1:1.2:3 molar ratio)) showed cycling stability up to 300 cycles with up to 80% specific capacity retention (solid symbols) and coulombic efficiency near 100% (open symbols), while the cells with control electrolyte (E1) and concentrated LiFSI-DME electrolyte (E3) only maintained 50 and 100 stable cycles, respectively. The Li∥NMC811 cells were prepared with 1.5 mAh cm$^{-2}$ NMC811 and 50 μm Li, and were charged/discharged at C/3 after two formation cycles at C/10.

The TFEO-containing electrolytes also showed much more consistent impedance values upon cycling in Li∥NMC811 cells compared to electrolytes E1-E3. FIGS. 9A-9F show the impedance evolution over time; impedance was measured every 20 cycles. Electrolytes E1 and E2 showed an increased value of the start point of the first semi-circle, which indicates an increase of electrolyte resistance upon cycling related to electrolyte consumption and/or high resistive decomposition products. For the concentrated LiFSI-DME and TFEO containing electrolyte, the start point of the first semi-circle was constant, indicating that these electrolytes are very stable upon cycling. The SEI layer resistance increased with increased cycling in electrolytes E1 (1M LiPF$_6$-EC-EMC (3/7 by wt)+2 wt % VC), E2 (1M LiFSI-DME), and E3 (concentrated LiFSI-DME (1:1.2 molar ratio)). But with the addition of TFEO, the SEI layer resistances did not change much in the three TFEO-containing electrolytes (E4-E6) from 20 to 80 cycles.

Figure 10A:
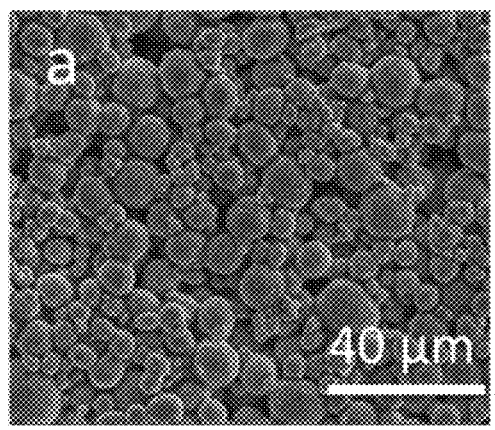
FIGS. 10A-10D are top-view SEM images of the NMC811 electrodes after cell failure with 1M LiPF$_6$ in EC/EMC (3/7 by wt)+2 wt % VC (FIG. 10A), 1M LiFSI in DME (FIG. 10B), and LiFSI in DME (1:1.2 molar ratio) (FIG. 10C), and after 170 cycles with LiFSI-DME-TFEO (1:1.2:1 molar ratio) (FIG. 10D). The Li∥NMC811 cells were prepared with 4.2 mAh cm$^{-2}$ NMC811 and 50 μm Li, and were charged/discharged at C/3 after two formation cycles at C/10.
Figure 10B:
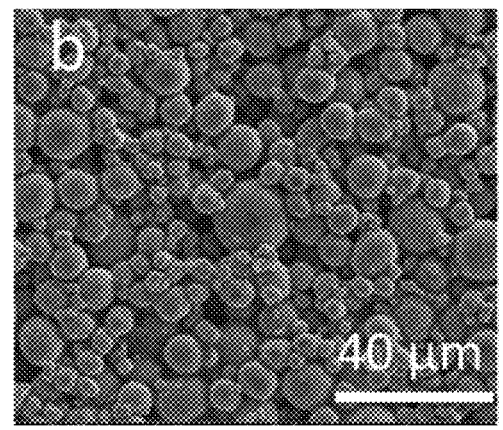
Figure 10C:
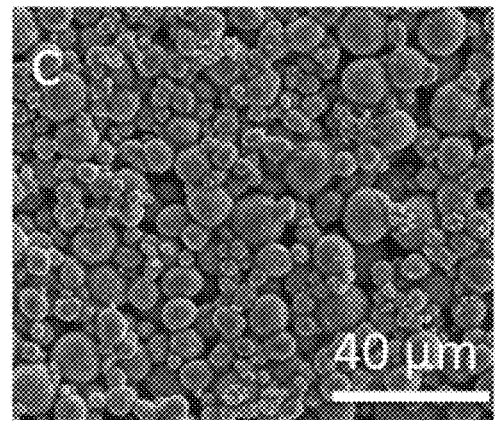
Figure 10D:
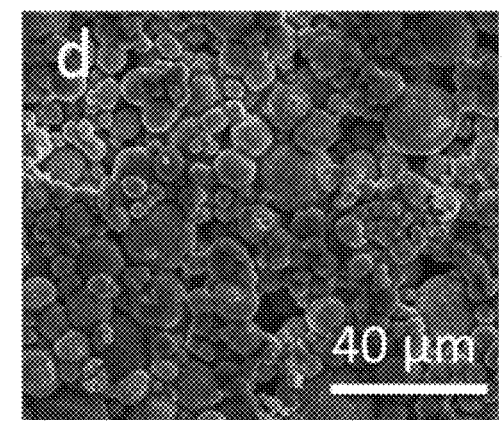

FIGS. 10A-10D are top-view SEM images of the NMC811 electrodes after cell failure with electrolytes E1 (FIG. 10A), E2 (FIG. 10B), and E3 (FIG. 10C), and after 170 cycles with electrolyte E4 (FIG. 10D). No clear differences were observed in the SEM images of the NMC811 cathodes after cell failure or long cycling. However, different results were seen with the Li metal anode. FIGS. 11A-11H are SEM images showing cross-section views (11A-11D) and top views (11E-11H) of Li metal anodes after cell failure with electrolytes E1 (FIGS. 11A, 11E), E2 (FIGS. 11B, 11F), E3 (FIGS. 11C, 11G), and after 170 cycles with electrolyte E4 (FIGS. 11D, 11H). The Li anode was completely consumed in electrolytes E1-E3, while around 20 µm Li remained in the TFEO-containing electrolyte E4 after 170 cycles. The surface images show that the TFEO-containing electrolyte provided the densest Li deposition after cycling.

Figures 12A, 12B, 12C, 12D, 12E, 12F, 12G, 12H:
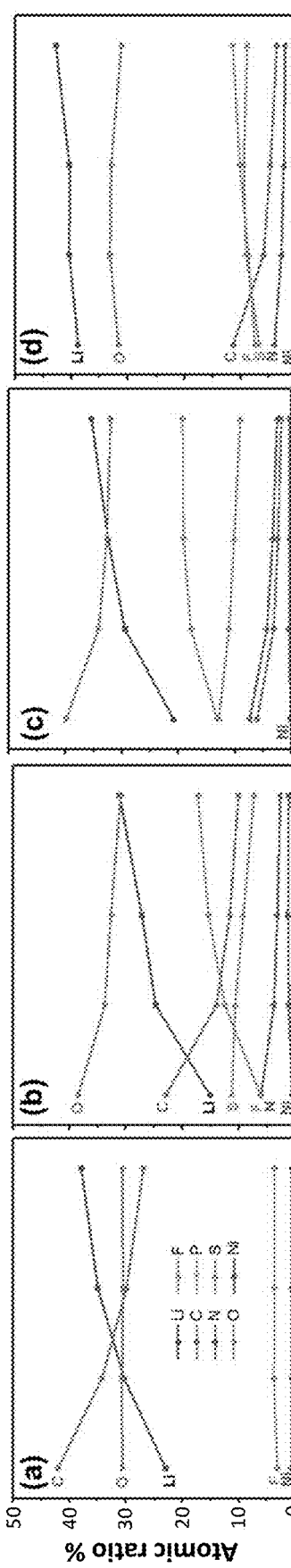
FIGS. 12A-12H are X-ray photoelectron spectroscopy (XPS) results of cycled Li (12A-12D) and cycled NMC811 (12E-12H) recollected from cells with 1M LiPF$_6$ in EC/EMC (3/7 by wt)+2 wt % VC (FIGS. 12A, 12E), 1M LiFSI in DME (FIGS. 12B, 12F), and LiFSI in DME (1:1.2 molar ratio) (FIGS. 12C, 12G), LiFSI-DME-TFEO (1:1.2:3 molar ratio) (FIGS. 12D, 12H) after 100 cycles. The Li∥NMC811 cells were prepared with NMC811 (with an areal capacity of 1.5 mAh cm$^{-2}$) and 50 μm Li, and were charged/discharged at C/3 after two formation cycles at C/10.

FIGS. 12A-12D show the atomic ratios of selected elements on the cycled Li recollected from Li‖NMC811 cells with different electrolytes. As shown in FIGS. 12A and 12B, much greater amounts of organic species containing C, O elements are observed on the solid electrolyte interphase (SEI) of the cycled Li collected from 1M LiPF$_6$ in EC/EMC (3/7 by wt)+2 wt % VC (FIG. 12A) and 1M LiFSI in DME (FIG. 12B). For the Li collected from high concentrated electrolyte (HCE) LiFSI in DME (1:1.2 molar ratio) and LSE LiFSI-DME-TFEO (1:1.2:3 molar ratio), much greater amounts of inorganic species containing Li, F are obtained (FIGS. 12C, 12D) after 100 cycles. The same trend shows in the cycled NMC811 cathode surface as well, where a more LiF-rich cathode electrolyte interphase (CEI) formed in the HCE LiFSI in DME (1:1.2 molar ratio) (FIG. 12G) and LSE LiFSI-DME-TFEO (1:1.2:3 molar ratio) (FIG. 12H) while a more organic compound-rich CEI is formed in the electrodes cycled in 1M LiPF$_6$ in EC/EMC (3/7 by wt)+2 wt % VC (FIG. 12E) and 1M LiFSI in DME (FIG. 12F). In addition to the differences on the surface of the cycled Li metal and NMC811, sputtering data shows advantages of the SEI generated on the Li metal in LSE LiFSI-DME-TFEO (1:1.2:3 molar ratio), which has great homogeneity of the elemental distribution at the different depth of the SEI form surface to bottom, while the rest electrolytes have more organic species on the surface and more inorganic species on the bottom of SEI (close to Li metal).

Figure 13A:
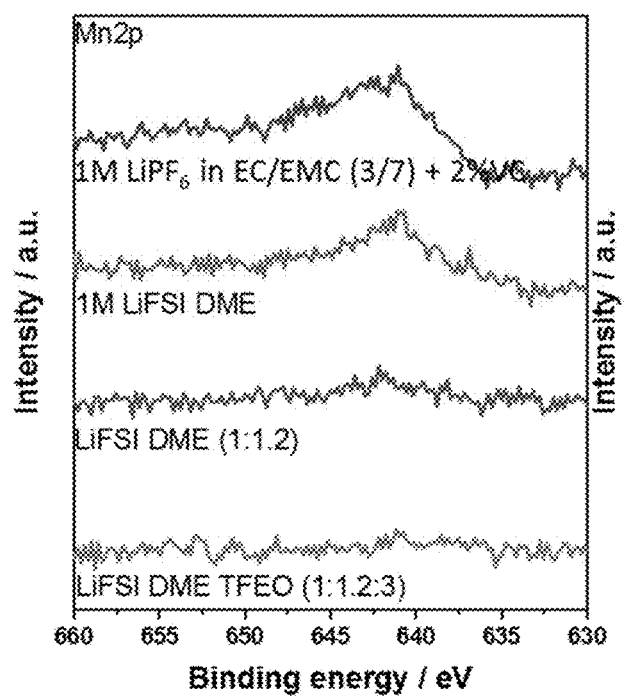
FIGS. 13A and 13B are XPS results of Mn2p (13A) and Ni3p (13B) of cycled Li recollected from the cells with the investigated electrolytes after 100 cycles. The Li∥NMC811 cells were prepared with 1.5 mAh cm$^{-2}$ NMC811 and 50 μm Li, and were charged/discharged at C/3 after two formation cycles at C/10.
Figure 13B:
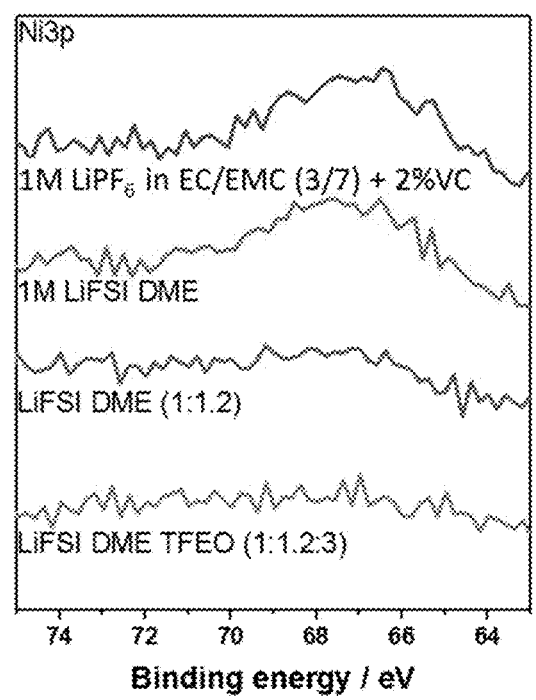
Figure 14A:
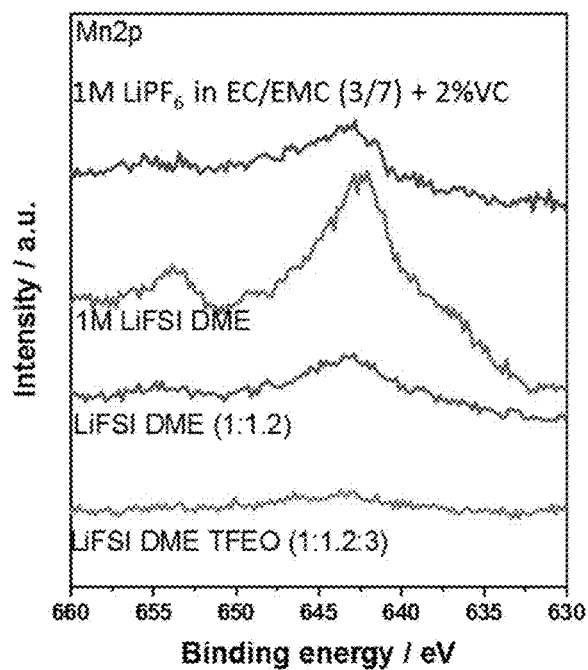
FIGS. 14A and 14B are XPS results of Mn2p (14A) and Ni3p (14B) of cycled NMC811 recollected from the cells with the investigated electrolytes after 100 cycles. The Li∥NMC811 cells were prepared with 1.5 mAh cm$^{-2}$ NMC811 and 50 μm Li, and were charged/discharged at C/3 after two formation cycles at C/10.
Figure 14B:
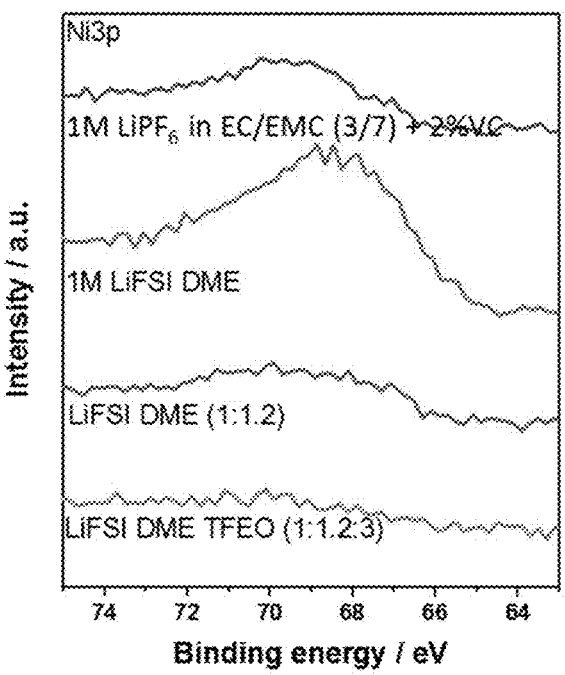

Great benefits can be gained from the homogeneous and inorganic-species-rich SEI and CEI. For example, dissolution of transition metal elements (such as Ni and Mn) from cathodes and their deposition on anodes is a known mechanism for failure of cathode materials. However, in the batteries using LiFSI-DME-TFEO (1:1.2:3 molar ratio) electrolyte, dissolution of transition metal from cathode has been greatly suppressed when the cathode is cycled. FIGS. 13A and 13B are X-ray photoelectron spectroscopy (XPS) results of Mn2p (13A) and Ni3p (13B) of the cycled Li recollected from the cells with the investigated electrolytes after 100 cycles. As shown in these figures, no Mn or Ni deposition is detected on the Li metal cycled in the LSE LiFSI-DME-TFEO (1:1.2:3 molar ratio), while small amounts of Mn and Ni are observed in HCE LiFSI in DME (1:1.2 molar ratio) and higher Mn and Ni intensities are observed on the Li metal cycled in 1M LiPF$_6$ in EC/EMC (3/7 by wt)+2 wt % VC and 1M LiFSI in DME. This is consistent with the XPS analysis on the cathode surface. FIGS. 14A and 14B show XPS spectra of Mn2p (14A) and Ni3p (14B) of cycled NMC811 recollected from the cells after 100 cycles. The lower Mn and Ni intensity observed in the NMC811 cathode cycled in LSE LiFSI-DME-TFEO (1:1.2:3 molar ratio) means the NMC811 cathode is better covered and protected by the CEI layer and the pristine NMC811 is not able to be detected by the XPS measurement. Consequently, the Mn and Ni cannot be dissolved into the electrolyte and move to Li metal anode to deposit.

Figure 15:
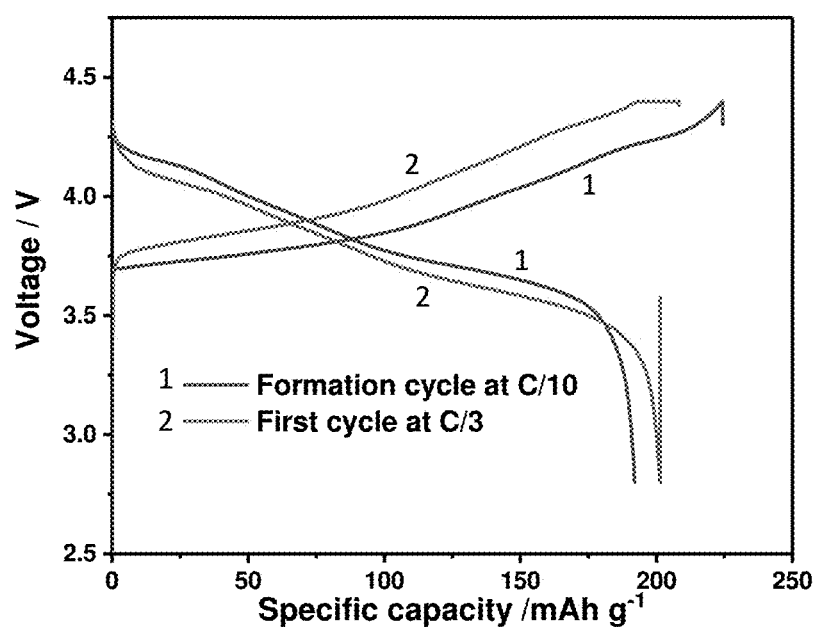
FIG. 15 is the voltage profiles of the formation cycle and first cycle at C/3 of a cell with LiFSI-DME-TFEO (1:1.2:1 molar ratio) electrolyte and a high loading cathode (4.2 mAh cm$^{-2}$) and lean electrolyte (4 g mAh$^{-1}$) condition. The cell was charged/discharged at C/3 after two formation cycles at C/10.
Figure 16:
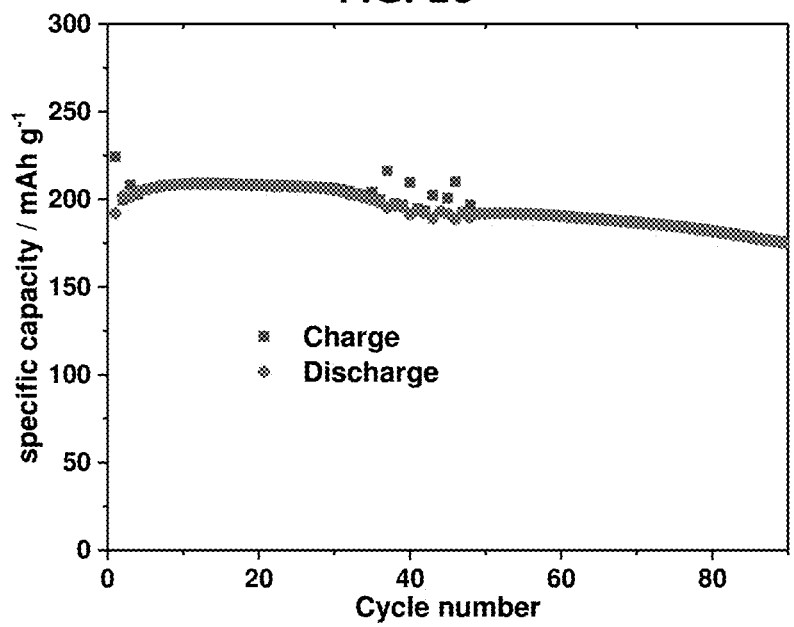
FIG. 16 shows the cycling stability of LiFSI-DME-TFEO (1:1.2:1 molar ratio) in Li∥NMC811 cells with a high loading cathode (4.2 mAh cm$^{-2}$), lean electrolyte (4 g (Ah)$^{-1}$) and limited Li (50 μm) condition. The Li∥NMC811 cells were charged/discharged at C/3 after two formation cycles at C/10.
Figures 17A, 17B, 17C, 17D:
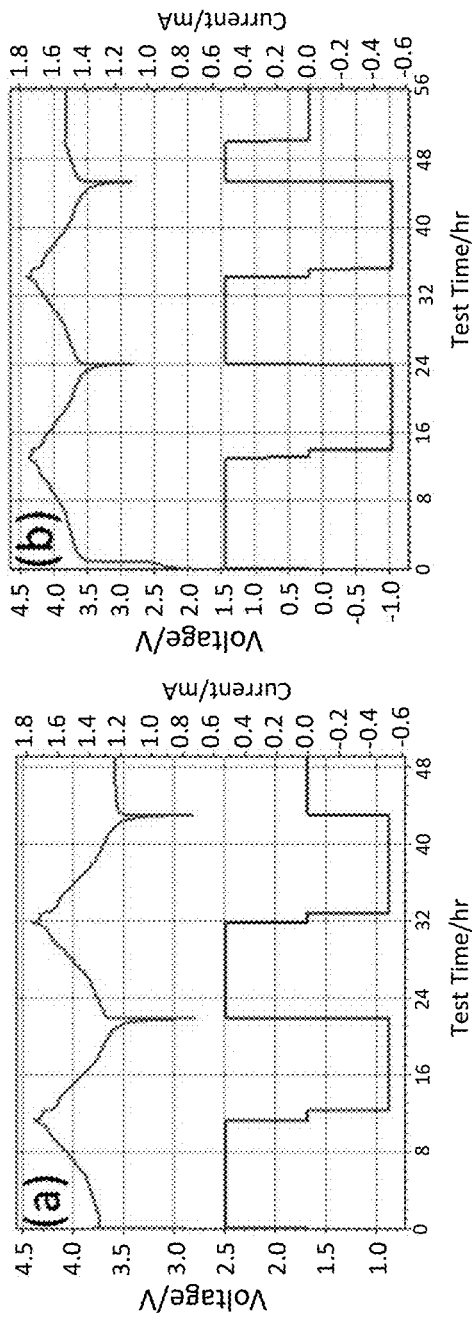
FIGS. 17A-17D are voltage profiles of Li∥NMC811 cells processed with different stages of charge (SOC) after 2 formation cycles at C/10, fully discharged to 2.8 V vs. Li/Li+(17A), 50% SOC (100 mAh/g, 17B), charge to 4.4 V vs. Li/Li+(17C) and fully charged to 4.4 V vs. Li/Li+ and continue with the constant voltage charge at 4.4 V vs. Li/Li+ to current below 0/20 or time over 1 h (17D). The Li∥NMC811 cells were prepared with 4.2 mAh cm$^{-2}$ NMC811, 50 μm Li and 10 g (Ah)$^{-1}$ electrolyte, and were charged/discharged at C/10.

The selected electrolyte LSE LiFSI-DME-TFEO (1:1.2:1 molar ratio) is also proven to work in the practical condition when a high loading cathode (4.2 mAh cm$^{-2}$), limited Li metal (2 times capacity of the cathode) and lean electrolyte (4 g (Ah)$^{-1}$) are used. FIG. 15 shows typical charge/discharge profiles for the NMC811 at both formation cycle (at C/10 rate) and first charge/discharge cycle (at C/3 rate). FIG. 16 shows a good capacity retention of this Li‖NMC811 cell during cycling.

Beyond the cycling stability, storage performance of the cells is also significantly important. Storage performance was evaluated at different stages of charge (SOC) after 2 formation cycles at C/10. FIGS. 17A-17D are voltage profiles of the Li‖NMC811 cells processed with different SOC, fully discharged to 2.8 V vs. Li/Li$^+$ (17A), 50% SOC (100 mAh g$^{-1}$, 17B), charged to 4.4 V vs. Li/Li$^+$ (17C) and fully charged to 4.4 V vs. Li/Li$^+$ and continued with the constant voltage (CV) charge at 4.4 V vs. Li/Li$^+$ to current below 0/20 or time over 1 h (17D).

Figure 18A:
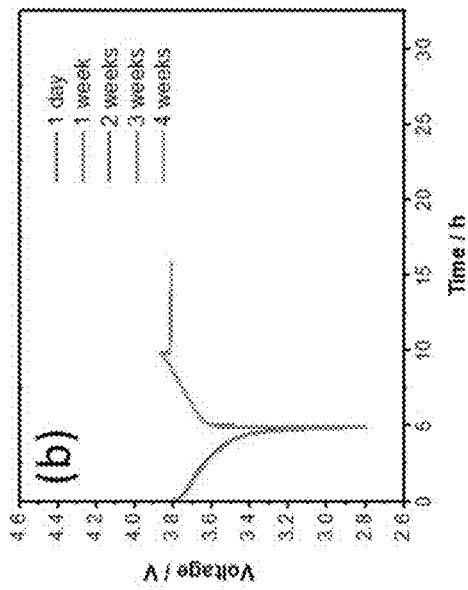
FIGS. 18A-18D are storage performance (voltage profiles) of Li∥NMC811 cell storage at different stages of charge (SOC), fully discharged to 2.8 V vs. Li/Li+(18A), 50% SOC (100 mAh/g, 18B), charge to 4.4 V vs. Li/Li+(18C) and fully charged to 4.4 V vs. Li/Li+ and continue with the constant voltage charge at 4.4 V vs. Li/Li+ to current below 0/20 or time over 1 h (18D) at 30° C. The Li∥NMC811 cells were prepared with 4.2 mAh cm$^{-2}$ NMC811, 50 μm Li and 10 g (Ah)$^{-1}$ electrolyte, and were charged/discharged at C/10.
Figure 18B:
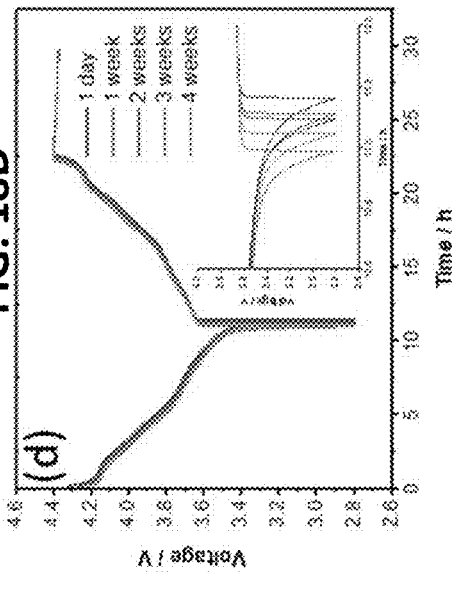
Figure 18C:
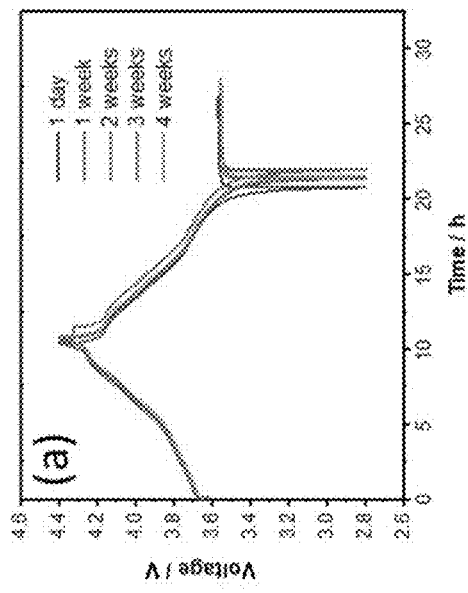
Figure 18D:
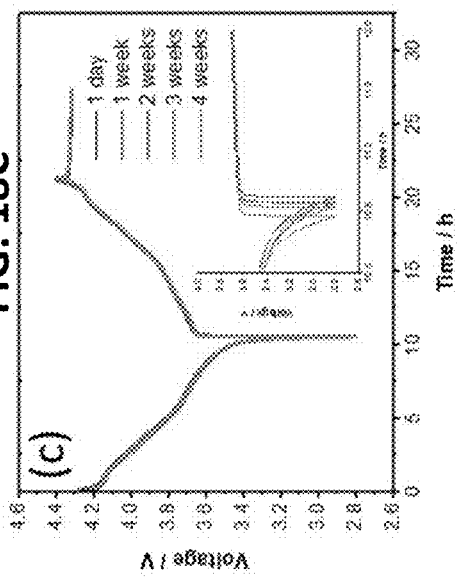
Figure 19A:
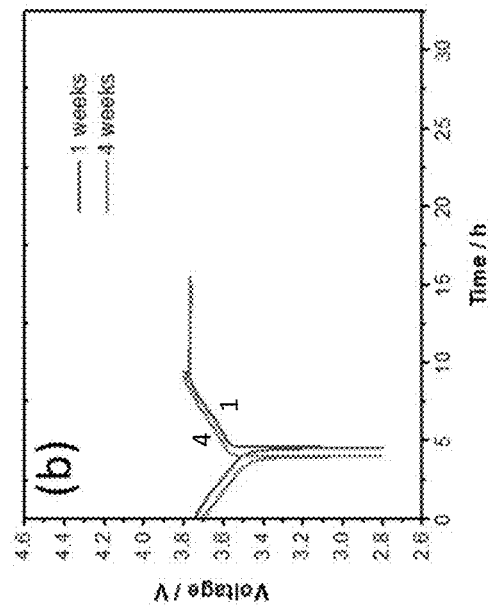
FIGS. 19A-19D are storage performance (voltage profiles) of the Li∥NMC811 cells storage at different stages of charge (SOC), fully discharged to 2.8 V vs. Li/Li+(19A), 50% SOC (100 mAh/g, 19B), charge to 4.4 V vs. Li/Li+ (19C) and fully charged to 4.4 V vs. Li/Li+ and continue with the constant voltage charge at 4.4 V vs. Li/Li+ to current below 0/20 or time over 1 h (19D) at 55° C. The Li∥NMC811 cells were prepared with 4.2 mAh cm$^{-2}$ NMC811, 50 μm Li and 10 g mAh$^{-1}$ electrolyte, and were charged/discharged at C/10.
Figure 19B:
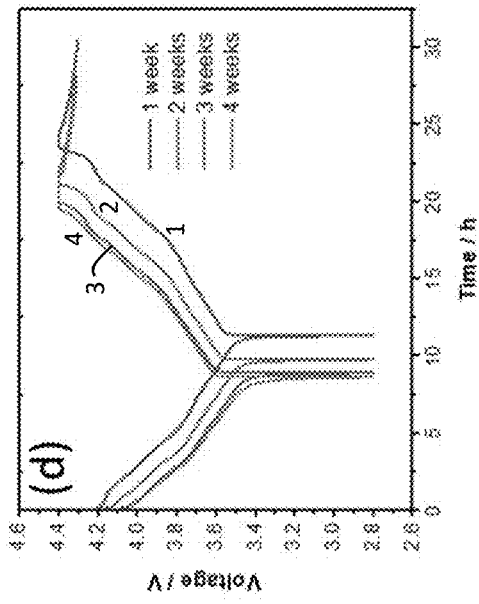
Figure 19C:
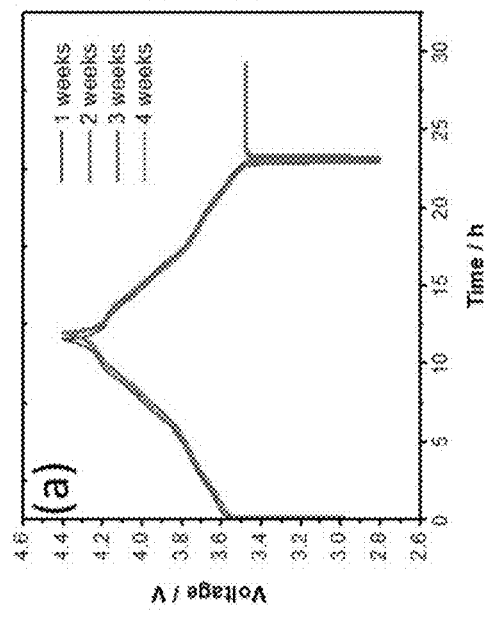
Figure 19D:
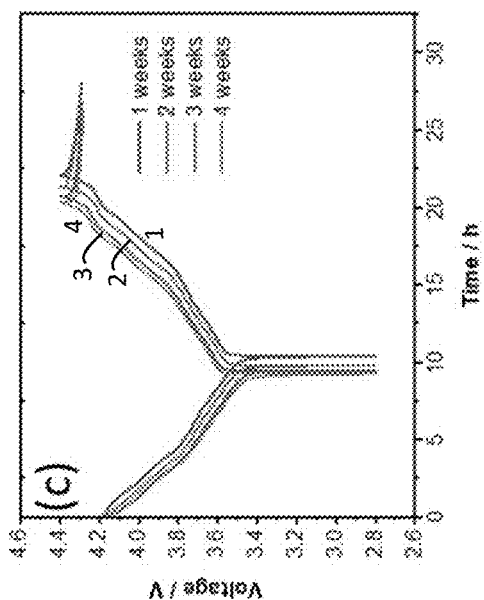

FIGS. 18A-18D show the storage performance obtained at 30° C. As shown in FIGS. 18A-18D, the selected LSE LiFSI-DME-TFEO (1:1.2:1 molar ratio) electrolyte has very good storage performance in general, which showed no capacity fading for the cells stored either at a fully discharged state (FIG. 18 A) or 50% SOC (FIG. 18B). Very small capacity fading was observed in the cells at a charged state, charged to 4.4 V vs. Li/Li$^+$ (FIG. 18C) or continued with a CV charge step (FIG. 18D). From the magnified figures shown in FIG. 18C and FIG. 18D, the CV step leads to a relatively faster capacity fading than the cell without CV charge step.

FIGS. 19A-19D are storage performance (voltage profiles) of the Li‖NMC811 cells stored at different SOC at 55° C. With the fast kinetics at elevated temperature, the capacity fading during the storage was accelerated compared to that of 30° C. But the trend of the storage performance at different SOC was the same. The storage stability trend of the Li‖NMC811 cells is: fully discharged state >50% SOC>charged to 4.4 V vs. Li/Li$^+$>fully charged to 4.4 V vs. Li/Li$^+$ with a CV step as shown in FIG. 19 A-19D.

The performance of electrolyte E6 in a Li‖Cu cell was evaluated at 5° C., 30° C., and 55° C. (FIGS. 20A-20C, respectively). When the temperature was decreased from 30° C. to 5° C., the polarization of the Li‖Cu cell increased and the average CE decreased from 99.49% to 90.15%. When the temperature was increased from 30° C. to 55° C., the polarization decreased slightly, and the CE of 99.22% was similar to the CE at 30° C.

The Li deposition provided by electrolytes E1 and E6 in Li‖Cu cells was compared at 5° C., 30° C., and 55° C. The control electrolyte E1 formed small dendritic particles at 5° C. (FIG. 21A) and 30° C. (FIG. 21B), and big granular particles at 55° C., but the Li was not uniformly deposited (FIGS. 21C-21D). In the TFEO-containing electrolyte E6, granular particles were formed at all of the investigated temperatures (FIGS. 21E-21H). The particle sizes increased as temperature increased, and the Li was deposited much more uniformly compared to E1. The SEM images of Li deposits were obtained by plating 1 mAh cm$^{-2}$ Li on Cu substrate at a current density of 0.5 mA cm$^{-2}$.

Figure 22A:
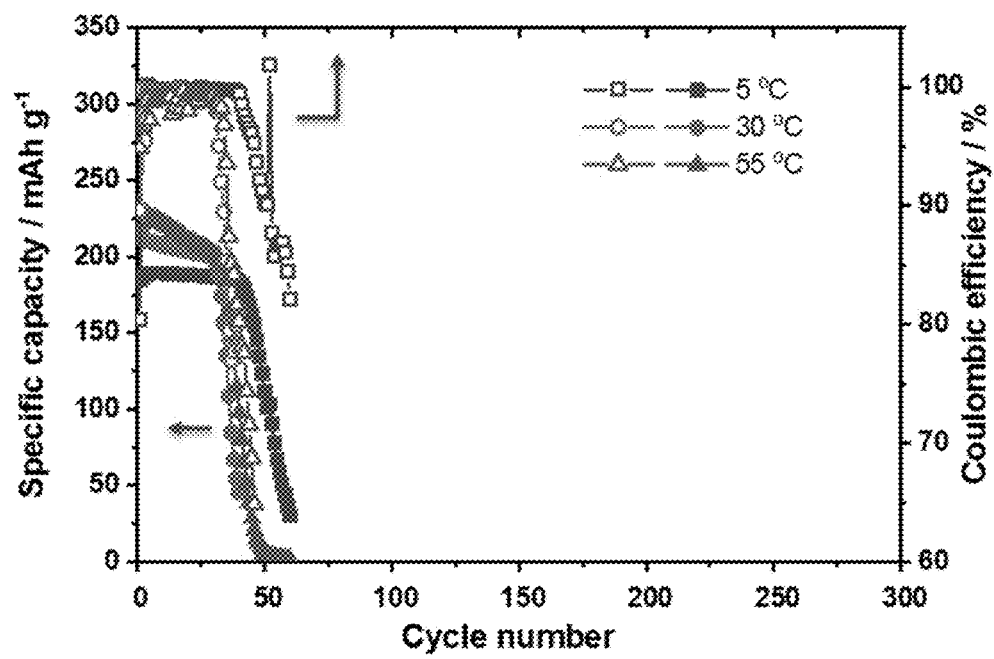
FIGS. 22A and 22B are graphs showing Li∥NMC811 cell cycling performance in 1M LiPF$_6$ EC/EMC (3/7 by wt)+2 wt % VC (FIG. 22A), and LiFSI DME TFEO (1:1.2:3 molar ratio) (FIG. 22B) at 5° C., 30° C. and 55° C. The Li∥NMC811 cells were prepared with 1.5 mAh cm$^{-2}$ NMC811 and a 50 μm Li anode, and were charged at C/3 and discharged at 10 after two formation cycles at C/10.
Figure 22B:
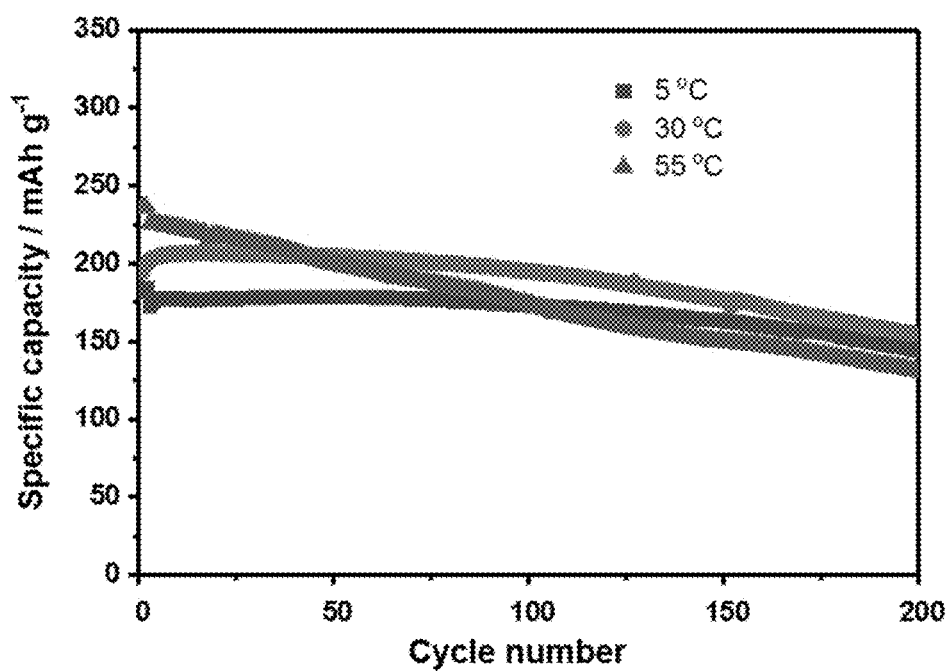

In Li‖NMC811 cells, the control electrolyte E1 exhibited no more than 50 stable cycles at 5° C., 30° C., and 55° C. (FIG. 22A). In contrast, the TFEO-containing electrolyte E6 showed extremely stable cycling over 300 cycles at 5° C., with slight capacity decay as temperature increased to 30° C.

and 55° C. (FIG. 22B). The Li||NMC811 cells were prepared with 1.5 mAh cm$^{-2}$ NMC811 and 50 μm Li. and were charged/discharged at C/3 after two formation cycles at C/10.

Figure 23A:
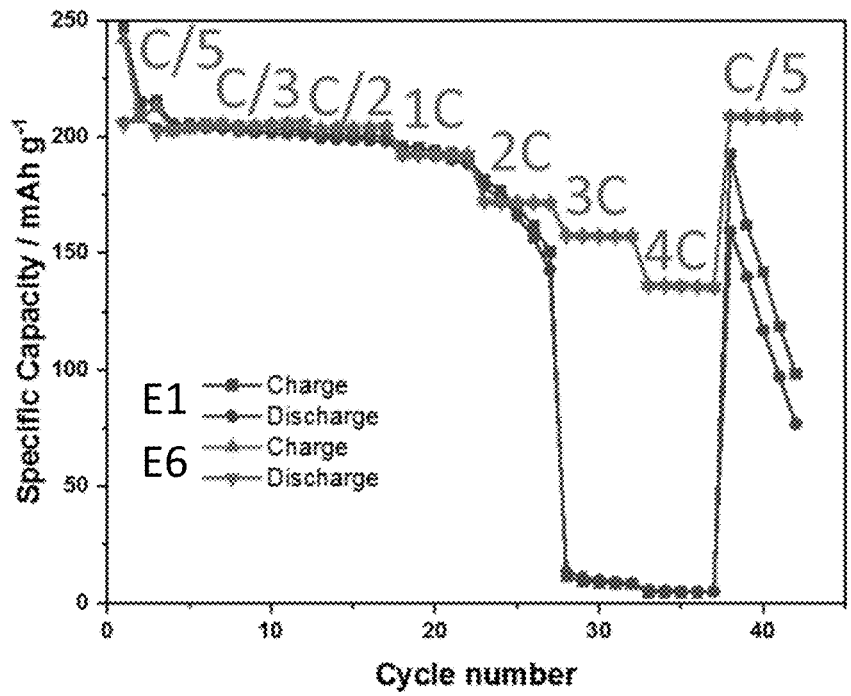
FIGS. 23A and 23B show rate performances of a Li∥NMC811 cell at different C rates at 30° C. with electrolytes of 1M LiPF$_6$ EC/EMC (3/7 by wt)+2 wt % VC and LiFSI DME TFEO (1:1.2:3 molar ratio).
Figure 23B:
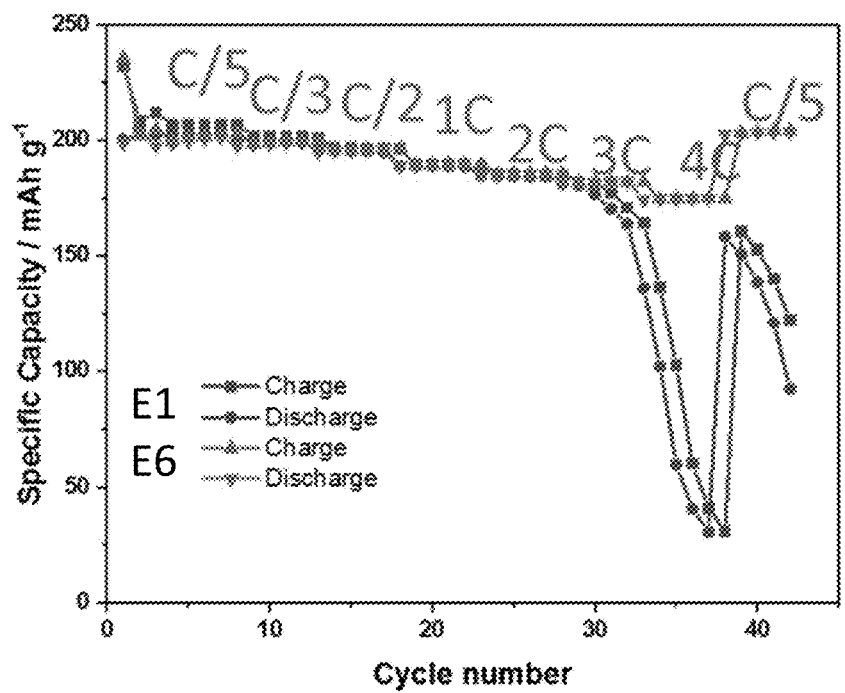

The TFEO-containing electrolytes also demonstrated very good performance in fast charge and fast discharge processes. Li||NMC811 cells were prepared with 1.5 mAh cm$^{-2}$ NMC811 and a 50 μm Li anode, and were charged and discharged after two formation cycles at C/10. FIGS. 23A and 23B show the performances of the cell with electrolyte E6 (LiFSI DME TFEO (1:1.2:3 molar ratio)) compared to the control electrolyte E1 (1M LiPF$_6$ EC/EMC (3/7 by wt)+2 wt % VC). With a constant discharge rate at C/3 and increasing charge rate from C/5 to 4C, cells with either E1 or E6 electrolyte showed very similar capacity when the cells are charged below 2C (FIG. 23A). However, when the charge rate was increased to 2C, the capacity obtained with the TFEO electrolyte E6 was significantly improved compared to the carbonate electrolyte E1, with a specific discharge capacity of 160 mAh g$^{-1}$ at 3C charge and 137 mAh g$^{-1}$ at 4C. The specific capacity also recovered to 220 mAh g$^{-1}$ after the charge rate was decreased back to a slow rate of C/5 with the TFEO electrolyte E6, while fast capacity fading was seen with the carbonate electrolyte E1. For the cells with constant charge rate of C/3 and different discharge rates as shown in FIG. 23B, similar performances were obtained with a discharge rate below 3C, but the TFEO electrolyte E6 had much better performances at high C rates, with a specific capacity of 182 mAh g$^{-1}$ at 3C discharge and 178 mAh g$^{-1}$ at 4C discharge.

Figure 24A:
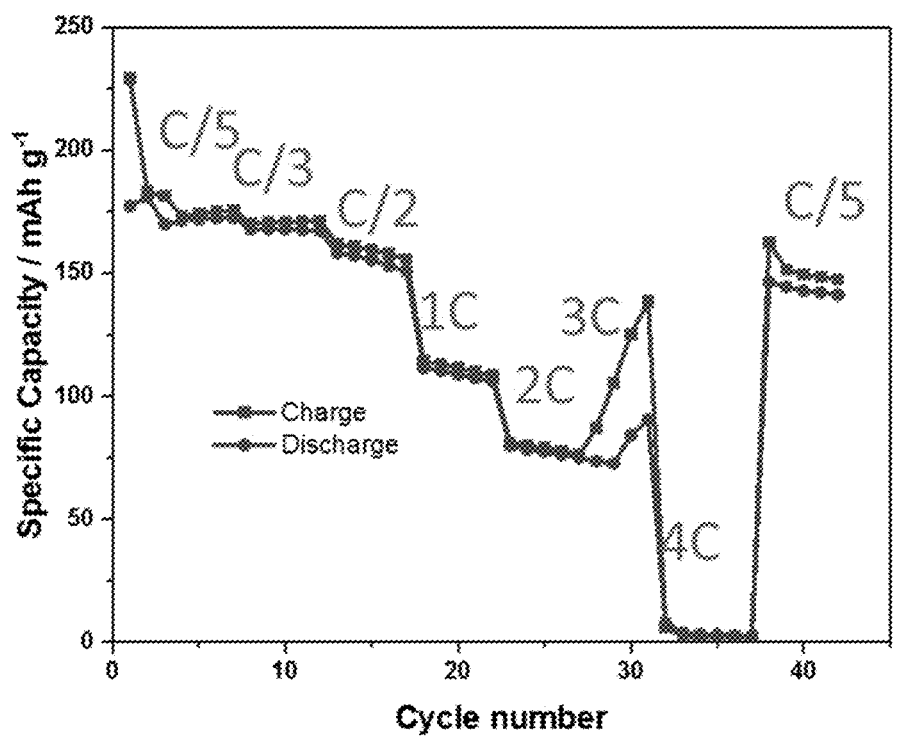
FIGS. 24A and 24B show rate performances of a Li∥NMC811 cell at different C rates at 5° C. with an electrolyte of LiFSI-DME-TFEO (1:1.2:3 molar ratio).
Figure 24B:
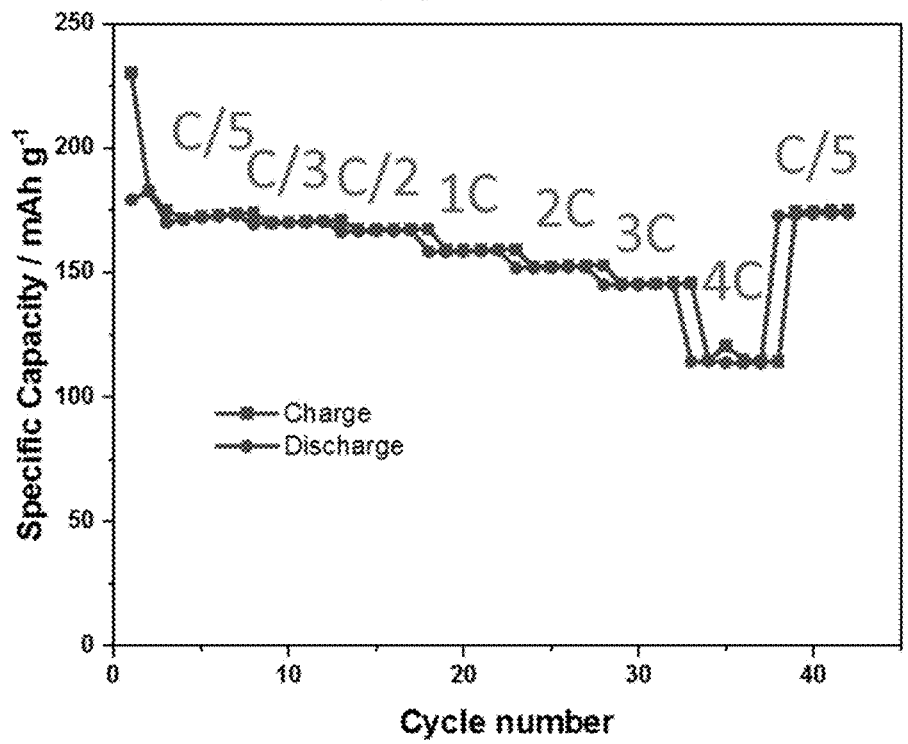

FIGS. 24A and 24B show the C-rate performances of Li||NMC811 cells with electrolyte E6 (LiFSI-DME-TFEO (1:1.2:3 molar ratio)) at 5° C. The Li||NMC811 cells were prepared with 1.5 mAh cm$^{-2}$ NMC811 and a 50 μm Li anode, and were charged and discharged after two formation cycles at C/10. For the cell with a constant discharge rate at C/3 and increasing charge rates from C/5 to 4C (FIG. 24A), the specific capacity of the cell decreased faster than with the same electrolyte at 30° C., which is attributed to the low Li$^+$ transfer kinetics at low temperature. A specific capacity of 160 mAh g$^{-1}$ was achieved at C/2, but with further increase of the charge rate to 1C and 2C, the specific capacity decreased quickly to 110 and 75 mAh g$^{-1}$, respectively. The cell could not be charged at 4C rate at 5° C. However, with a constant charge rate of C/3, the cell showed good discharge performance (FIG. 24B). Even at 4C, there was still ~110 mAh g$^{-1}$ specific capacity.

Figure 25A:
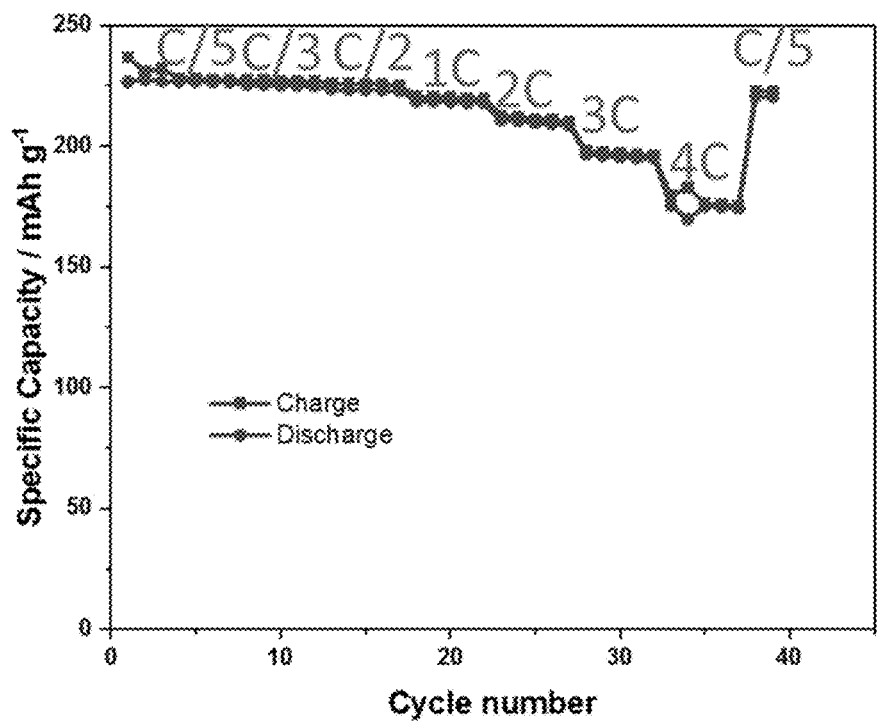
FIGS. 25A and 25B show rate performances of a Li∥NMC811 cell at different C rates at 55° C. with an electrolyte of LiFSI-DME-TFEO (1:1.2:3 molar ratio).
Figure 25B:
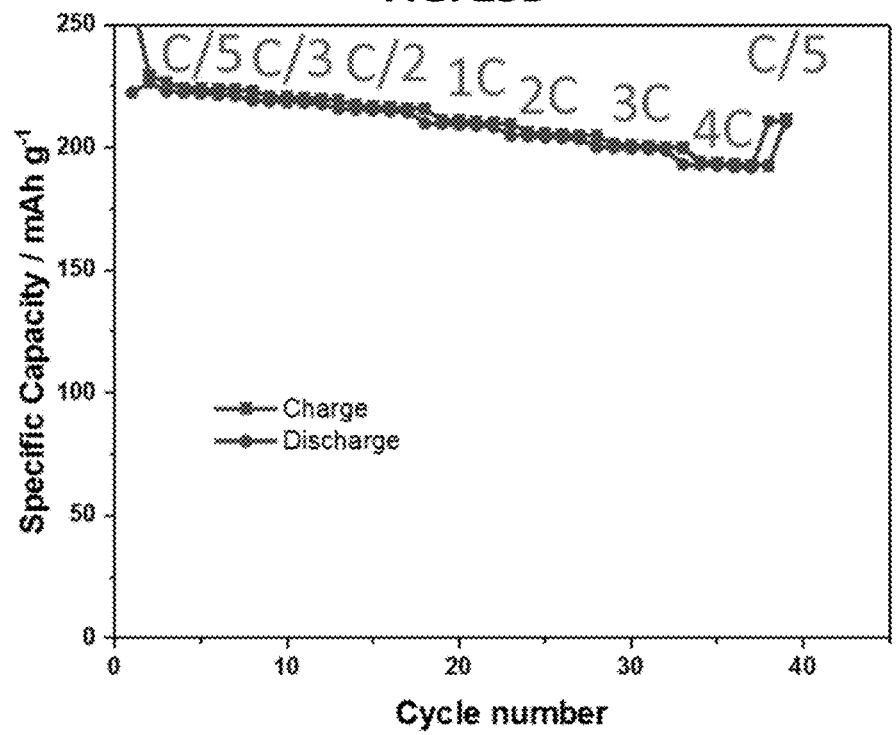

FIGS. 25A and 25B show the C-rate performances of the Li||NMC811 cell with electrolyte E6 (LiFSI DME TFEO (1:1.2:3 molar ratio)) at 55° C. The Li||NMC811 cells were prepared with 1.5 mAh cm$^{-2}$ NMC811 and a 50 μm Li anode, and were charged and discharged after two formation cycles at C/10. Very good C-rate performances were obtained both at fast charge (FIG. 25A) and fast discharge (FIG. 25B) processes. A specific capacity of 175 mAh g$^{-1}$ was seen in the 4C charge process and a specific capacity of almost 200 mAh g$^{-1}$ was seen with the 4C discharge process, which are excellent results for fast charge or fast discharge needs for battery cells.

Example 2

Localized Superconcentrated Electrolytes Including TFEO in Si/Gr||NMC Cells

Compositions of a control electrolyte (E7) and two TFEO-containing electrolytes (E4, E6) are shown in Table 2; unless otherwise indicated, the component ratios are molar ratios.

TABLE 2

Electrolyte number and formulations used in Example 2

| Electrolyte number | Formulation |
|---|---|
| E7 | 1.2M LiPF$_6$ EC/EMC (3/7 by wt.) +10 wt % FEC |
| E4 | LiFSI-DME-TFEO (1:1.2:1 molar ratio) |
| E6 | LiFSI in DME-TFEO (1:1.2:3 molar ratio) |

Cell cycling performance was evaluated in Si/Gr||NMC532 cells. The cells were prepared with 1.4 mAh cm$^{-2}$ NMC532, Si/Gr anode and were charged at C/3 and discharged at C/2 after two formation cycles at C/10. The results are shown in FIG. 26. The TFEO-containing electrolyte E4 showed significantly improved cycling stability compared to the control electrolyte E7.

A good cycling performance was also obtained with electrolyte E6 (LiFSI-DME-TFEO (1:1.2:3 molar ratio)) in Si/Gr||NMC333 cells. As shown in FIG. 27, good capacity retention of ~90.7% per 100 cycles (lower tracing) was demonstrated in the investigated voltage ranges, including 3.0-4.1V, 2.8-4.1V, and 2.8-4.3 V. CE values close to 100% were obtained (upper tracing).

Electrolyte E6 also performed well in a Si/Gr||NMC811 cell. As shown in FIG. 28, a very good capacity retention of 95.2% per 100 cycles (lower tracing) was obtained, with high CE values close to 100% (upper tracing).

Example 3

Low Flammability and Non-Flammable Electrolytes Including TFEO

The TFEO containing electrolyte LiFSI-DME-TFEO (1:1.2:1 molar ratio) was modified by addition of the non-flammable solvent TEPa to form low flammability and non-flammable electrolytes (Table 3; unless otherwise indicated, the component ratios are molar ratios). When the TEPa to DME molar ratio increased to 0.6:0.6, the electrolyte (E13) exhibited low flammability. When the TEPa to molar DME ratio was further increased to greater than 0.9:0.3, the electrolytes became non-flammable.

TABLE 3

Electrolyte number and formulations used in Example 3

| Electrolyte number | Formulation | Flammability |
|---|---|---|
| E8 | LiFSI DME TEPa TFEO (1:1.1:0.1:1 molar ratio) | flammable |
| E9 | LiFSI DME TEPa TFEO (1:1,0:0.2:1 molar ratio) | flammable |
| E10 | LiFSI DME TEPa TFEO (1:0.9:0.3:1 molar ratio) | flammable |
| E11 | LiFSI DME TEPa TFEO (1:0.8:0.4:1 molar ratio) | flammable |
| E12 | LiFSI DME TEPa TFEO (1:0.7:0.5:1 molar ratio) | flammable |
| E13 | LiFSI DME TEPa TFEO (1:0.6:0.6:1 molar ratio) | low flammability |
| E14 | LiFSI DME TEPa TFEO (1:0.5:0.7:1 molar ratio) | low flammability |
| E15 | LiFSI DME TEPa TFEO (1:0.4:0.8:1 molar ratio) | low flammability |
| E16 | LiFSI DME TEPa TFEO (1:0.3:0.9:1 molar ratio) | non-flammable |
| E17 | LiFSI DME TEPa TFEO (1:0.2:1:1 molar ratio) | non-flammable |
| E18 | LiFSI DME TEPa TFEO (1:0.1:1.1:1 molar ratio) | non-flammable |

TABLE 3-continued

Electrolyte number and formulations used in Example 3

| Electrolyte number | Formulation | Flammability |
|---|---|---|
| E19 | LiFSI TEPa TFEO (1:1.3:1 molar ratio) | non-flammable |

FIGS. 29A-29D show the coulombic efficiencies and polarization of electrolytes E4, E13, E16, and E19, respectively, when cycled in Li∥Cu cells at 30° C. over a time period of 80 hours. As the concentration of TEPa increased, there was a slight increase in the polarization and decrease in the CE. However, all of the electrolytes exhibited much higher CE than the control electrolyte E1.

These low-flammability and non-flammable electrolytes demonstrated similar Li deposition morphology as those of LiFSI-DME-TFEO (1:1.2:1 molar ratio). FIGS. 30A-30D are top-view SEM images of Li metal deposition with electrolytes E4, E13, E16, and E19, respectively. The images were obtained by plating 1 mAh cm$^{-2}$ Li on a Cu substrate at a current density of 0.5 mA cm$^{-2}$.

FIG. 31 shows the stability of electrolytes E4, E13, E16, and E19 in Li∥NMC811 cells. The electrolytes exhibited much better performance than the control electrolyte E1 (1M LiPF$_6$ in EC/EMC (3/7 by wt)+2 wt % VC). The Li∥NMC811 cells were prepared with 1.5 mAh cm$^{-2}$ NMC811 and a 50 µm Li anode, and were charged/discharged at C/3 after two formation cycles at C/10.

Example 4

Bi-Diluent Electrolytes

Some fluorinated orthoformates, TFEO as an example, have good miscibility with fluorinated ethers such as 1,1,2,2-tetrafluoroethyl-2,2,3,3-tetrapropyl ether (TTE). A mixture of fluorinated orthoformate and fluorinated ether may further expand application of the fluorinated orthoformates. A TFEO-containing electrolyte LiFSI-DME-TFEO (1:1.2:2 molar ratio) was modified by the addition of TTE to form bi-diluent electrolytes as shown in Table 4. Unless otherwise indicated, the component ratios are molar ratios.

TABLE 4

Electrolyte number and formulations used in Example 4

| Electrolyte number | Formulation |
|---|---|
| E5 | LiFSI in DME-TFEO (1:1.2:2 molar ratio) |
| E20 | LiFSI in DME-TFEO-TTE (1:1.2:1.3:0.7 molar ratio) |
| E21 | LiFSI in DME-TFEO-TTE (1:1.2:1:1 molar ratio) |
| E22 | LiFSI in DME-TFEO-TTE (1:1.2:0.7:1.3 molar ratio) |

Figure 32A:
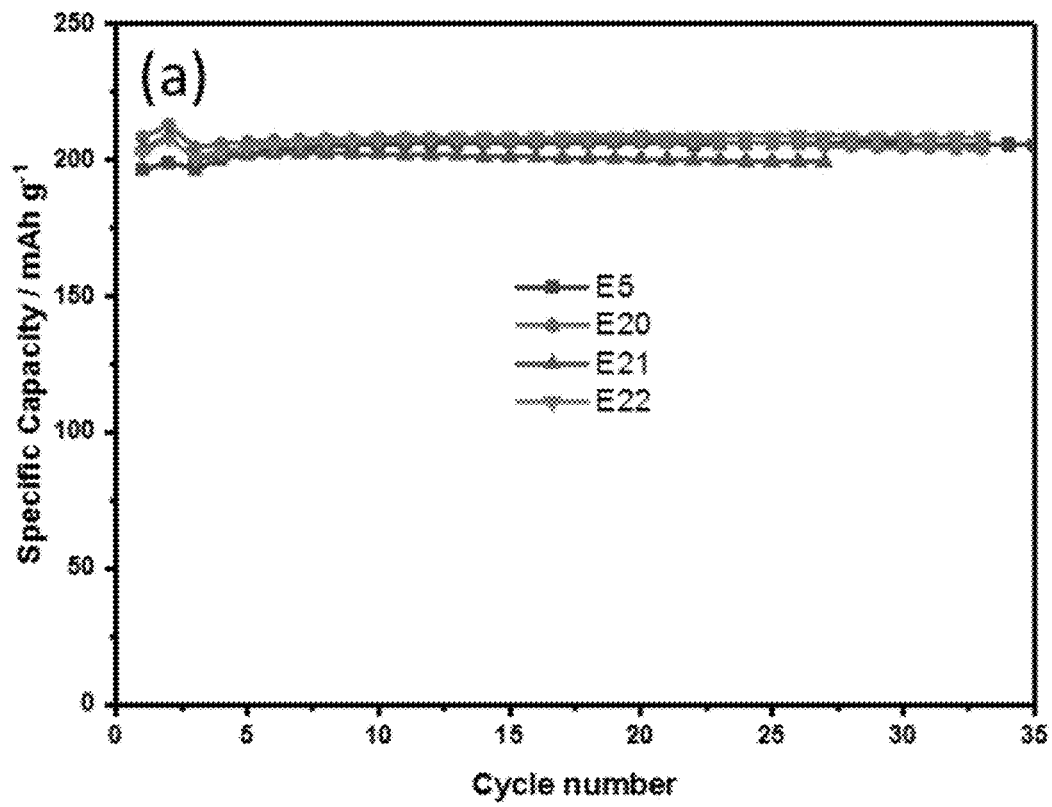
FIGS. 32A and 32B show cycling stability of bi-diluent electrolytes (LiFSI-DME-TFEO-TTE) in Li∥NMC811 cells over 35 cycles, with FIG. 32A showing specific capacity and FIG. 32B showing coulombic efficiency. The Li∥NMC811 cells were prepared with 4.2 mAh cm$^{-2}$ NMC811 and 50 μm Li, and were charged at C/3 and discharged at C/10 after two formation cycles at C/10.
Figure 32B:
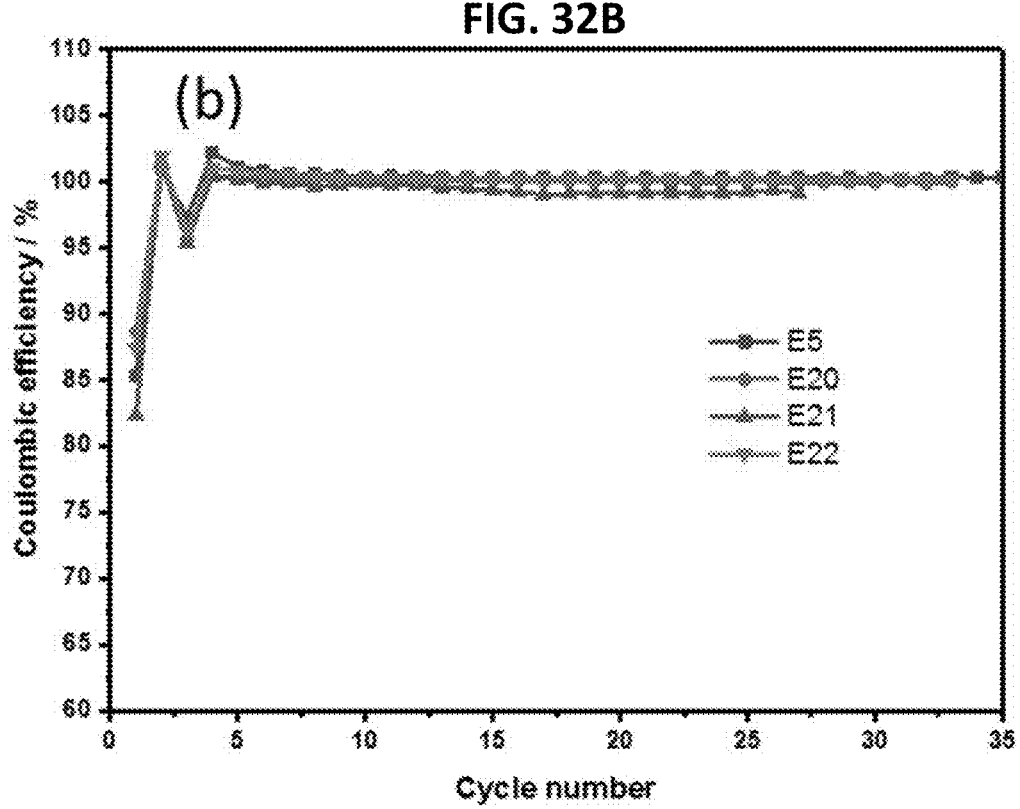

FIGS. 32A and 32B show the cycling stability of the bi-diluent electrolytes in Li∥NMC811 cells over 35 cycles. The Li∥NMC811 cells were prepared with 4.2 mAh cm$^{-2}$ NMC811 and 50 µm Li, and were charged at C/3 and discharged at C/10 after two formation cycles at C/10.

FIG. 32A shows the specific capacity of the Li∥NMC811 cells with the TFEO and TTE bi-diluent based electrolytes. All the cells showed similar specific capacity of 200 mAh g$^{-1}$ and stable cycling stability. FIG. 32B is the corresponding Coulombic efficiency (CE) of the cells. Initial CE values of 85.35%, 88.64%, 82.36% and 84.39% were found in the four electrolytes, respectively, and high CE close to 100% was demonstrated for all four electrolytes during the cycling.

Example 5

Anode-Free Batteries with TFEO- and TFEO/TTE-Based Electrolytes

Some embodiments of the TFEO based electrolyte are useful in anode free batteries, where no active anode material is used in the as-assembled cells. Instead, only Cu foil is used as an anode current collector and all the active Li source is stored in the paired cathode material prior to an initial cycle of the cell.

An anode-free cell, Cu∥LiNi$_{0.3}$Mn$_{0.3}$Co$_{0.3}$O$_2$ (NMC333), with the E6 electrolyte was prepared. The Cu∥NMC333 cells were prepared with 1.7 mAh cm$^{-2}$ NMC333, and were charged/discharged at C/3 after two formation cycles at C/10.

Figure 33:
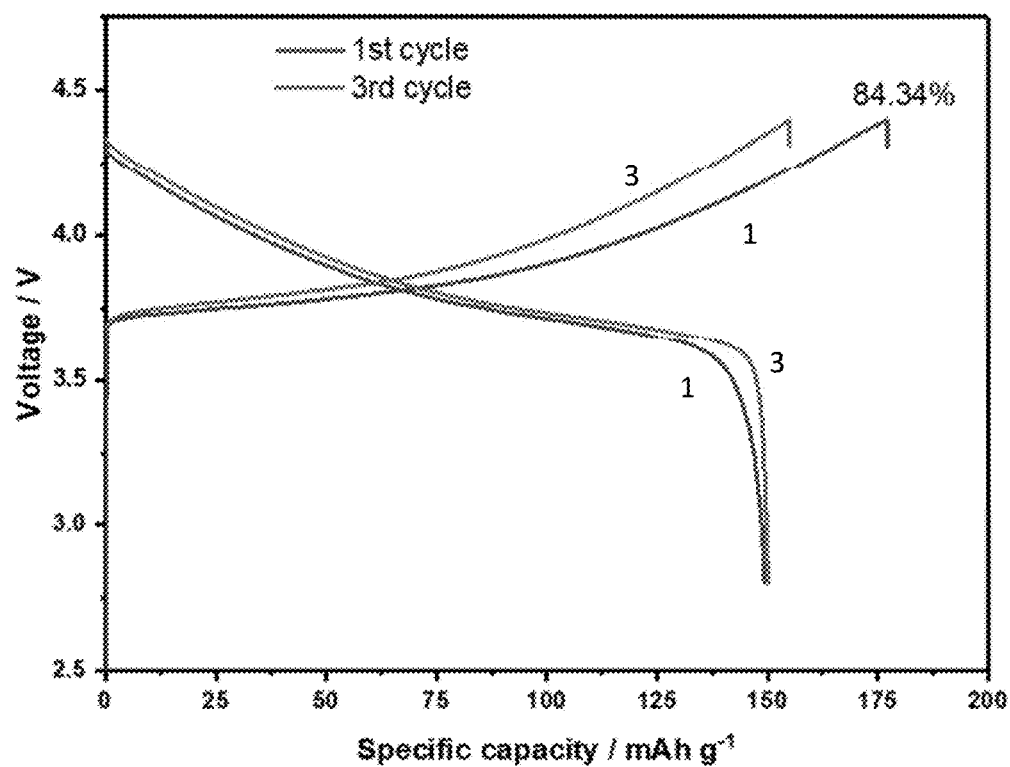
FIG. 33 shows charge-discharge curves of an anode-free cell, Cu∥LiNi$_{0.3}$Mn$_{0.3}$Co$_{0.3}$O$_2$ (NMC333), with a LiFSI-DME-TFEO (1:1.2:3 molar ratio) electrolyte. The Cu∥NMC333 cell was prepared with 1.7 mAh cm$^{-2}$ NMC811 and 50 μm Li, and was charged/discharged at C/3 after two formation cycles at C/10.
Figure 34A:
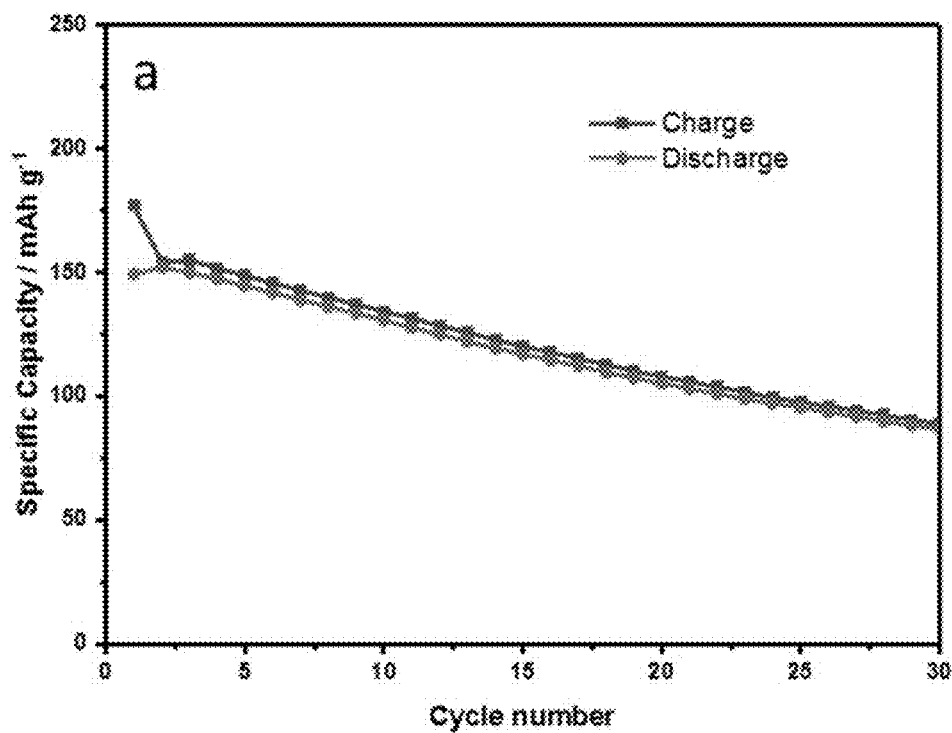
FIGS. 34A and 34B show cycling performance of the Cu∥NMC333 cells of FIG. 33, with FIG. 34A showing specific capacity and FIG. 34B showing coulombic efficiency.
Figure 34B:
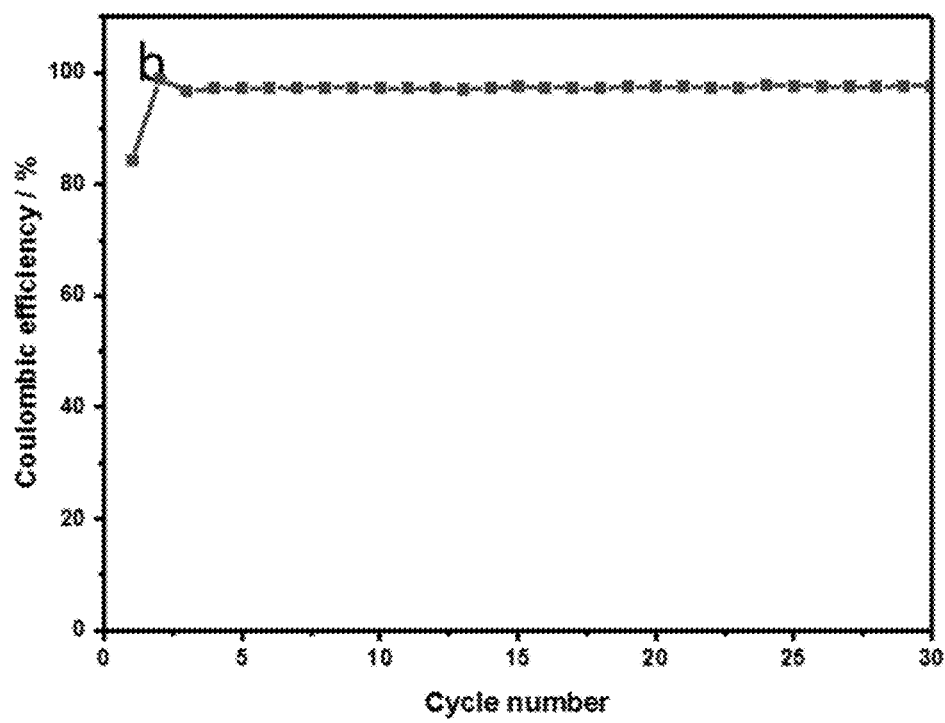

FIG. 33 shows charge-discharge curves of the cell. A specific capacity of 150 mAh/g was obtained in the first cycle at C/10 with a good initial CE of 84.34%. The same specific capacity was obtained at C/3 rate. FIGS. 34A and 34B show cycling performance of the Cu∥NMC333 cells with electrolyte E6, with FIG. 34A showing specific capacity and FIG. 34B showing coulombic efficiency. The data demonstrate that the TFEO based electrolyte provides stable cycling of anode free batteries. The average CE during cycling was 97.5%.

Figure 35:
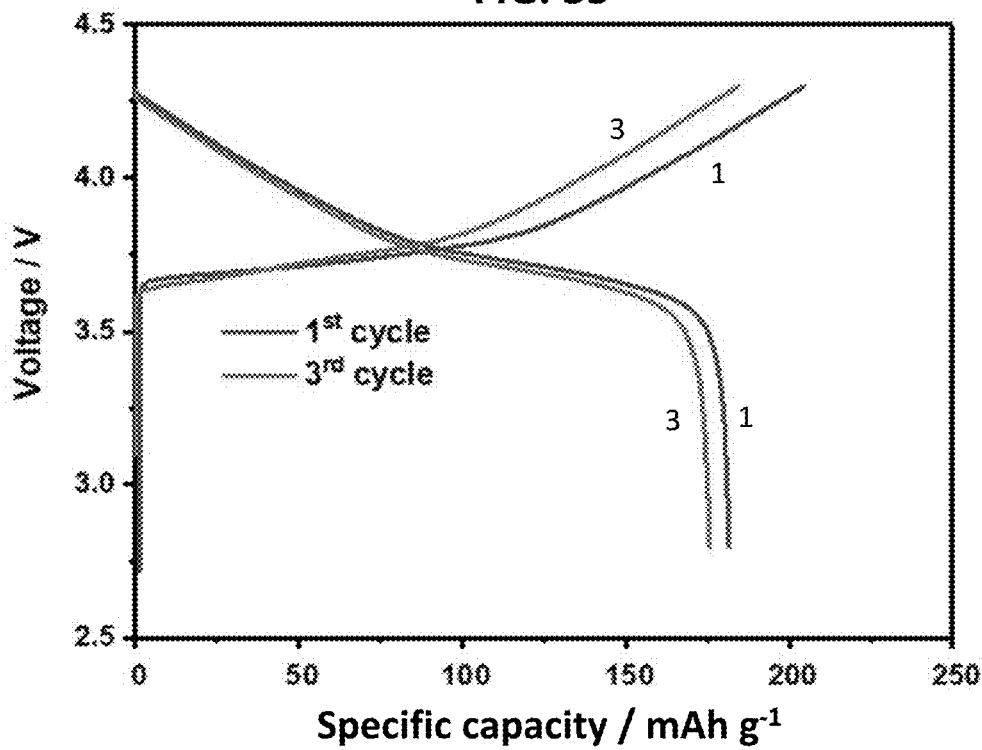
FIG. 35 shows charge-discharge curves of an anode-free cell, Cu∥LiNi$_{0.6}$Mn$_{0.2}$Co$_{0.2}$O$_2$ (NMC622), with a LiFSI-DME-TFEO-TTE (1:1.2:0.7:1.3 molar ratio) electrolyte. The cell was prepared with 4.2 mAh cm$^{-2}$ NMC622, and was charged/discharged at C/3 after two formation cycles at C/10.
Figure 36A:
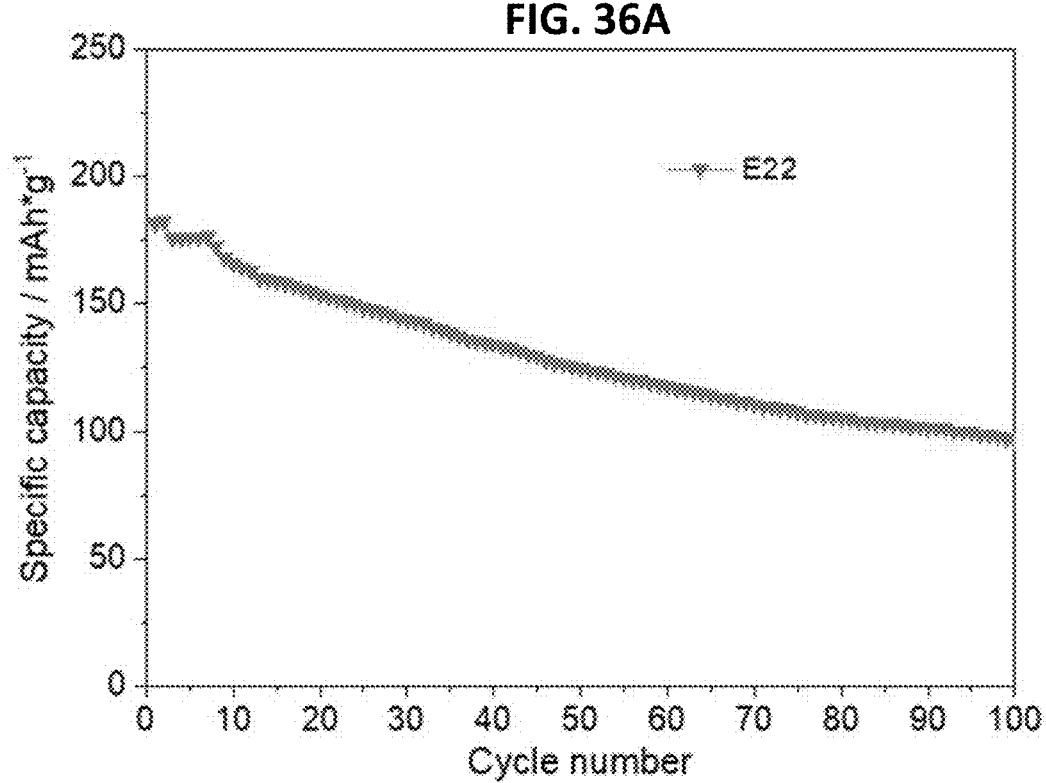
FIGS. 36A and 36B show cycling performance of the Cu∥NMC622 cells of FIG. 35, with FIG. 36A showing specific capacity and FIG. 36B showing coulombic efficiency.
Figure 36B:
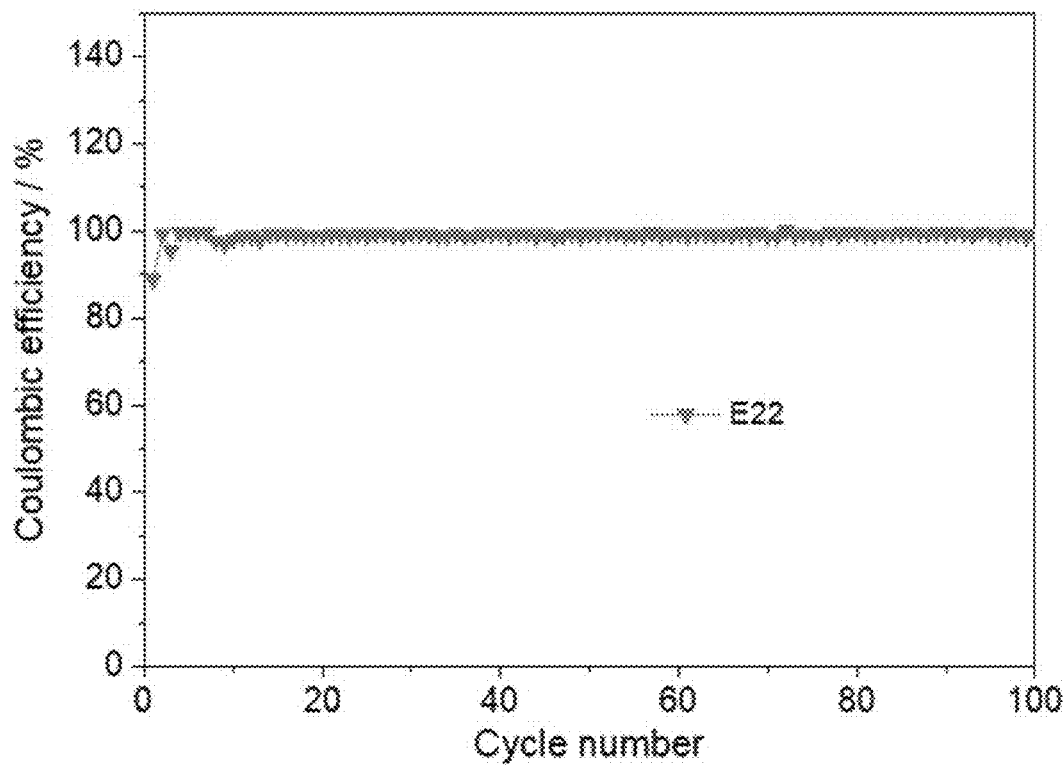

An anode free cell Cu∥LiNi$_{0.6}$Mn$_{0.2}$Co$_{0.2}$O$_2$ (NMC622) was prepared with the TFEO/TTE based electrolyte E22. The Cu∥NMC622 cell was prepared with 4.2 mAh cm$^{-2}$ NMC622, and was charged/discharged at C/3 after two formation cycles at C/10. FIG. 35 shows the charge/discharge curve of the cell. A specific capacity of 182 mAh/g was obtained in the first cycle at C/10 with a good initial CE of 89.0%. The specific capacity at C/3 rate was 176 mAh/g after first two cycles. FIGS. 36A and 36B show cycling performance of the Cu∥NMC622 cells with electrolyte E22, with FIG. 36A showing specific capacity and FIG. 36B showing coulombic efficiency. The batteries had a capacity retention of 55.2% after 100 cycles. The average CE during cycling was 99.3%.

Figure 37A:
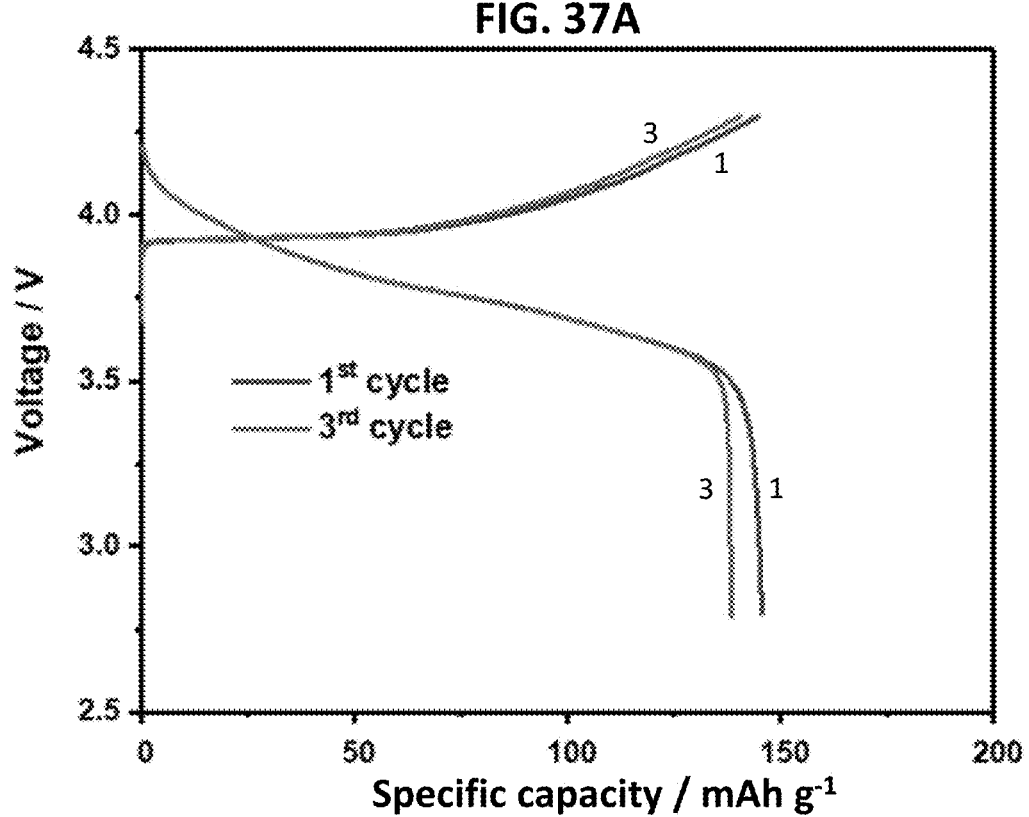
FIGS. 37A and 37B show charge-discharge curves of anode-free Cu∥LiCoO$_2$ (LCO) cells with a LiFSI-DME-TFEO (1:1.2:2 molar ratio) electrolyte (37A) and a LiFSI-DME-TFEO-TTE (1:1.2:0.7:1.3 molar ratio) electrolyte (37B). The Cu∥LCO cells were prepared with 3.2 mAh cm$^{-2}$ LCO, and then charged at C/5 and discharged at 10 after two formation cycles at 10.
Figure 37B:
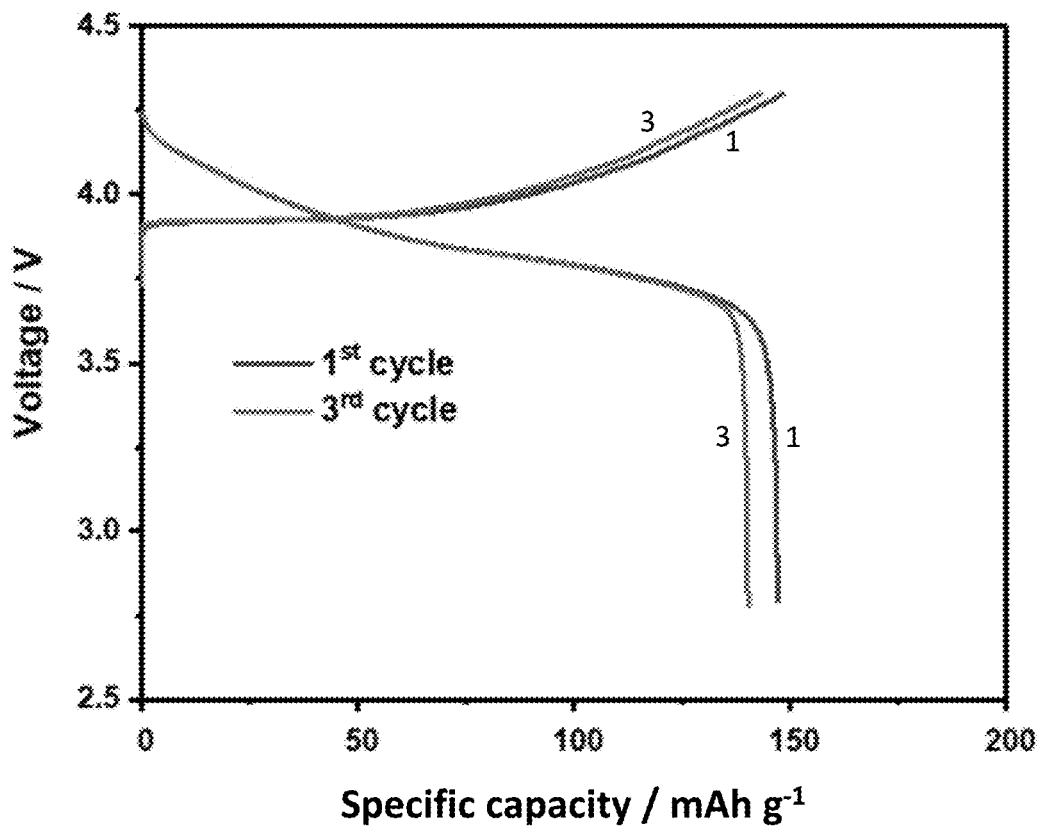
Figure 38A:
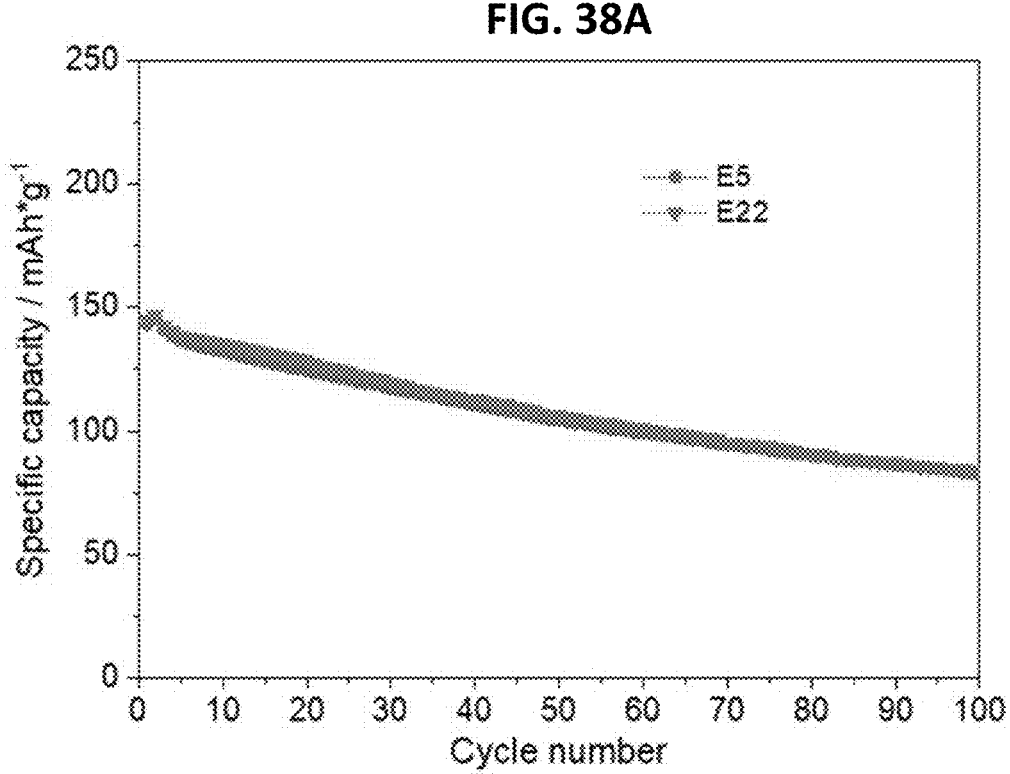
FIGS. 38A and 38B show cycling performance of the Cu∥LiCoO$_2$ cells of FIGS. 37A-37B, with FIG. 38A showing specific capacity and FIG. 38B showing coulombic efficiency.
Figure 38B:
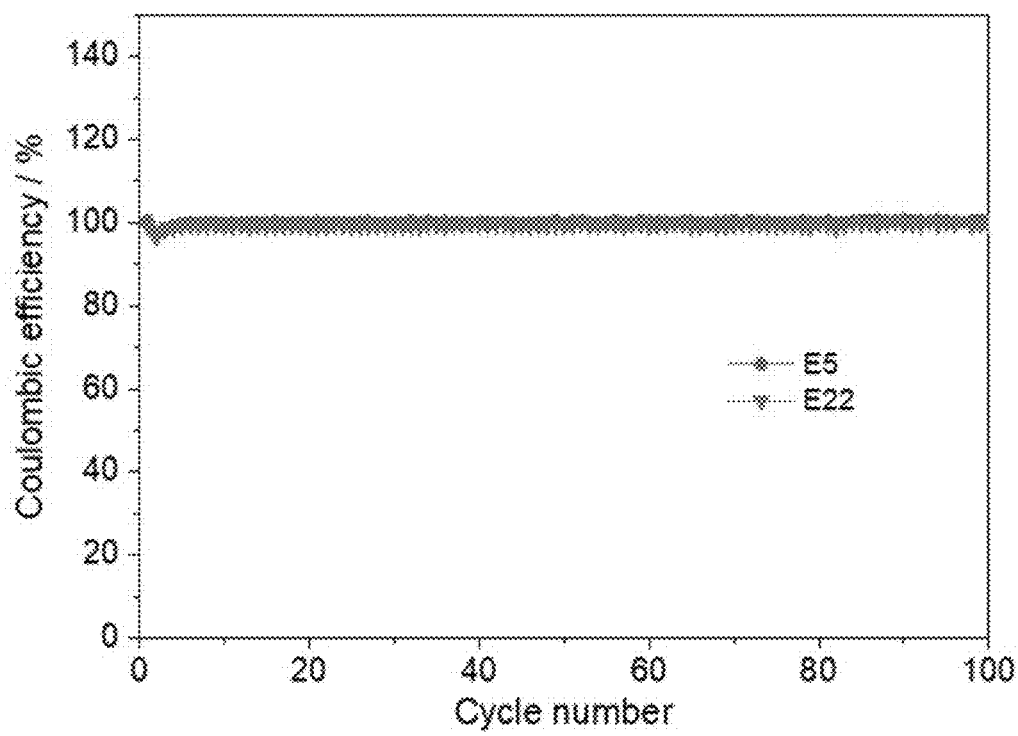

FIGS. 37A and 37B show charge/discharge curves of anode-free Cu∥LiCoO$_2$ (LCO) cells with TFEO-based electrolyte E5 (FIG. 37A) and TFEO/TTE-based electrolyte E22 (FIG. 37B). The Cu∥LCO cells were prepared with 3.2 mAh cm$^{-2}$ LCO, and then charged at C/5 and discharged at 1C after two formation cycles at C/10. E5 and E22 showed very similar performance. A specific capacity of around 145 mAh/g was obtained in the first cycle at C/10 with a good initial CE of 98.6%. The specific capacity at C/5 charge and 1C discharge was around 141 mAh/g after first two cycles. FIGS. 38A and 38B show cycling performance of the anode-free Cu∥LiCoO$_2$ cells with the E5 and E22 electrolytes. FIG. 38A shows specific capacity and FIG. 38B shows coulombic efficiency. The data demonstrates that both the TFEO and TFEO/TTE based electrolytes enabled cycling of anode free batteries, with a capacity retention of 60% after 100 cycles. The average CE during cycling was 99.4%.

Example 6

TDFEO-Based Electrolytes

Tris(2,2-difluoroethyl)orthoformate (TDFEO)-based electrolytes were evaluated in Li metal cells and anode free cells. Table 5 shows the electrolyte number and formulations of the electrolytes with TDFEO.

TABLE 5

Electrolyte number and formulations used in Example 5

| Electrolyte number | Formulation |
|---|---|
| E23 | LiFSI in DME-TDFEO (1:1.2:3 molar ratio) |
| E24 | LiFSI in DME-TDFEO (1:1.2:2 molar ratio) |

Figure 40B:
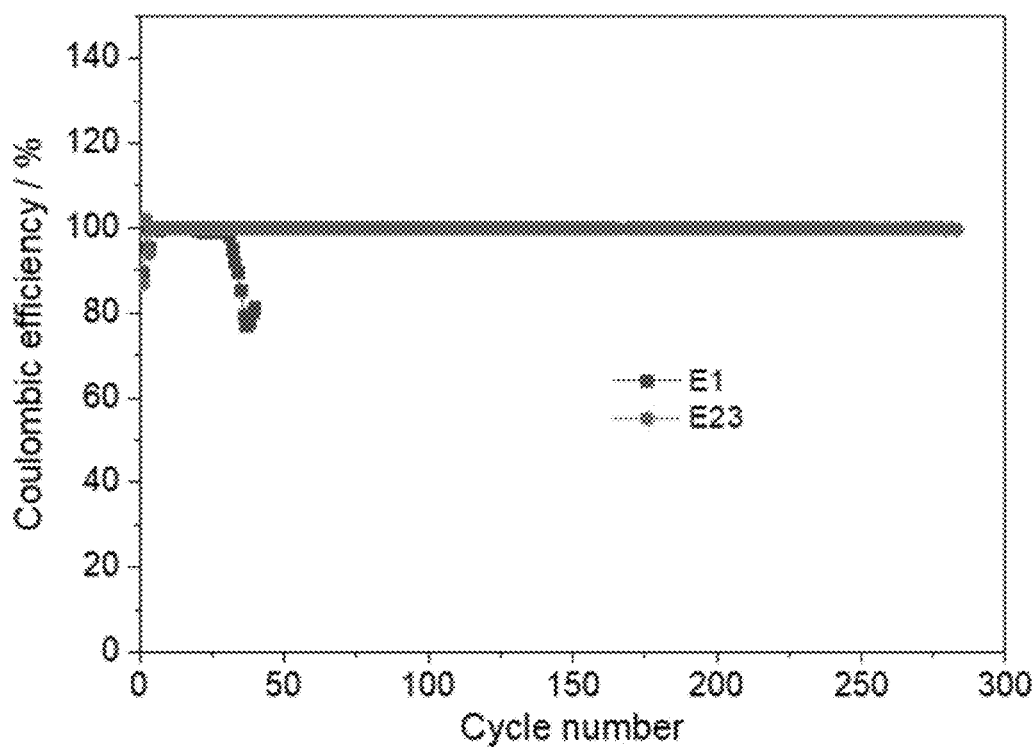

FIG. 39 shows charge/discharge curves of a Li metal cell Li∥LiNi$_{0.8}$Mn$_{0.1}$Co$_{0.1}$O$_2$(NMC811) with the TDFEO electrolyte E23. The Li∥NMC811 cells were prepared with 1.5 mAh cm$^{-2}$ NMC811, and were charged/discharged at C/3 after two formation cycles at C/10. A specific capacity of 200 mAh/g was obtained in the first cycle at C/10 with a good initial CE of 86.9%. The specific capacity at C/3 rate was 189 mAh/g after first two cycles. FIGS. 40A and 40B show cycling performance of the Li∥NMC811 cells with the TDFEO-based electrolyte E23 compared to the baseline electrolyte E1. FIG. 40A shows specific capacity and FIG. 40B shows coulombic efficiency. The data demonstrates that Li∥NMC811 cells with the TDFEO-based electrolyte E23 have a very long cycling life with a high capacity retention of 96.0% after 283 cycles. The average CE during cycling was 99.7%.

Figure 41:
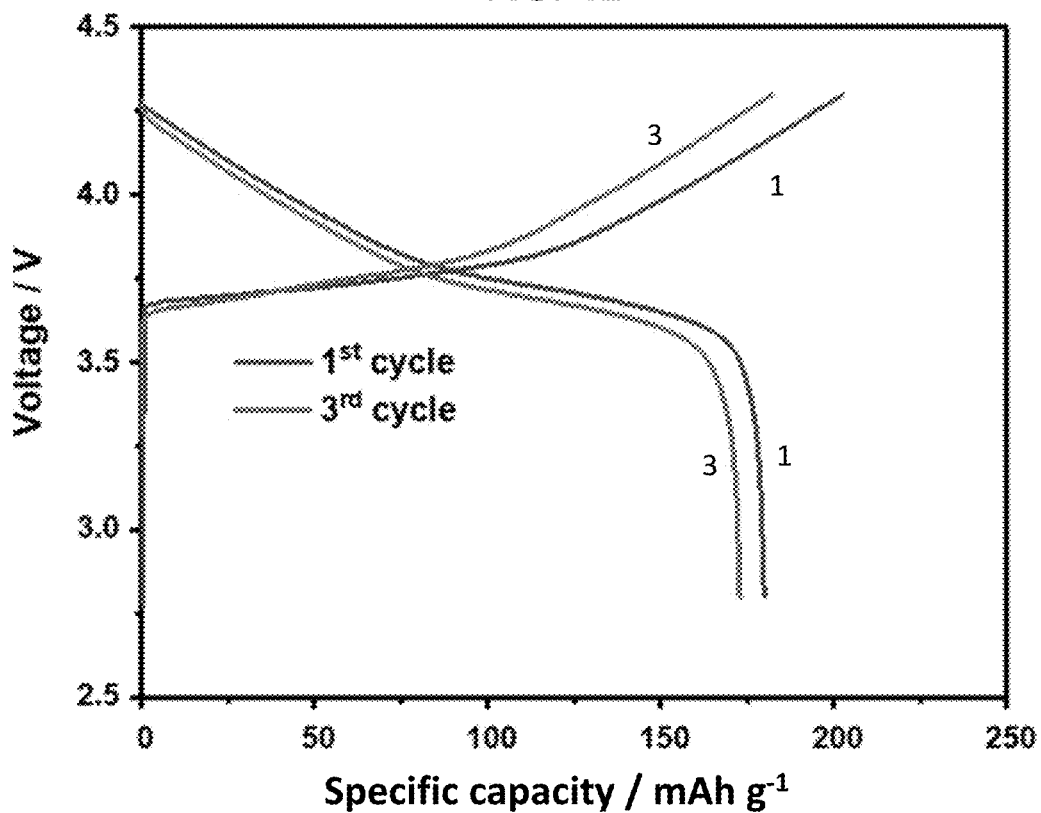
FIG. 41 shows charge/discharge curves of an anode free cell Cu∥NMC622 with a LiFSI-DME-TDFEO (1:1.2:2 molar ratio) electrolyte. The cell was were prepared with 4.2 mAh cm$^{-2}$ NMC622, and was charged at C/10 and discharged at C/3 after two formation cycles at C/10.
Figure 42A:
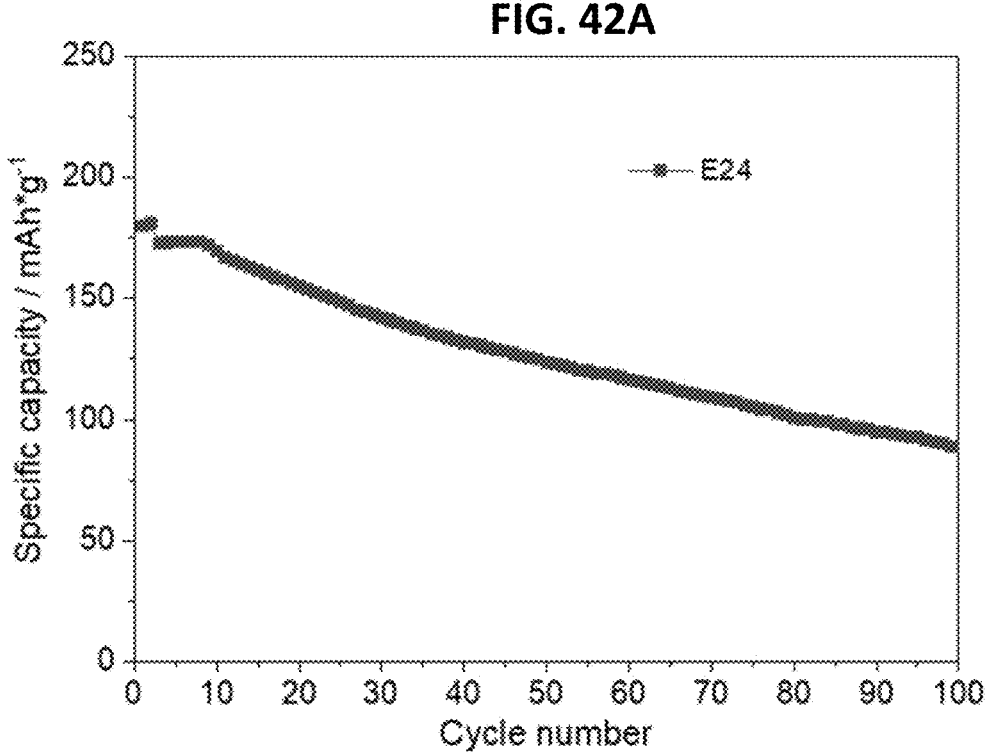
FIGS. 42A and 42B show cycling performance of the Cu∥NMC622 cell of FIG. 41, with FIG. 42A showing specific capacity and FIG. 42B showing coulombic efficiency.
Figure 42B:
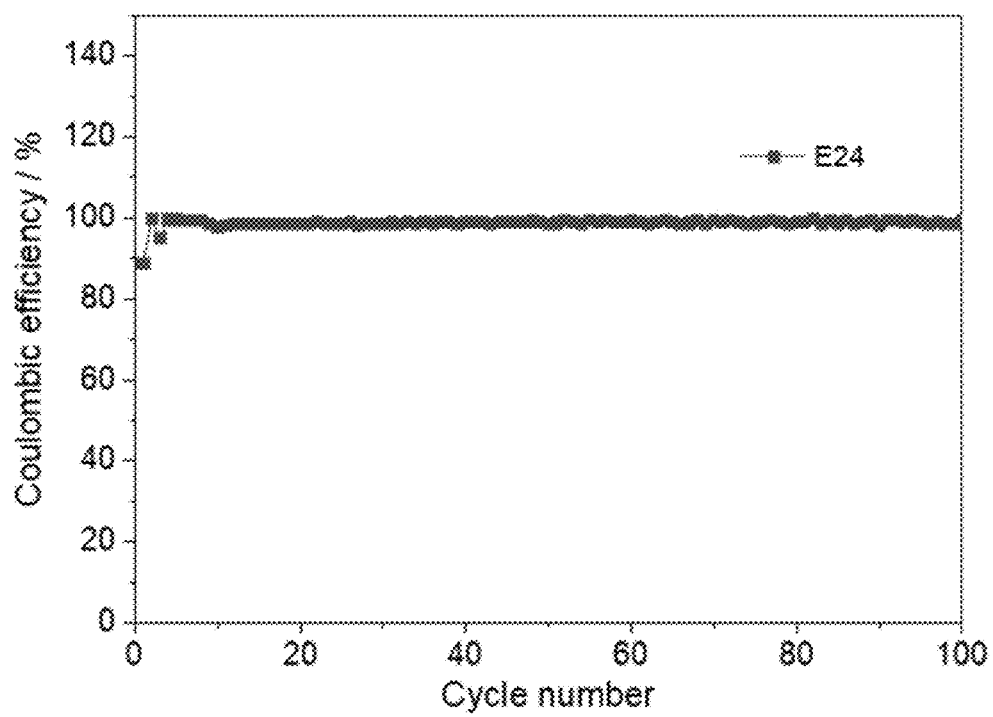

FIG. 41 shows charge/discharge curves of an anode free cell Cu∥NMC622 with the TDFEO-based electrolyte E24. The Cu∥NMC622 cells were prepared with 4.2 mAh cm$^{-2}$ NMC622, and were charged at C/10 and discharged at C/3 after two formation cycles at C/10. A specific capacity of 180 mAh/g was obtained in the first cycle at C/10 with a good initial CE of 88.8%. The specific capacity at C/3 rate was 173 mAh/g after first two cycles. FIGS. 42A and 42B show cycling performance of the Cu∥NMC622 cells with the TDFEO-based electrolyte E24, with FIG. 42A showing specific capacity and FIG. 42B showing coulombic efficiency. The data demonstrates that the TDFEO based electrolyte enabled cycling of anode free batteries, with a capacity retention of 51.3% after 100 cycles. The average CE during cycling was 99.3%.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An electrolyte, comprising:
   an active salt;
   a solvent comprising an ether, a carbonate, a sulfone, an aliphatic ester, a lactone, a sulfoxide, water, a flame retardant compound, a nitrile, or any combination thereof, wherein the active salt is soluble in the solvent; and
   a fluorinated orthoformate, wherein the active salt has a solubility in the fluorinated orthoformate at least 10 times less than a solubility of the active salt in the solvent, and wherein a molar concentration of the active salt in the electrolyte is at least 20% less than a molar concentration of the active salt in the solvent in the absence of the fluorinated orthoformate.

2. The electrolyte of claim 1, wherein the fluorinated orthoformate is tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

3. The electrolyte of claim 1, wherein the solvent comprises 1,2-dimethoxyethane (DME), 1,3-dioxolane (DOL), allyl ether, diethylene glycol dimethyl ether (diglyme), triethylene glycol dimethyl ether (triglyme), tetraethylene glycol dimethyl ether (tetraglyme), dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (VEC), 4-methylene-1,3-dioxolan-2-one (MEC), 4,5-dimethylene-1,3-dioxolan-2-one, dimethyl sulfone (DMS), ethyl methyl sulfone (EMS), ethyl vinyl sulfone (EVS), tetramethylene sulfone (TMS), methyl butyrate, ethyl propionate, trimethyl phosphate, triethyl phosphate, gamma-butyrolactone, dimethyl sulfoxide (DMSO), triallyl amine, triallyl cyanurate, triallyl isocyanurate, water, acetonitrile, or any combination thereof.

4. The electrolyte of claim 1, wherein the solvent comprises a flame retardant compound, and the electrolyte comprises at least 5 wt % of the flame retardant compound.

5. The electrolyte of claim 1, wherein the flame retardant compound comprises an organic phosphate, an organic phosphite, an organic phosphonate, an organic phosphoramide, a phosphazene, or any combination thereof.

6. The electrolyte of claim 5, wherein the flame retardant compound comprises trimethyl phosphate, triethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

7. The electrolyte of claim 1, wherein the active salt comprises a lithium salt or lithium salts mixture, a sodium salt or sodium salts mixture, a potassium salt or potassium salts mixture, or a magnesium salt or magnesium salts mixture.

8. The electrolyte of claim 1, wherein the active salt comprises lithium bis(fluorosulfonyl)imide (LiFSI), lithium bis(trifluoromethanesulfonyl)imide (LiTFSI), lithium (fluorosulfonyl trifluoromethanesulfonyl)imide (LiFTFSI), lithium bis(pentafluoroethanesulfonyl)imide (LiBETI), lithium bis(oxalato)borate (LiBOB), LiPF$_6$, LiAsF$_6$, LiBF$_4$, LiCF$_3$SO$_3$, LiClO$_4$, lithium difluoro oxalato borate anion (LiDFOB), LiI, LiBr, LiCl, LiSCN, LiNO$_3$, LiNO$_2$, Li$_2$SO$_4$, sodium bis(fluorosulfonyl)imide (NaFSI), sodium bis(trifluoromethylsulfonyl)imide (NaTFSI), sodium bis(pentafluoroethanesulfonyl)imide (NaBETI), NaPF$_6$, NaAsF$_6$, NaBF$_4$, NaCF$_3$SO$_3$, NaClO$_4$, sodium bis(oxalato)borate (NaBOB), sodium difluoro oxalato borate anion (NaDFOB), or any combination thereof.

9. The electrolyte of claim 1, wherein:
   (i) the active salt has a molar concentration in the electrolyte within a range of from 0.1 M to 3 M; or
   (ii) the active salt has a molar concentration in the electrolyte of greater than 3 moles of active salt per liter of the solvent; or (iii) a molar ratio of the active salt to the solvent is within a range of from 0.1 to 5; or (iv) volumetric ratio of the solvent to the fluorinated orthoformate is within a range of from 0.25 to 4; or (v) any combination of (i), (ii), (iii), and (iv).

10. The electrolyte of claim 1, wherein the solvent and the fluorinated orthoformate are immiscible, the electrolyte further comprising a bridge solvent having a different composition than the solvent and a different composition than the fluorinated orthoformate, wherein the bridge solvent is miscible with the solvent and with the fluorinated orthoformate.

11. The electrolyte of claim 10, wherein the bridge solvent comprises acetonitrile, dimethyl carbonate, diethyl carbonate, propylene carbonate, dimethyl sulfoxide, 1,3-dioxolane, 1,2-dimethoxyethane, diglyme (bis(2-methoxyethyl) ether), triglyme (triethylene glycol dimethyl ether), tetraglyme (tetraethylene glycol dimethyl ether), or any combination thereof.

12. The electrolyte of claim 1, wherein:
the active salt is (i) LiFSI, LiTFSI, or a combination thereof, or (ii) NaFSI, NaTFSI, or a combination thereof;
the solvent comprises an ether, a flame retardant compound comprising an organic phosphate, or a combination thereof; and
the fluorinated orthoformate comprises TFEO, TDFEO, or TFEO and TDFEO.

13. A battery, comprising:
an electrolyte comprising
an active salt,
a solvent comprising an ether, a carbonate, a sulfone, an aliphatic ester, a lactone, a sulfoxide, water, a flame retardant compound, a nitrile, or any combination thereof, wherein the active salt is soluble in the solvent, and
a fluorinated orthoformate, wherein the active salt has a solubility in the fluorinated orthoformate at least 10 times less than a solubility of the active salt in the solvent, the active salt has a concentration in the electrolyte within a range of 0.1 to 3 M, and a molar concentration of the active salt in the electrolyte is at least 20% less than a molar concentration of the active salt in the solvent in the absence of the fluorinated orthoformate;
an anode comprising an alkali metal, carbon, silicon, a carbon/silicon composite, tin, or antimony, or an anode current collector in the absence of an anode; and
a cathode,
wherein the battery has a coulombic efficiency≥95%.

14. The battery of claim 13, wherein the fluorinated orthoformate comprises tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.

15. The battery of claim 13, wherein:
(i) the solvent further comprises a flame retardant compound comprising triethyl phosphate, trimethyl phosphate, or a combination thereof; or
(ii) the electrolyte comprises at least 5 wt % of the flame retardant compound; or
(iii) both (i) and (ii).

16. The battery of claim 13, wherein:
the active salt comprises LiFSI, LiTFSI, LiFTFSI, LiBETI, LiPF$_6$, LiAsF$_6$, LiBF$_4$, LiCF$_3$SO$_3$, LiClO$_4$, LiBOB, LiDFOB, LiI, LiBr, LiCl, LiSCN, LiNO$_3$, LiNO$_2$, Li$_2$SO$_4$, or any combination thereof;
the solvent comprises an ether, an organic phosphate, an organic phosphite, DMC, EC, EMC, DEC, PC, MFEC, VC, FEC, DFEC, TFEC, VEC, MEC, ethylene sulfite, ethylene sulfate, EVS, water, or any combination thereof;
the fluorinated orthoformate comprises TFEO, THFiPO, TDFEO, BTFEMO, TPFPO, TTPO, or any combination thereof; and
the cathode comprises Li$_{1+w}$Ni$_x$Mn$_y$Co$_z$O$_2$ (x+y+z+w=1, 0≤w≤0.25), LiNi$_x$Mn$_y$Co$_z$O$_2$ (x+y+z=1), LiNi$_{0.8}$Co$_{0.15}$Al$_{0.05}$O$_2$, LiCoO$_2$, LiNi$_{0.5}$Mn$_{1.5}$O$_4$ spinel, LiMn$_2$O$_4$, LiFePO$_4$, Li$_{4-x}$M$_x$Ti$_5$O$_{12}$ (M=Mg, Al, Ba, Sr, or Ta; 0≤x≤1), MnO$_2$, V$_2$O$_5$, V$_6$O$_{13}$, LiV$_3$O$_8$, LiM$^{C1}_x$M$^{C2}_{1-x}$PO$_4$ (M$^{C1}$ or M$^{C2}$=Fe, Mn, Ni, Co, Cr, or Ti; 0≤x≤1), Li$_3$V$_{2-x}$M$^1_x$(PO$_4$)$_3$ (M$^1$=Cr, Co, Fe, Mg, Y, Ti, Nb, or Ce; 0≤x≤1), LiVPO$_4$F, LiM$^{C1}_x$M$^{C2}_{1-x}$O$_2$ ((M$^{C1}$ and M$^{C2}$ independently are Fe, Mn, Ni, Co, Cr, Ti, Mg, or Al; 0≤x≤1), LiM$^{C1}_x$M$^{C2}_y$M$^{C3}_{1-x-y}$O$_2$ ((M$^{C1}$, M$^{C2}$, and M$^{C3}$ independently are Fe, Mn, Ni, Co, Cr, Ti, Mg, or Al; 0≤x≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y<0.5), xLi$_2$MnO$_3$·(1-x)LiM$^{C1}_y$M$^{C2}_z$M$^{C3}_{1-y-z}$O$_2$ (M$^{C1}$, M$^{C2}$, and M$^{C3}$ independently are Mn, Ni, Co, Cr, Fe, or mixture thereof; x=0.3-0.5; y≤0.5; z≤0.5), Li$_2$M$^2$SiO$_4$ (M$^2$=Mn, Fe, or Co), Li$_2$M$^2$SO$_4$ (M$^2$=Mn, Fe, or Co), LiM$^2$SO$_4$F (M$^2$=Fe, Mn, or Co), Li(Fe$_{1-y}$Mn$_y$)P$_2$O$_7$ (0≤y≤1), Cr$_3$O$_8$, Cr$_2$O$_5$, a carbon/sulfur composite, or an air electrode.

17. The battery of claim 13, wherein:
the active salt comprises NaFSI, NaTFSI, NaBETI, NaPF$_6$, NaAsF$_6$, NaBF$_4$, NaCF$_3$SO$_3$, NaClO$_4$, NaBOB, NaDFOB, or any combination thereof;
the solvent comprises an ether, an organic phosphate, an organic phosphite, VC, FEC, DFEC, TFEC, VEC, MEC, EC, PC, DMC, EMC, DEC, MFEC, ethylene sulfite, ethylene sulfate, EVS, water, or any combination thereof;
the fluorinated orthoformate comprises TFEO, THFiPO, TDFEO, BTFEMO, TPFPO, TTPO, or any combination thereof; and
the cathode comprises Na$_x$MO$_2$ where 0.4<x≤1, and M is a transition metal or a mixture of transition metals, NaFePO$_4$, Na$_2$FePO$_4$F, Na$_2$FeP$_2$O$_7$, Na$_3$V$_2$(PO$_4$)$_3$, Na$_3$V$_2$(PO$_4$)$_2$F$_3$, NaVPO$_4$F, NaVPOPOF, Na$_{1.5}$VOPO$_4$F$_{0.5}$, NaCo$_2$O$_4$, NaFe$_{O2}$, a Prussian white analogue cathode, or a Prussian blue analogue cathode.

18. The battery of claim 13, wherein the solvent and the fluorinated orthoformate are immiscible, the electrolyte further comprising a bridge solvent having a different composition than the solvent and a different composition than the fluorinated orthoformate, wherein the bridge solvent is miscible with the solvent and with the fluorinated orthoformate.

19. The electrolyte of claim 1, wherein:
the active salt comprises LiFSI;
the solvent comprises DME; and
the fluorinated orthoformate comprises TFEO, wherein a molar ratio of the solvent to the fluorinated orthoformate is within a range of from 0.2 to 2.

* * * * *